United States Patent
Fenu et al.

(10) Patent No.: US 11,867,234 B1
(45) Date of Patent: Jan. 9, 2024

(54) FOOD HYGIENIC BEARING ASSEMBLY

(71) Applicants: Marco Fenu, Hawley, MN (US); Lucas Hoffman, Detroit Lakes, MN (US)

(72) Inventors: Marco Fenu, Hawley, MN (US); Lucas Hoffman, Detroit Lakes, MN (US)

( * ) Notice: Subject to any disclaimer, the term of this patent is extended or adjusted under 35 U.S.C. 154(b) by 0 days.

(21) Appl. No.: 17/706,222

(22) Filed: Mar. 28, 2022

Related U.S. Application Data

(60) Provisional application No. 63/167,163, filed on Mar. 29, 2021.

(51) Int. Cl.
- F16C 35/04 (2006.01)
- F16C 33/72 (2006.01)
- F16C 35/00 (2006.01)
- F16C 23/08 (2006.01)

(52) U.S. Cl.
CPC ............ *F16C 35/00* (2013.01); *F16C 23/084* (2013.01); *F16C 33/723* (2013.01); *F16C 35/045* (2013.01); *F16C 2326/58* (2013.01)

(58) Field of Classification Search
CPC ...... F16C 23/043; F16C 23/045; F16C 23/08; F16C 23/082; F16C 23/084; F16C 33/723; F16C 33/726; F16C 35/00; F16C 35/02; F16C 35/04; F16C 35/042; F16C 35/045; F16C 2326/58
See application file for complete search history.

(56) References Cited

U.S. PATENT DOCUMENTS

| | | | |
|---|---|---|---|
| 3,960,418 A | * | 6/1976 | Bracken ............... F16C 27/04 384/535 |
| 4,776,709 A | | 10/1988 | Tooley |
| 5,328,276 A | | 7/1994 | Linteau |
| 5,711,618 A | | 1/1998 | Waskiewicz |
| 5,791,787 A | | 8/1998 | Nisley |
| 5,833,372 A | | 11/1998 | Nisley |

(Continued)

FOREIGN PATENT DOCUMENTS

DE 102005014916 * 10/2006

OTHER PUBLICATIONS

IPTCI Bearings, Corrosion Resistant 3 Bolt Flange Brackets | webpage provided by Internet Archive Wayback Machine at <https://web.archive.org/web/20130621040721/https://www.iptci.com/products/corrosion-resistant-3-bolt-flange-brackets> | publshed on Jun. 21, 2013 | obtained on Aug. 16, 2023.

(Continued)

*Primary Examiner* — James Pilkington
(74) *Attorney, Agent, or Firm* — Hanrahan Law Firm, P.A.; Benjamin M. Hanrahan

(57) ABSTRACT

A food hygienic bearing assembly is presented herein. The assembly includes a housing, a bearing insert and an end cap. The housing includes a bore spanning between a first surface and a second surface, the bearing insert being disposed within the bore. A plurality of integral spacers extend from the second surface of the housing with a blind tapped hole disposed through each of the spacers and partially into a main body portion of the housing. The end cap is secured to the first surface of the housing in an at least partially covering relation to the bore via at least one fastener and at least one lubrication fitting. The end cap has a partially open configuration defined by a plurality of spaced holes disposed thereon, through which a mounting hole of the bearing insert is accessible without removing the end cap.

15 Claims, 60 Drawing Sheets

(56) References Cited

U.S. PATENT DOCUMENTS

| | | | |
|---|---|---|---|
| 5,857,781 A * | 1/1999 | Ward | F16C 33/723 |
| | | | 384/489 |
| 6,428,213 B1 | 8/2002 | Parejko et al. | |
| 6,921,211 B2 | 7/2005 | Olsson et al. | |
| 6,971,802 B2 | 12/2005 | Vezina | |
| 7,419,305 B2 | 9/2008 | Nisley et al. | |
| 9,366,294 B2 * | 6/2016 | Kim | F16C 35/045 |
| 9,555,976 B2 * | 1/2017 | Eure | F16C 43/00 |
| 9,822,818 B1 | 11/2017 | Hewitt et al. | |
| 10,471,825 B2 | 11/2019 | Roberts et al. | |
| 10,675,972 B2 | 6/2020 | McLaughlin | |
| 10,752,049 B2 | 8/2020 | Nakatsuji et al. | |
| 10,807,158 B2 | 10/2020 | Banse et al. | |
| 11,346,438 B2 * | 5/2022 | Bourgault | F16C 33/76 |
| 2008/0069489 A1 | 3/2008 | Drake et al. | |
| 2008/0078648 A1 | 4/2008 | Orlowski et al. | |

OTHER PUBLICATIONS

Bearing Tips a design World Resource, Production stainless housings and expanded mounted bearing choices | website located at <https://www.bearingtips.com/production-stainless-housings-expanded-mounted-bearing-choices/> | dated Feb. 17, 2016 | obtained on Aug. 17, 2023.

IPTCI Bearings, Corrosion Resistant 3 Bolt Flange Brackets | webpage located at <https://iptci.com/products/corrosion-resistant-3-bolt-flange-brackets> | date of first publication unknown | obtained on Aug. 17, 2023.

IPTCI Bearings, Standoff 3 Bolt Flange Brackets | webpage located at <https://www.iptci.com/products/standoff-3-bolt-flange-brackets> | date of first publication unknown | obtained on Aug. 17, 2023.

Dodge Food Safe Bearings | webpage located at <https:info.dodgeindustrial.com/food-safe> | date of first publication unknown | obtained on Aug. 17, 2023.

KML Bearings USA | websie located at <https:www.kmlbearingusa.com/library/product-catalogs/> | date of first publication unknown | obtained on Aug. 17, 2023.

EDT Bearing Solutions by Timken | website located at <https://www.timken.com/resources/edt-product-brochure/> | date of first publication unknown | obtained on Aug. 17, 2023.

* cited by examiner

FOOD HYGIENIC BEARING ASSEMBLY

CLAIM OF PRIORITY/CROSS-REFERENCE TO RELATED APPLICATION

The present application is based on and a claim of priority is made under 35 U.S.C. § 119(e) to Provisional Patent Application No. 63/167,163, filed on Mar. 29, 2021, the contents of which are incorporated herein in their entirety by reference.

FIELD OF THE INVENTION

The present invention is directed to a bearing assembly, and in particular, a food hygienic bearing assembly with integrated spacers, blind tapped mounting holes, and an end cap with an open configuration, resulting in a bearing assembly that is easy to clean and which minimizes locations where bacteria can grow.

BACKGROUND OF THE INVENTION

Bearing assemblies are generally known in the art and have been used for many years to facilitate the rotation of shafts and other devices. For example, conveyor lines, conveyor equipment, and many other types of equipment rely on the continued operation of bearings in order to function properly. In many industries, these bearings and bearing assemblies are exposed to harsh conditions and may come into contact with various liquids, solids, and gas contaminants. For example, in the food industry, these bearings and bearing assemblies that operate on various conveyors and other food preparation, food packaging and food related equipment are often exposed to food particles, which, if not cleaned properly and often, can lead to the growth of bacteria. It is thus not only important to maintain the operation of the bearings and bearing assemblies, but it is also important in the food industry to keep the surfaces of the bearings and bearing assemblies clean and free of any food particles and bacteria growth.

With reference to FIGS. 1A through 1H, an exemplary known bearing assembly 1 and bearing housing 2 is shown. For example, in FIGS. 1A and 1B, the bearing assembly 1 is shown mounted to a piece of conveyor equipment 5 for rotation of a shaft (not shown). The bearing assembly 1 has a housing 2 defining a bore 3 within which a bearing 4 is disposed. The housing 2 further includes a plurality of mounting holes 6 that extend completely though a thin extended mounting portion of the housing 2. If desired, as shown in FIGS. 1G and 1H, spacers 7 are placed on the mounting side of the holes. Fasteners in the form of a bolt 8 and nut 9 are then used to secure the housing 2 to the equipment, for example, between the bolt heads 8a and the spacers 7. As shown in FIG. 1H, the bolts 8 extend all the way through the housing 2 with at least some threads 8b exposed through the nut 9. According to standard practice and policy, at least one thread 8b must extend through the nut 9 in order for the fastener 8 to be considered secure. One problem with this bearing housing 2 is that the exposed threads 8b provide small ideal surfaces upon which bacteria can grow and harvest—an undesirable scenario in the food industry.

Furthermore, grease zerks 2a are often located perpendicular to the drive/driven shaft and end up being inaccessible in many instances. Additionally, bearing guards are often fully closed or otherwise completely cover the bearing making it impossible to see inside for any maintenance, troubleshooting, etc. If water or other contaminants enter the guard, a fully closed guard makes it impossible to know, and therefore, difficult to maintain. Lubrication of the bearings is also difficult with a fully closed guard in that visual access to the bearing and the grease is blocked, thereby causing over or under lubrication in many cases.

In addition, the surface of the housing 2 itself in many instances is not smooth or polished and includes a number of nicks and crevasses within which food (and other) particles can reside and within which bacteria can easily grow and harvest.

There is thus a need in the art for a bearing housing and assembly which is easy to clean and which minimizes locations where bacteria can grow and where food particles can be caught. Accordingly, the proposed bearing assembly disclosed herein includes a smooth, polished surface which can be easily cleaned and which does not foster bacteria growth. The proposed bearing assembly may also include spacers which are integral with or otherwise part of the housing itself and which have blind tapped mounting holes which only extend partially into the housing to eliminate the exposed threads of the mounting fasteners.

SUMMARY OF THE INVENTION

Accordingly, the present invention is directed to a bearing assembly and/or bearing housing for mounting spherical or other bearing inserts to industrial or other equipment, including but in no way limited to conveyor equipment in the food preparation and food packaging industries. Various types of bearings can be used in connection with different embodiments or applications of the present invention, including, for example, flanged bearings, two bolt, three bolt, and four bolt bearings, etc. Moreover, the bearing assembly of the present invention can be used to hold a rotating shaft, whether the shaft is a driving shaft or a driven shaft, by supporting the shaft on one or both sides.

Furthermore, the bearing housing of at least one embodiment includes integrated, fixed or non-removable spacers or standoffs that space the housing from the equipment or other surface upon which it is mounted which can make it easier to clean and sanitize behind the housing. In other words, in at least one embodiment, the spacers and the housing are constructed out of a single integrated piece of material. However, other forms of fabrication, including separate spacers may be contemplated in other embodiments.

The integrated or fixed standoffs or spacers include mounting holes, which in certain embodiments, are blind tapped and threaded holes for securing the housing to the equipment with standard fasteners or bolts. In certain embodiments, the mounting holes are parallel to the axis of shaft rotation. The blind tapped holes eliminate the need for nuts and eliminate the problem of exposed threads.

Additional attachment or auxiliary holes are formed or tapped on the front surface of the housing, which in certain embodiments can serve multiple purposes. In some embodiments, one or more of the attachment or auxiliary holes are communicative with the inside of the bearing bore (where the bearing is mounted) allowing a grease zerk or grease fitting to be mounted in the hole. The grease zerk or grease fitting provides an access point to pump or insert grease or other lubricant into or onto the bearing.

In addition, the attachment or auxiliary hole(s) can be used to mount or attach a guard or an end cap to the bearing housing without requiring any additional manufacturing components or features. The guard or end cap of at least one embodiment may include an open configuration defined by a plurality of holes or openings disposed thereon. The open configuration provides a number of advantages over a fully closed guard including, but not limited to, direct access to set screws disposed on the bearing, visual access to the bearing and shaft during operation for visual assessment, troubleshooting or maintenance, visual access to the bearing while adding grease through the grease zerk, and easy cleaning of any food or other particles that may be present, all while the guard or end cap is mounted to the housing.

In some embodiments, the housing and integral or fixed spacers are fabricated through an investment casing method and can be made out of metal, such as stainless steel, although other methods of fabrication and materials are contemplated. Once fabricated, a bore is machined to receive the bearing insert and various tapped holes, including blind tapped mounting holes and tapped attachment or auxiliary holes (e.g., for the guard, grease fitting and/or accessories) are then formed. The geometry of the housing, and in particular, the bearing bore, as well as the bearing, allow for some shaft misalignment without introducing additional loads into the bearing.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1A:
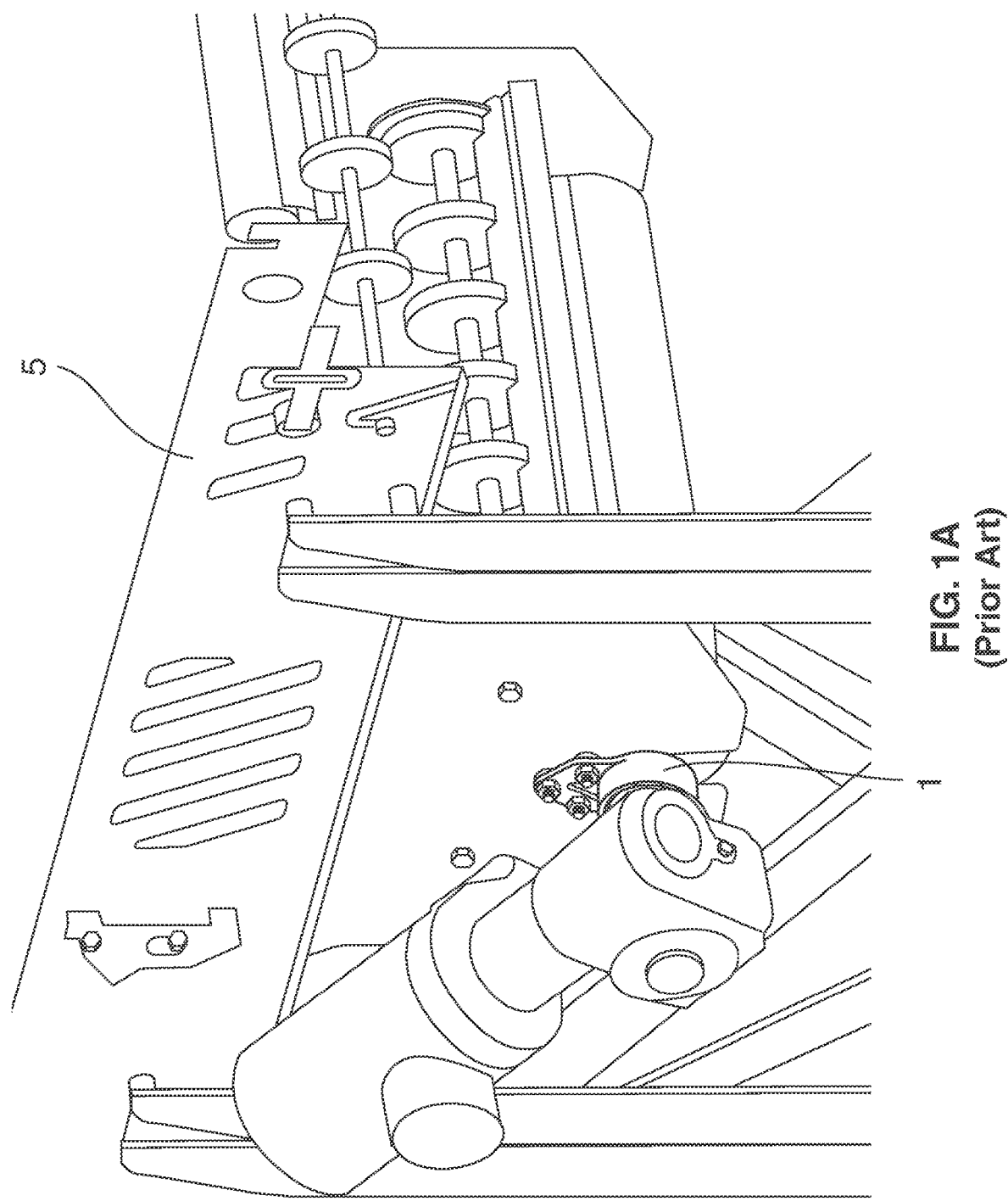
FIG. 1A is a schematic drawing of a prior art bearing assembly mounted to conveyor equipment.
Figure 1B:
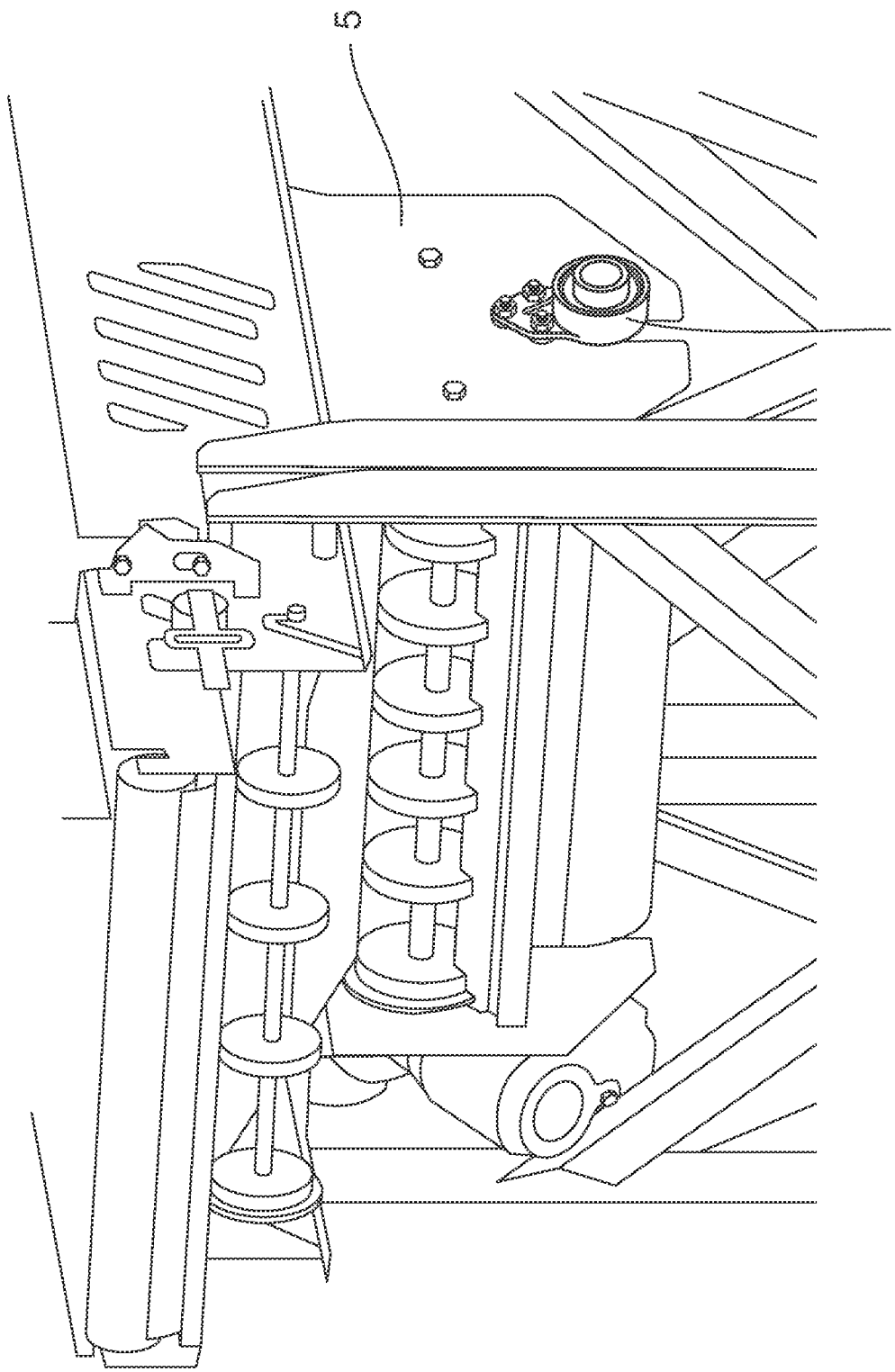
FIG. 1B is another schematic drawing of another prior art bearing assembly mounted to the conveyor equipment illustrated in FIG. 1A.
Figure 1C:
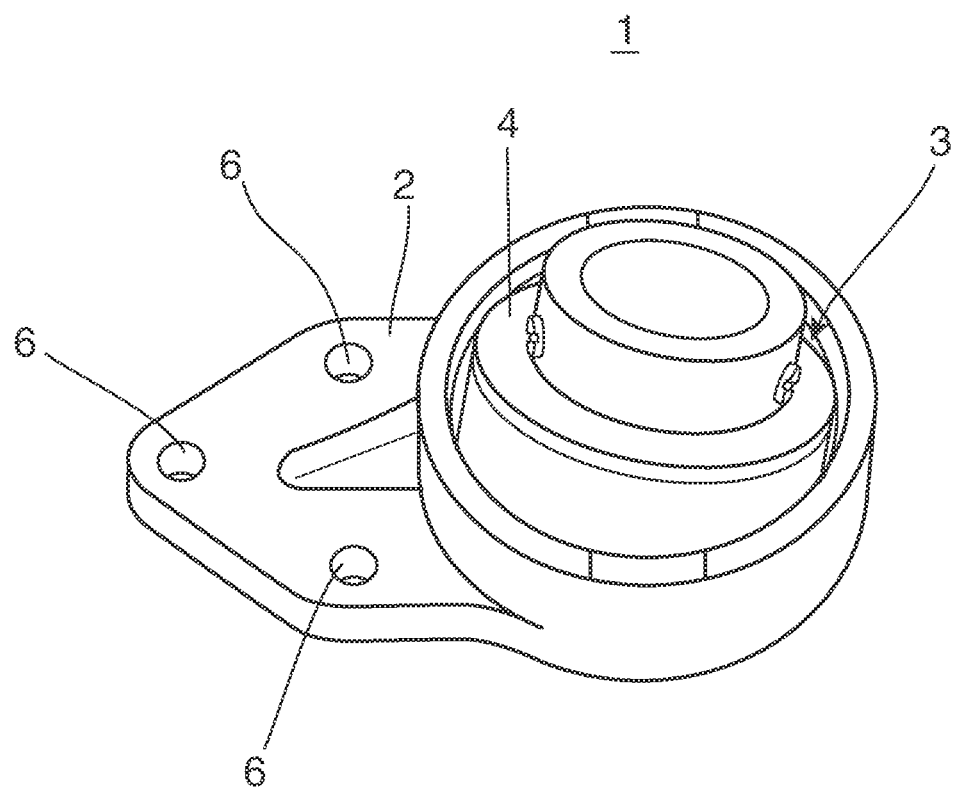
FIG. 1C is a perspective view of a prior art bearing housing and bearing insert.
Figure 1D:
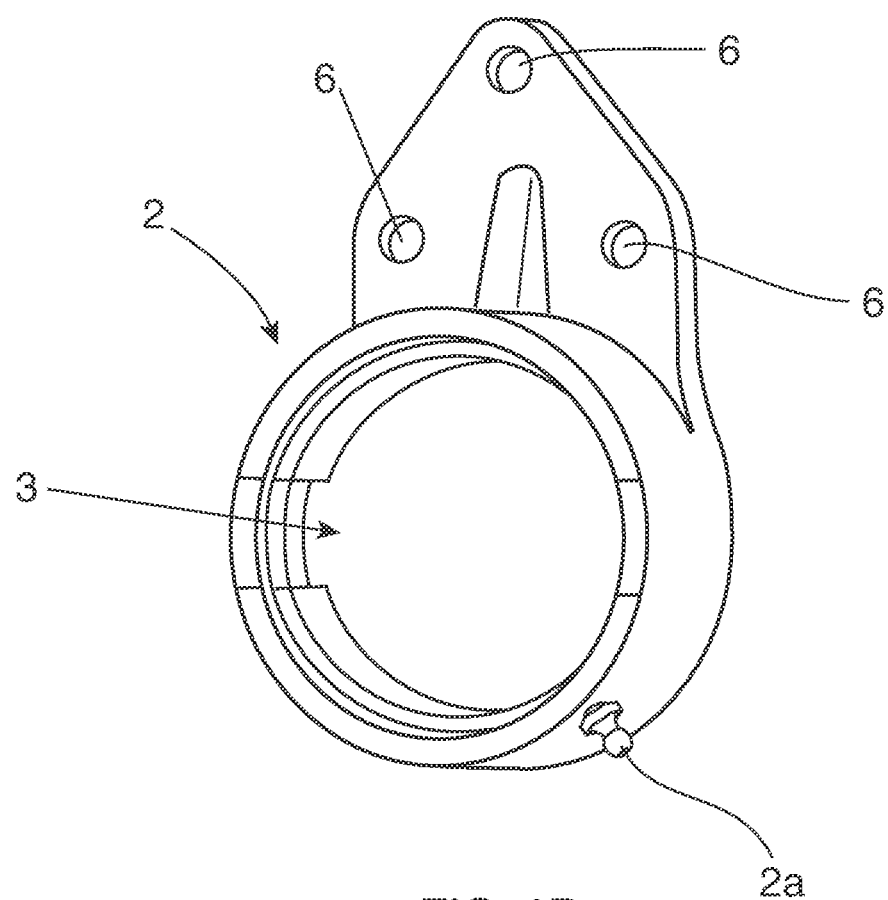
FIG. 1D is a front view of the prior art bearing housing.
Figure 1E:
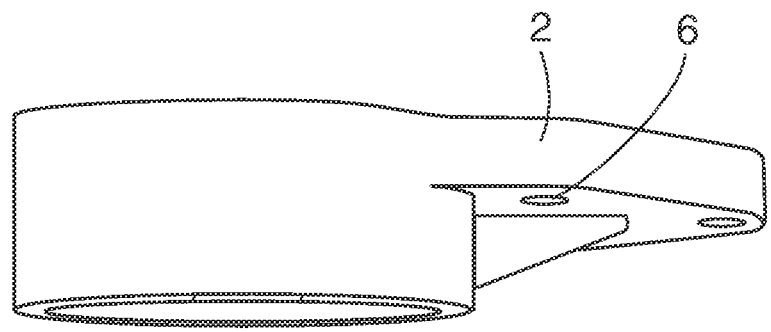
FIG. 1E is a top view of the prior art bearing housing.
Figure 1F:
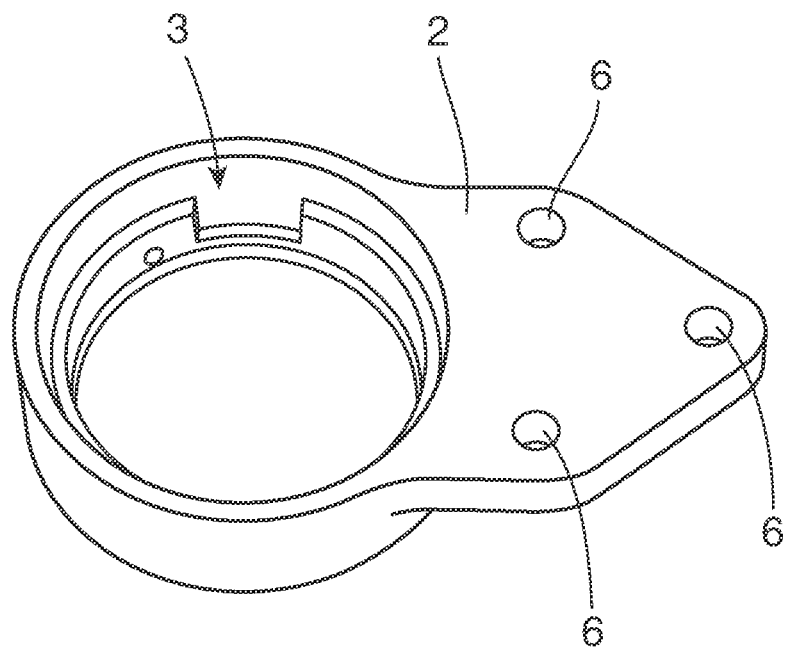
FIG. 1F is a rear view of the prior art bearing housing.
Figure 1G:
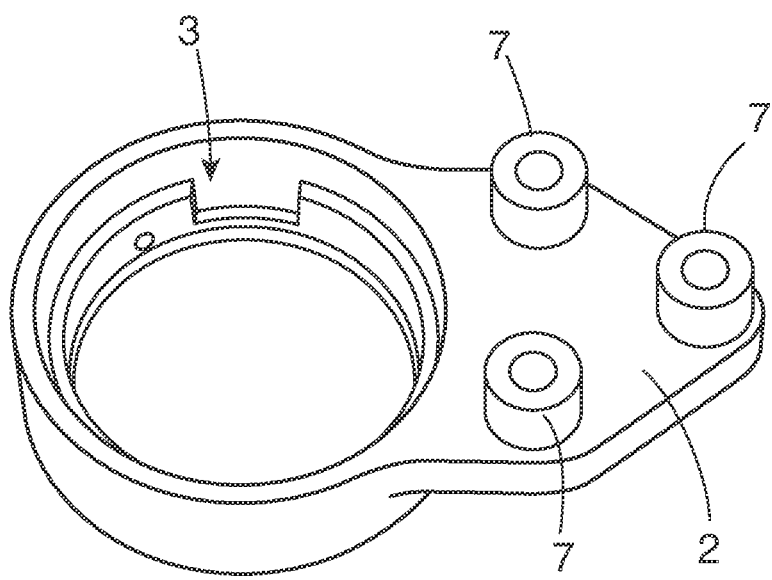
FIG. 1G is a bottom perspective view of the prior art bearing housing with three separate spacers installed.
Figure 1H:
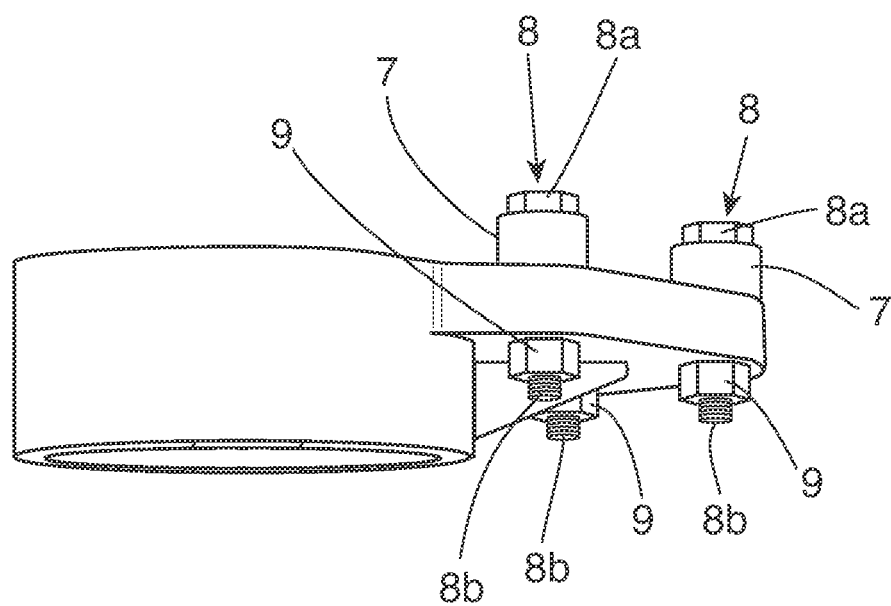
FIG. 1H is a side view of the prior art bearing housing with fasteners and exposed threads.
Figure 2:
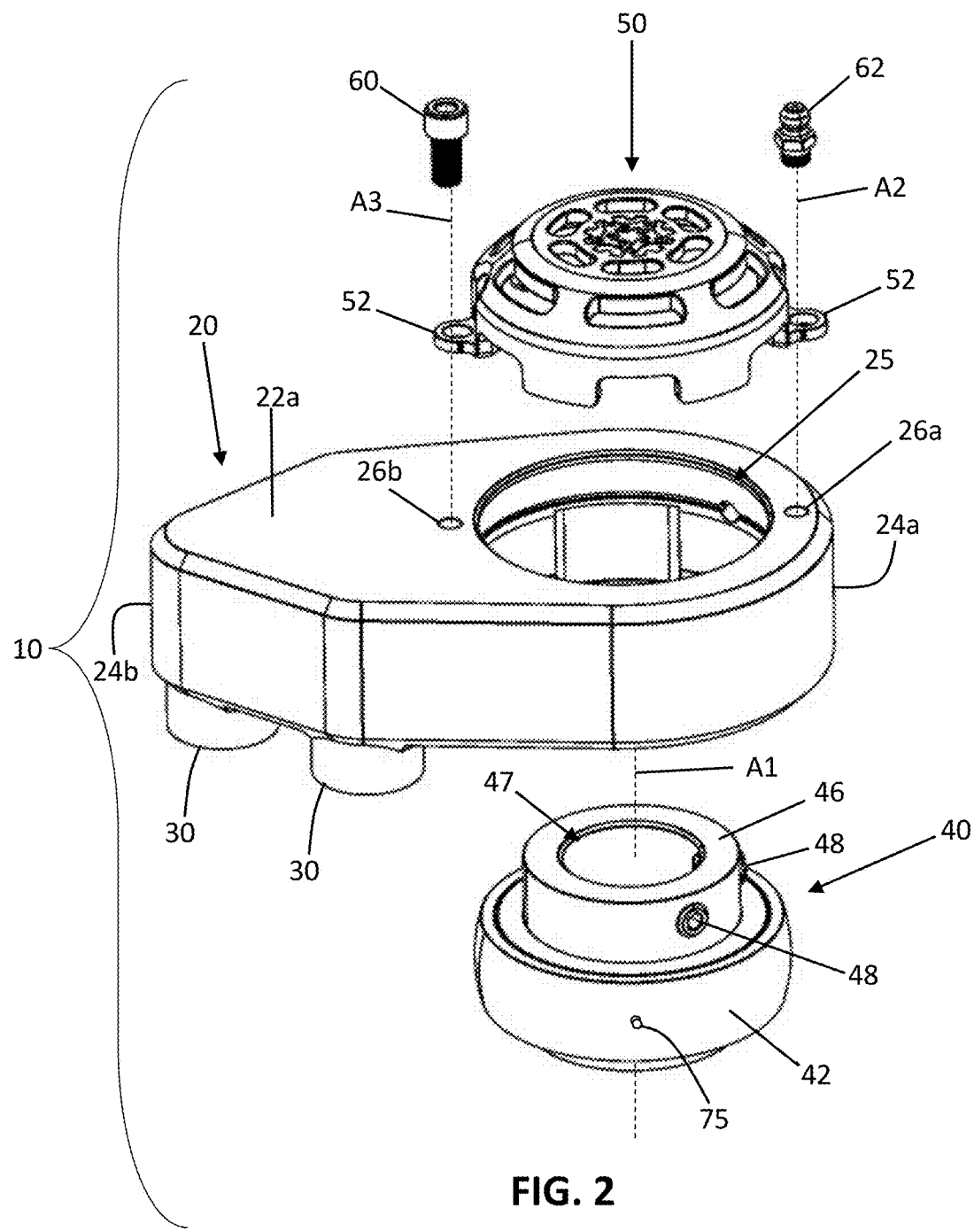
FIG. 2 is an exploded and perspective view of the bearing assembly as disclosed in accordance with at least one embodiment of the present invention.

With reference to the Figures, and in particular, FIGS. 2 through 22, for example, the present invention is directed to a bearing assembly 10 and/or bearing housing 20 which can be used in virtually any industry, including but in no way limited to the food preparation or food packaging industries, and on virtually any equipment that requires the use of bearings, for example, for shaft rotation. Accordingly, the housing 20 of the various embodiments disclosed herein includes or otherwise defines a bore 25 or other opening, hole or recess that is sized to receive a bearing insert, generally referenced as 40. In some cases, as shown in the Figures, the bore 25 extends all the way through the housing 20, for example, between a first or front surface 22a and a second or rear surface 22b.

Furthermore, the housing 20 of at least one embodiment also includes at least one, but more practically, a plurality of standoffs or spacers 30. The spacers 30 extend off of the rear or second surface 22b of the housing 20 and are used to space the housing 20 a distance away from the equipment upon which the housing 20 or assembly 10 is mounted. The spacing between the housing 20 or the second surface 22b of the housing 20 and the equipment can be useful for cleaning purposes and for sanitizing behind the bearing housing 20.

Moreover, the spacers 30 of at least one embodiment are integrally formed with or fixedly connected to the housing 20 in that the spacers 30 and the housing 20 may be constructed out of a single piece of material. In some cases, the spacers or standoffs 30 may be constructed separately from the housing 20 and fixedly mounted thereto in a non-removable manner.

For example, in a least one embodiment, the housing 20 and the spacers 30 can be constructed out of a metal material including, but in no way limited to steel, stainless steel, polished stainless steel, etc., through an investment casting or other method. Once the housing 20 and integral or fixed spacers 30 are formed, the bore 25 can be machined or cut in order for the bearing insert 40 to be disposed therein. As will be described herein, various holes, such as mounting holes, blind holes, tapped holes, blind tapped holes, attachment or auxiliary holes, etc. are also machined, drilled or otherwise formed. Of course, other methods of construction or fabrications, as well as other materials are contemplated and are within the full spirit and scope of the present invention.

Figure 18:
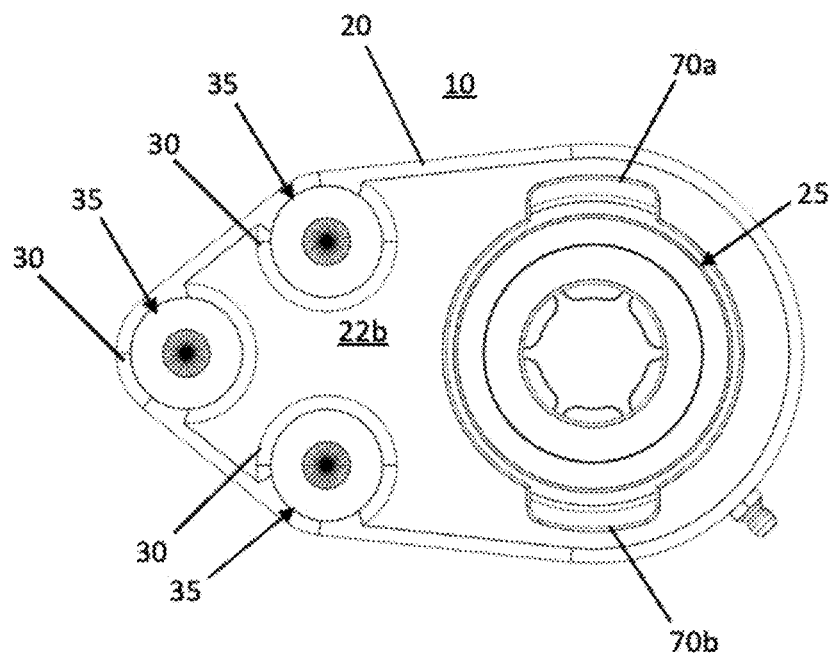
FIG. 18 is a bottom view of the bearing assembly illustrated in FIGS. 2-17.
Figure 19:
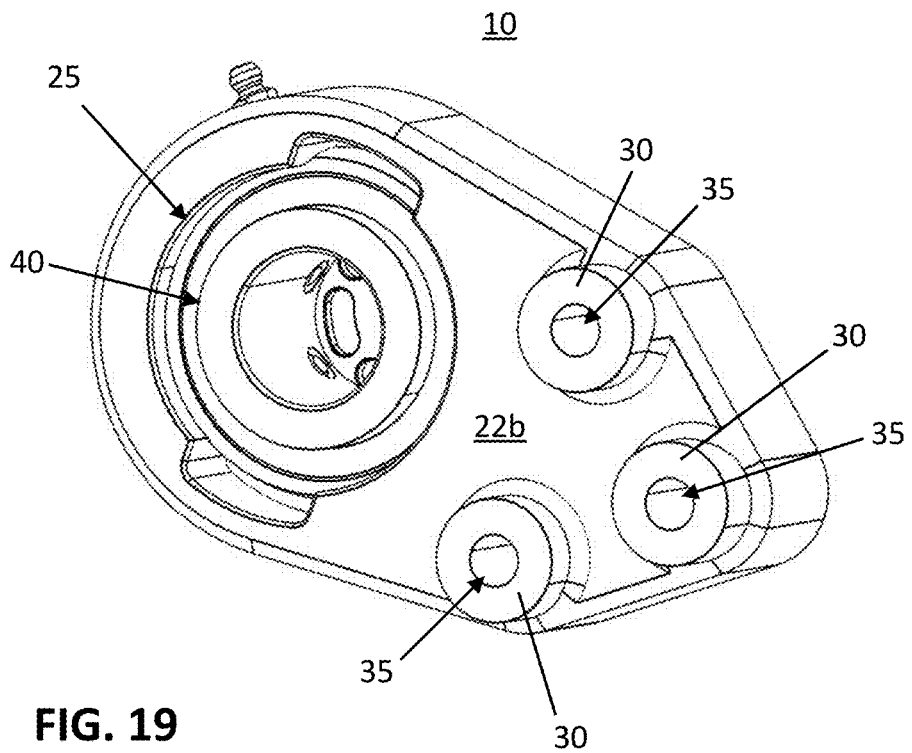
FIG. 19 is a bottom perspective view of the bearing assembly illustrated in FIGS. 2-18.
Figure 20:
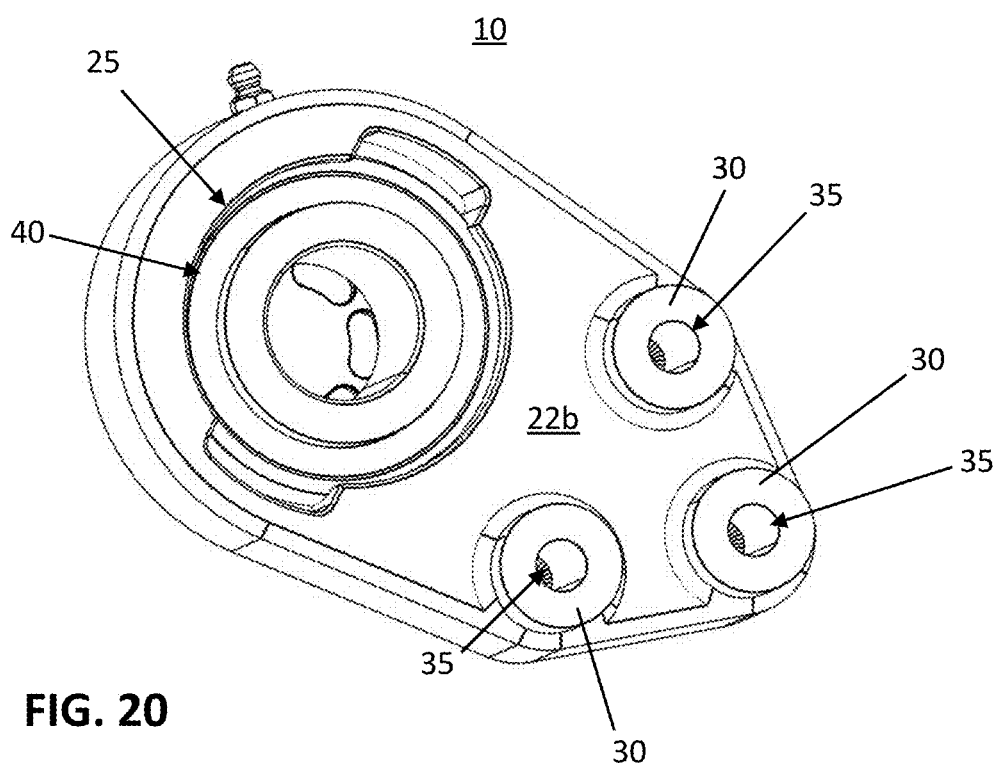
FIG. 20 is another bottom perspective view of the bearing assembly illustrated in FIGS. 2-19.
Figure 21:
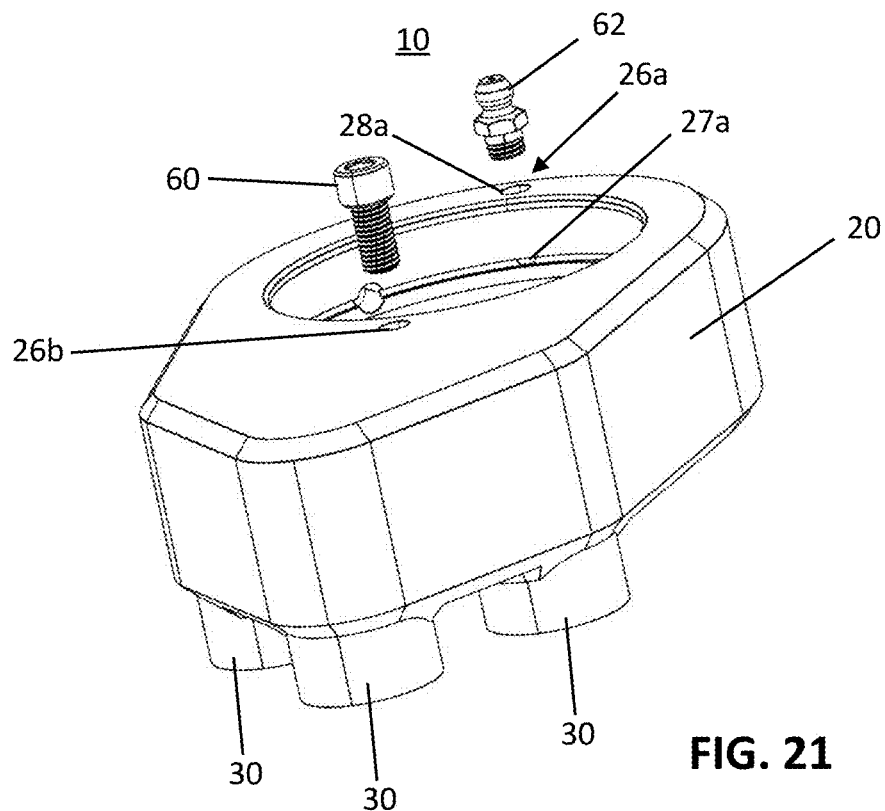
FIG. 21 is a partially exploded view of the bearing housing illustrated in FIGS. 2-20.
Figure 22:
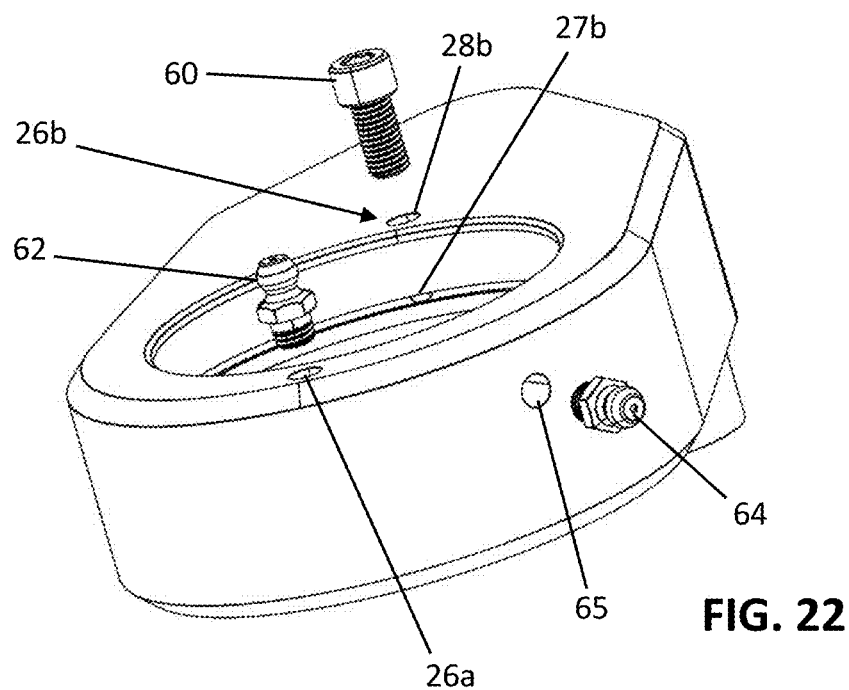
FIG. 22 is another partially exploded view of the bearing housing illustrated in FIGS. 2-21.
Figure 23A:
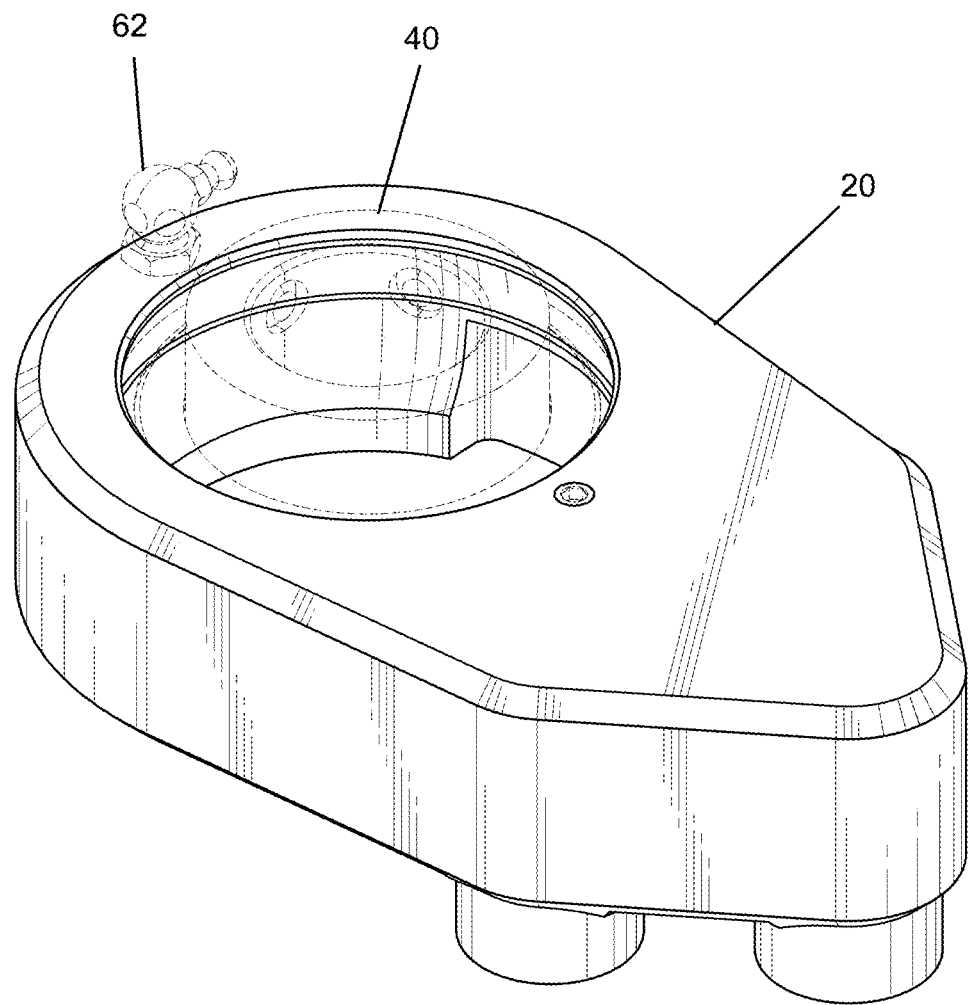
FIG. 23A is a front perspective view of at least one embodiment of the bearing housing as disclosed herein.
Figure 23B:
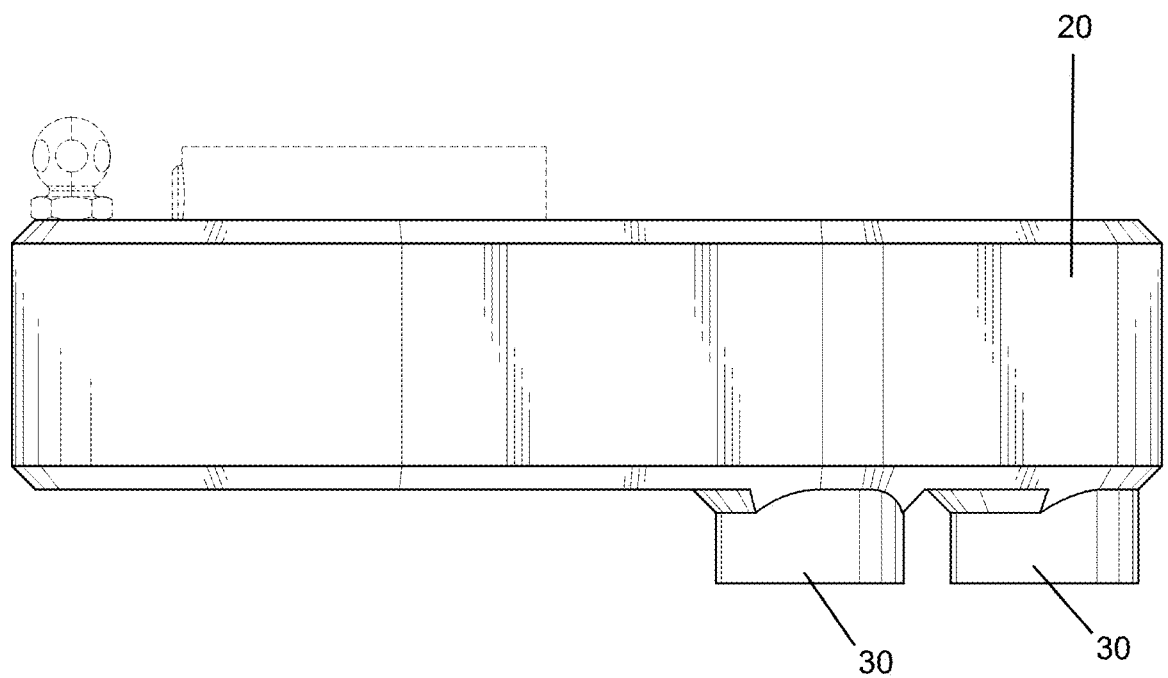
FIG. 23B is a bottom view of the bearing housing illustrated in FIG. 23A.
Figure 23C:
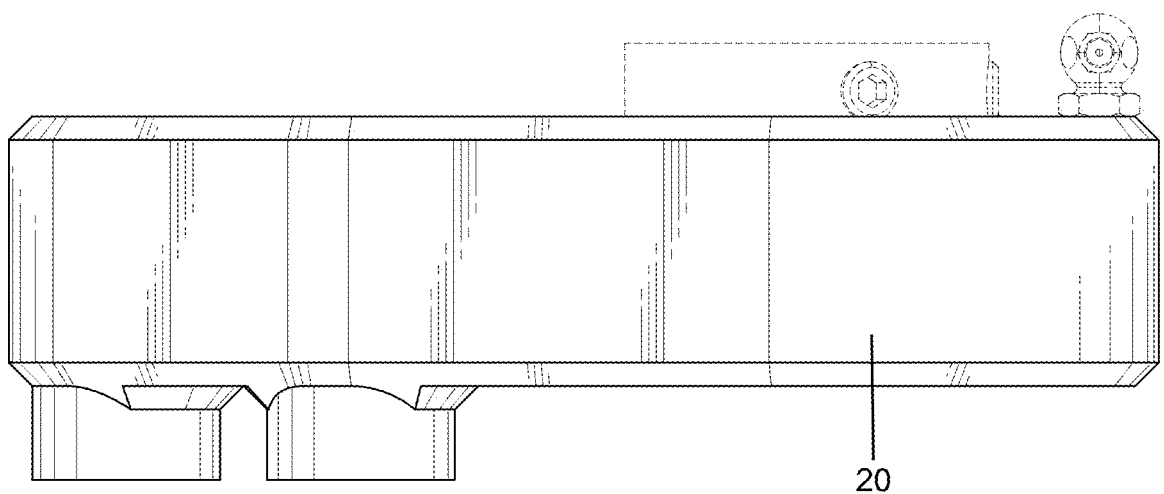
FIG. 23C is a top view of the bearing housing illustrated in FIG. 23A.
Figure 23D:
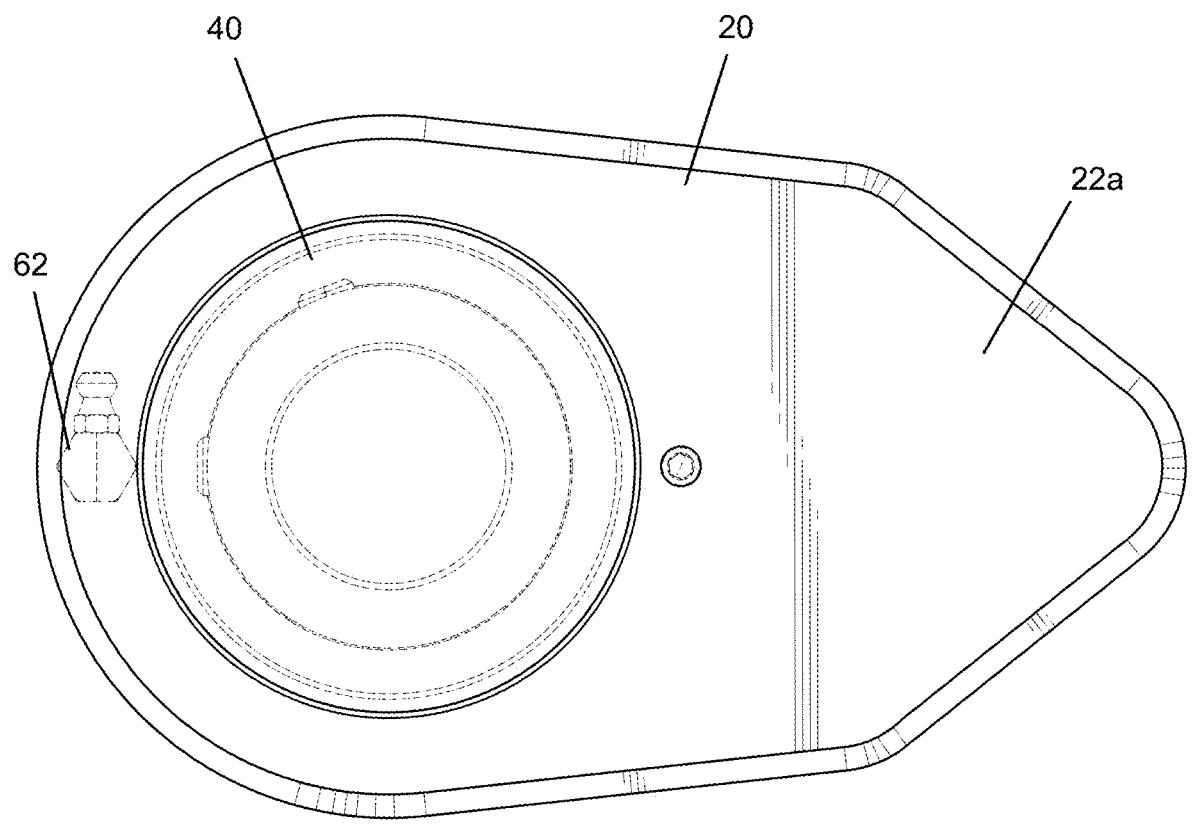
FIG. 23D is a front view of the bearing housing illustrated in FIG. 23A.
Figure 23E:
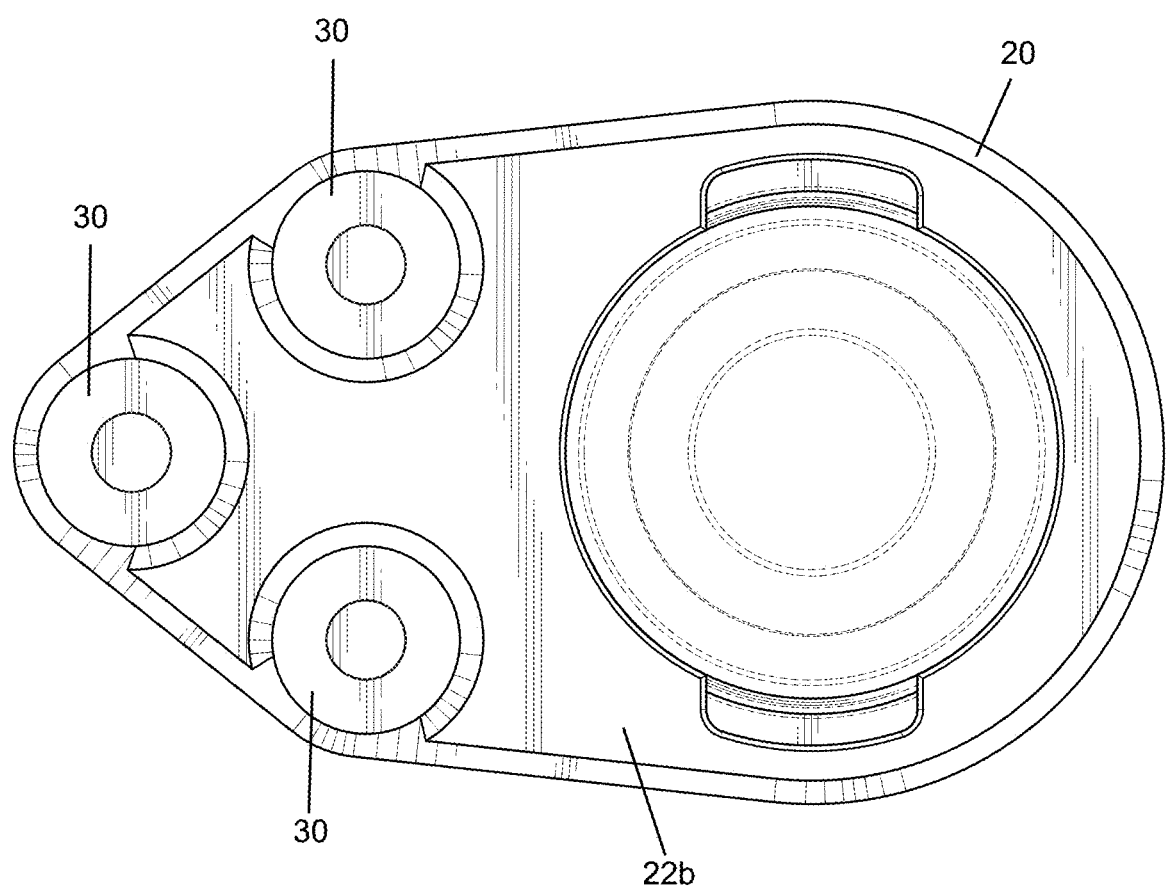
FIG. 23E is a rear view of the bearing housing illustrated in FIG. 23A.
Figure 23F:
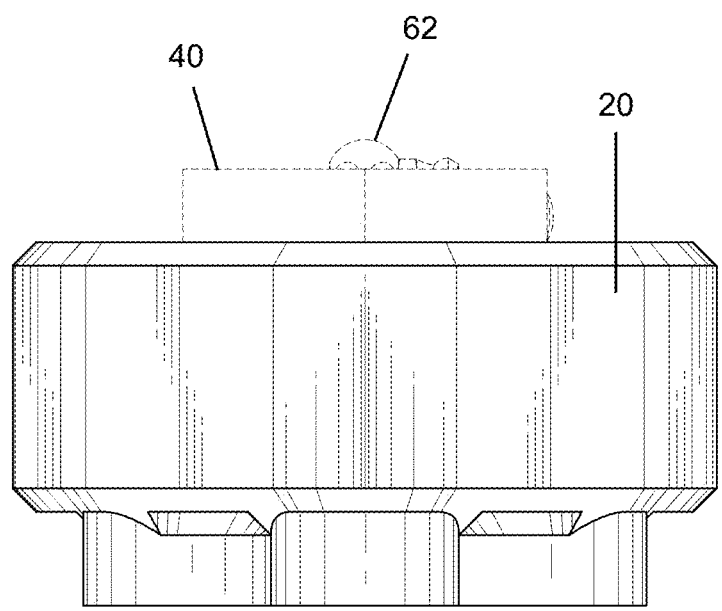
FIG. 23F is a right-side view of the bearing housing illustrated in FIG. 23A.
Figure 23G:
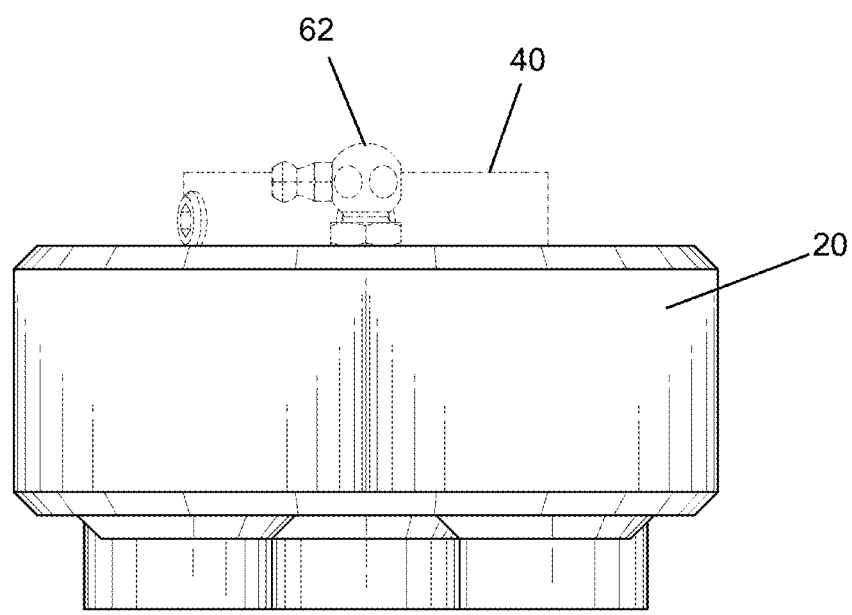
FIG. 23G is a left-side view of the bearing housing illustrated in FIG. 23A.
Figure 23H:
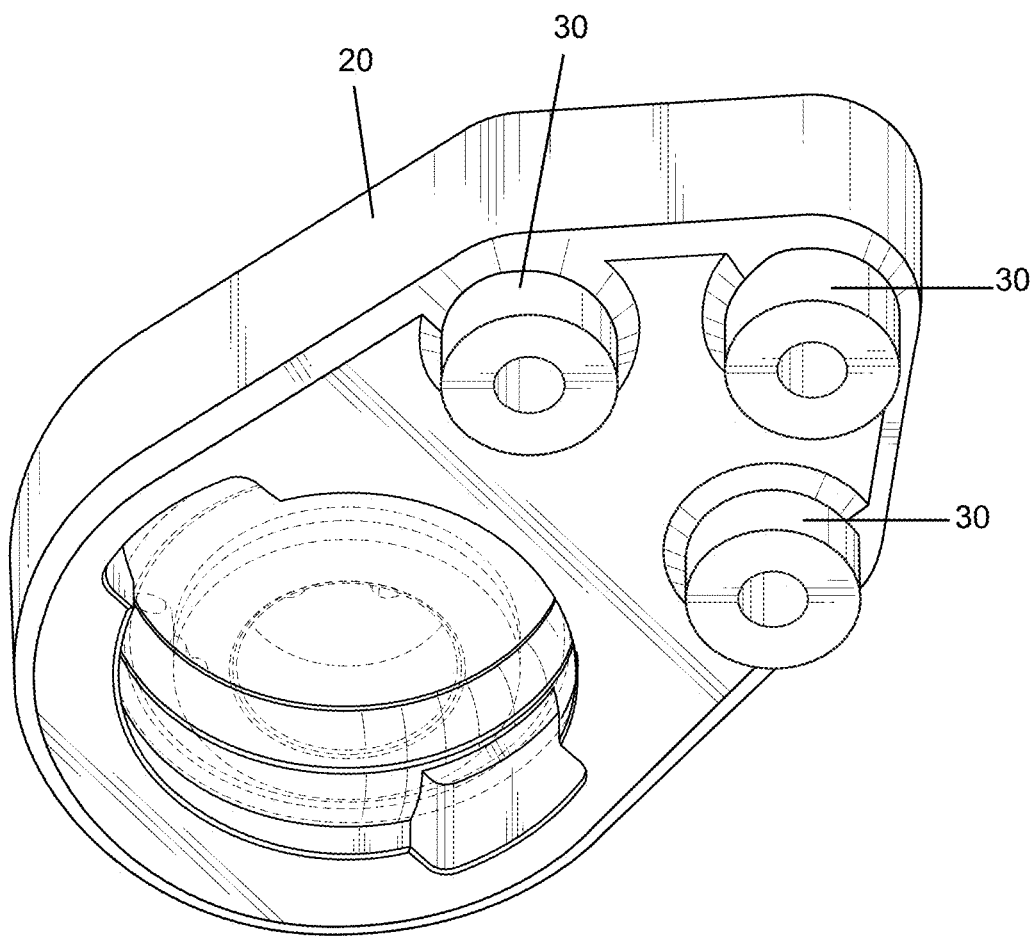
FIG. 23H is a rear perspective view of the bearing housing illustrated in FIG. 23A.
Figure 23I:
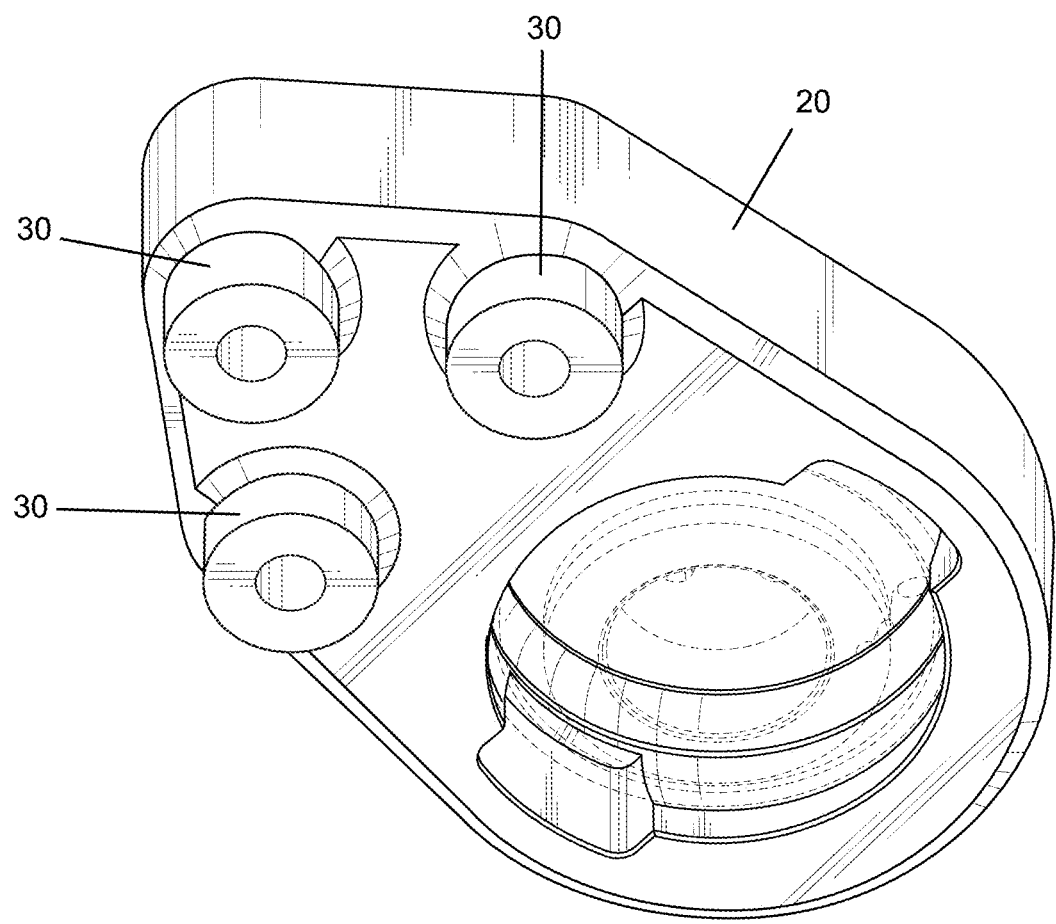
FIG. 23I is another rear perspective view of the bearing housing illustrated in FIG. 23A.
Figure 24A:
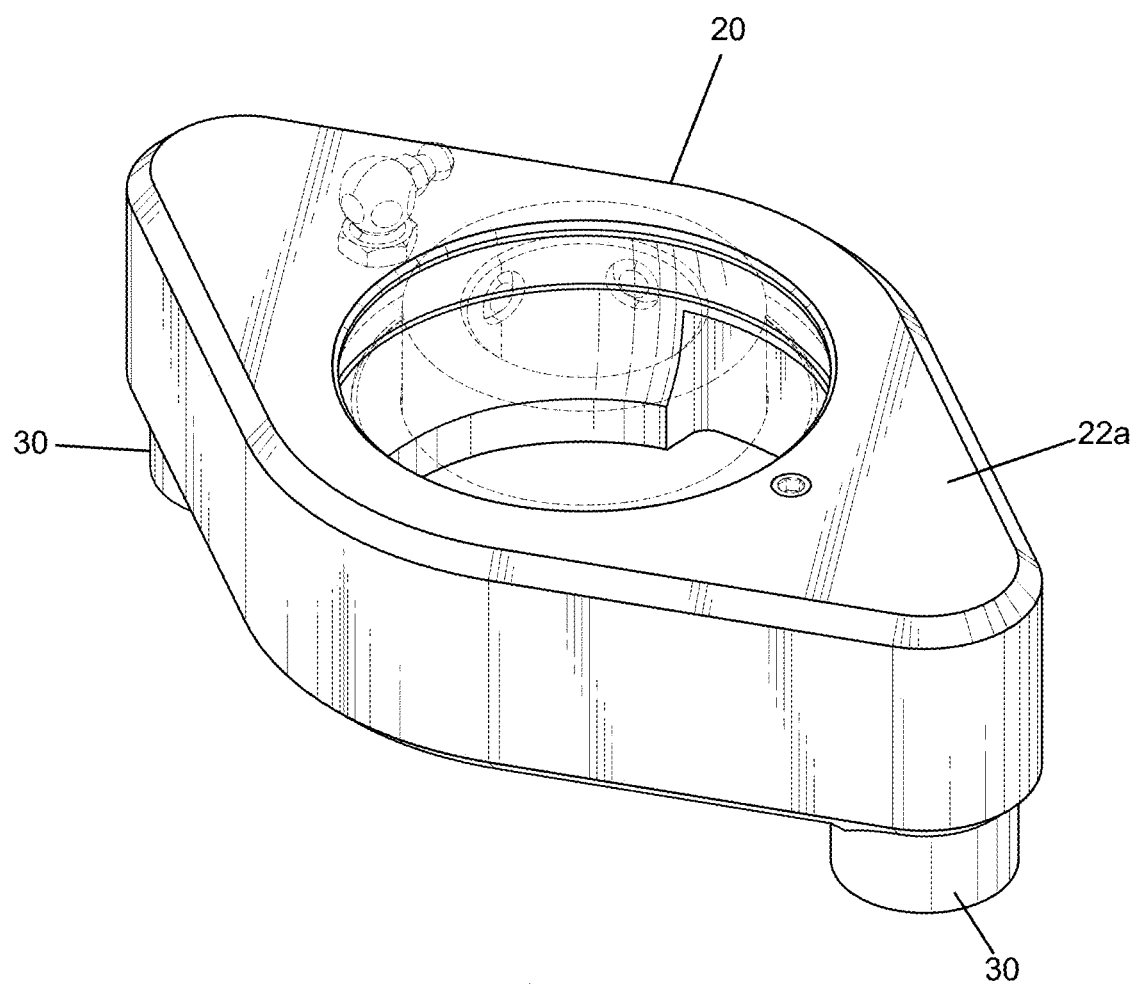
FIG. 24A is a front perspective view of another embodiment of the bearing housing as disclosed herein.
Figure 24B:
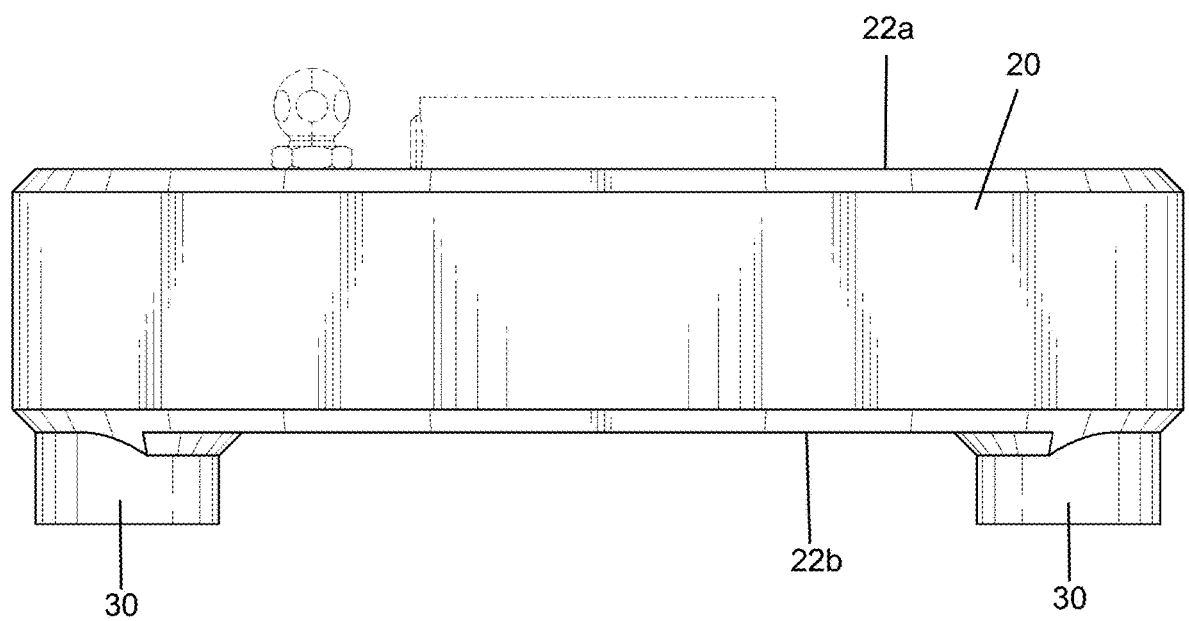
FIG. 24B is a bottom view of the bearing housing illustrated in FIG. 24A.
Figure 24C:
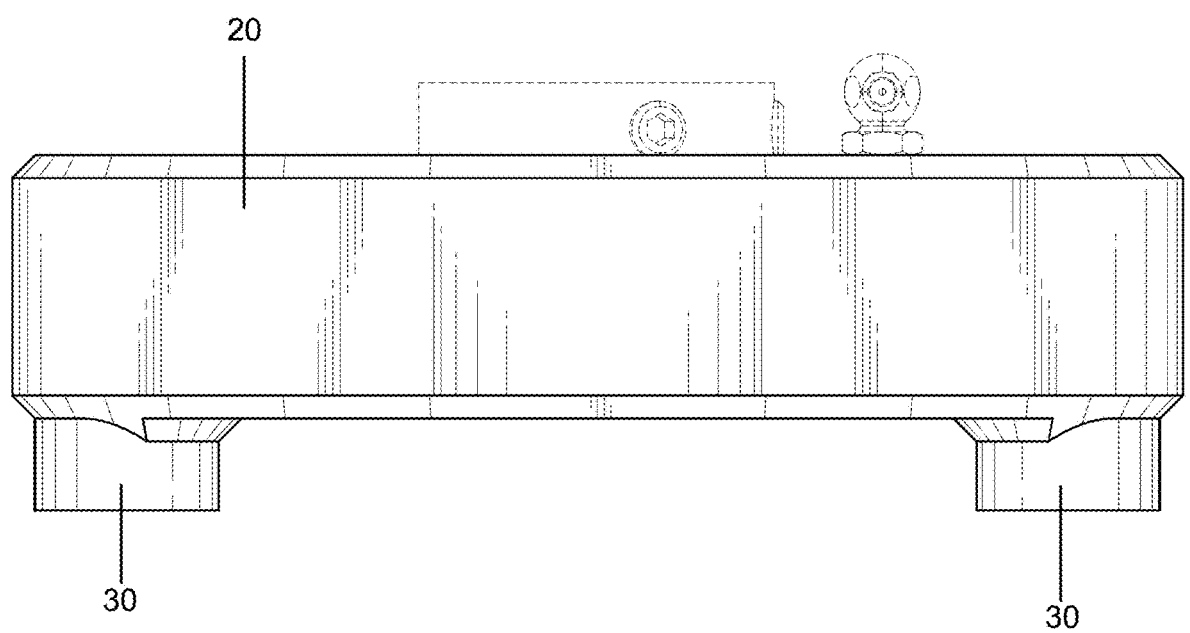
FIG. 24C is a top view of the bearing housing illustrated in FIG. 24A.
Figure 24D:
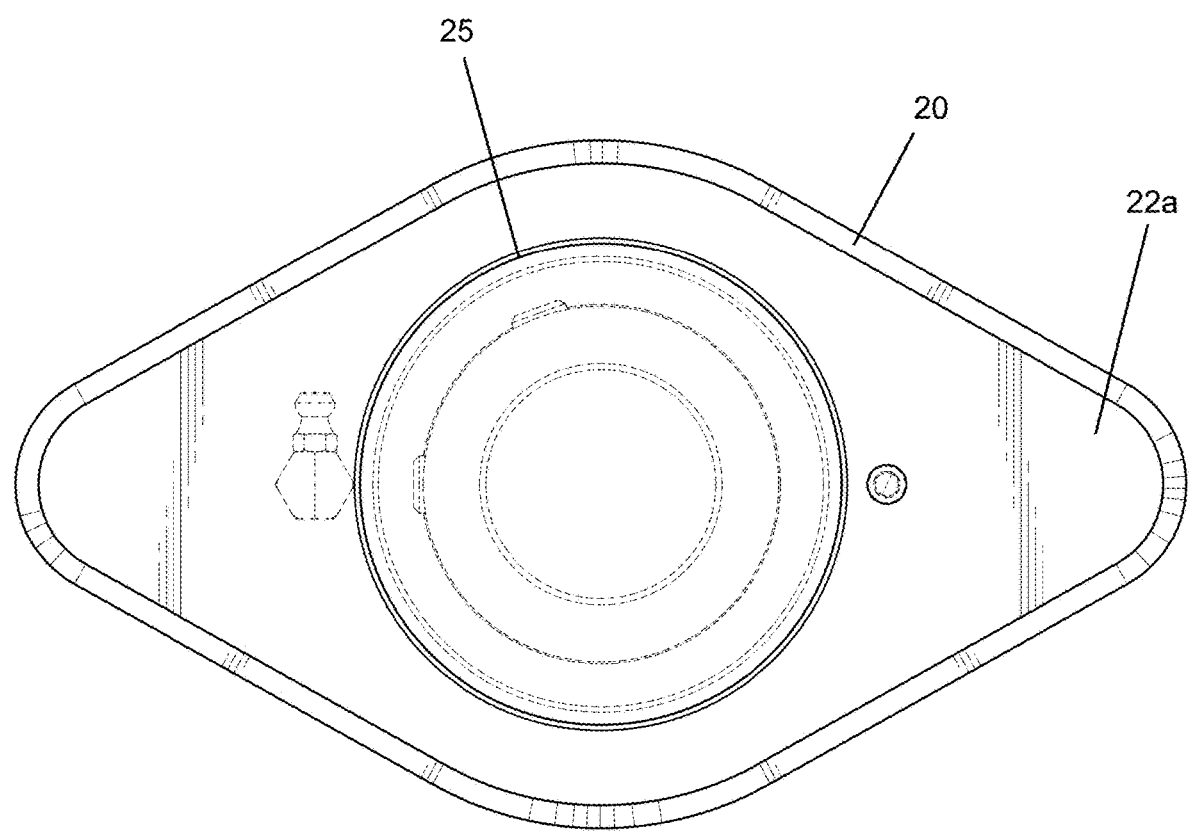
FIG. 24D is a front view of the bearing housing illustrated in FIG. 24A.
Figure 24E:
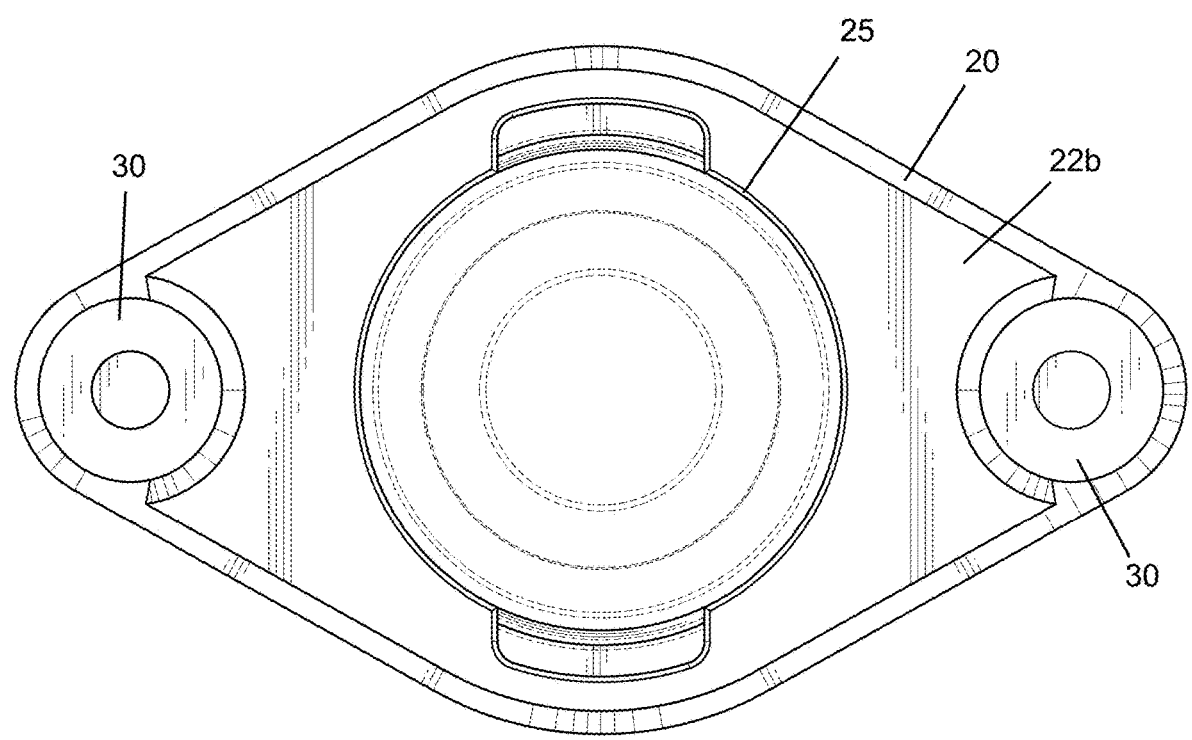
FIG. 24E is a rear view of the bearing housing illustrated in FIG. 24A.
Figure 24F:
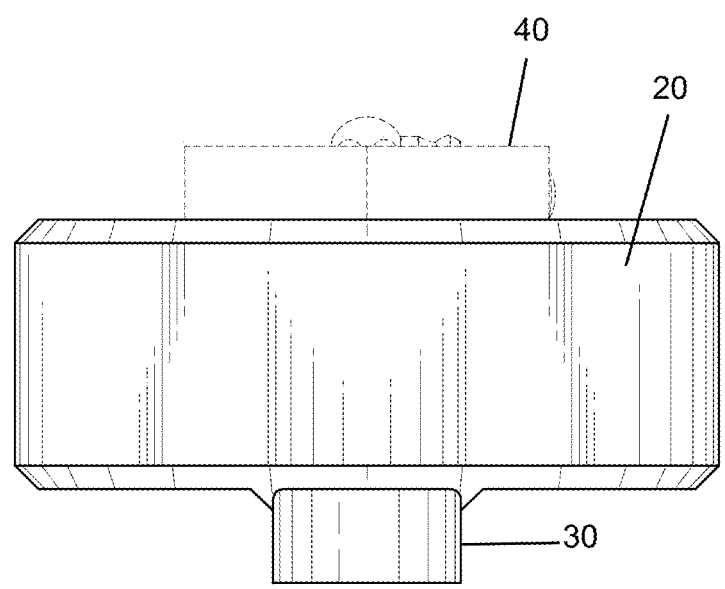
FIG. 24F is a right-side view of the bearing housing illustrated in FIG. 24A.
Figure 24G:
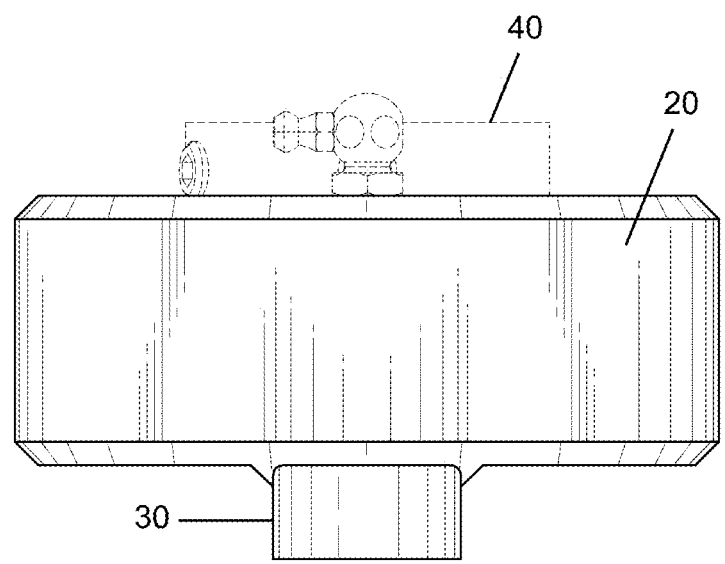
FIG. 24G is a left-side view of the bearing housing illustrated in FIG. 24A.
Figure 24H:
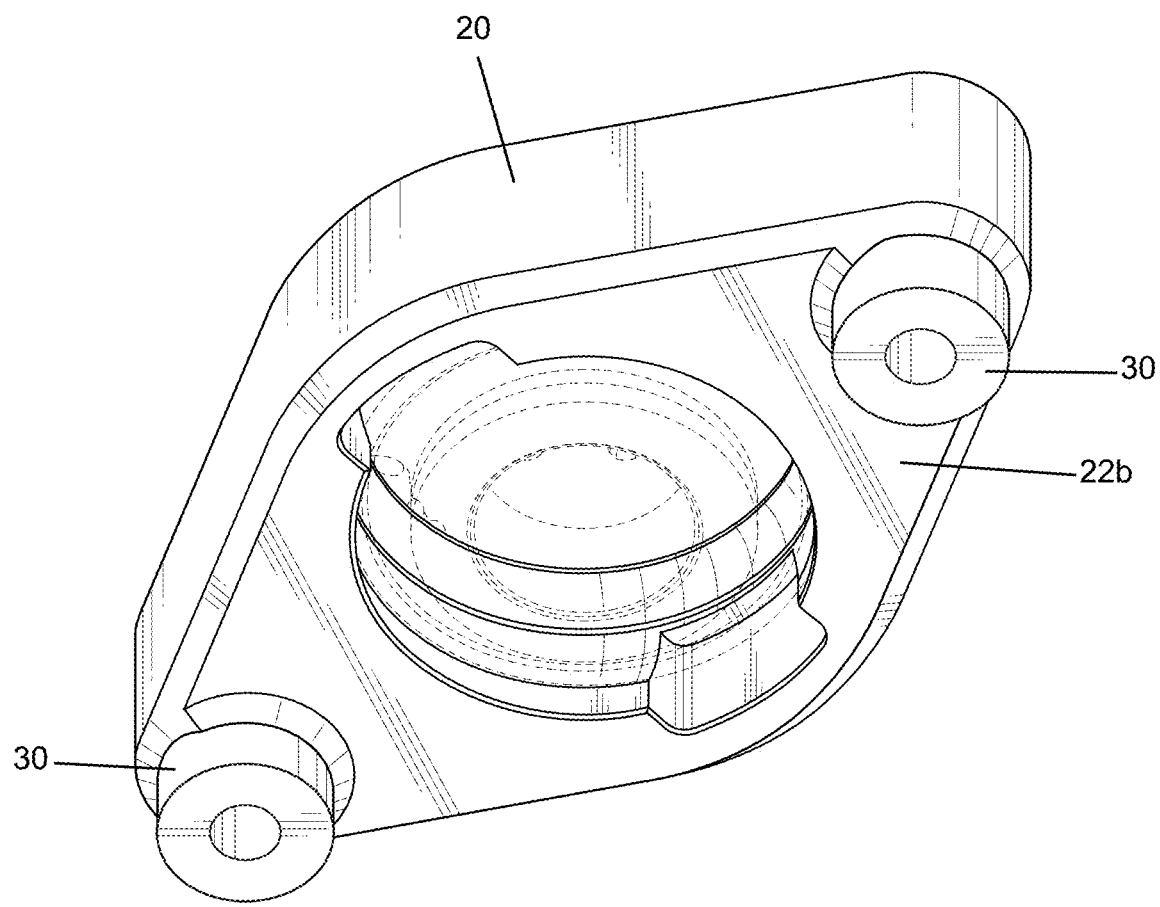
FIG. 24H is a rear perspective view of the bearing housing illustrated in FIG. 24A.
Figure 24I:
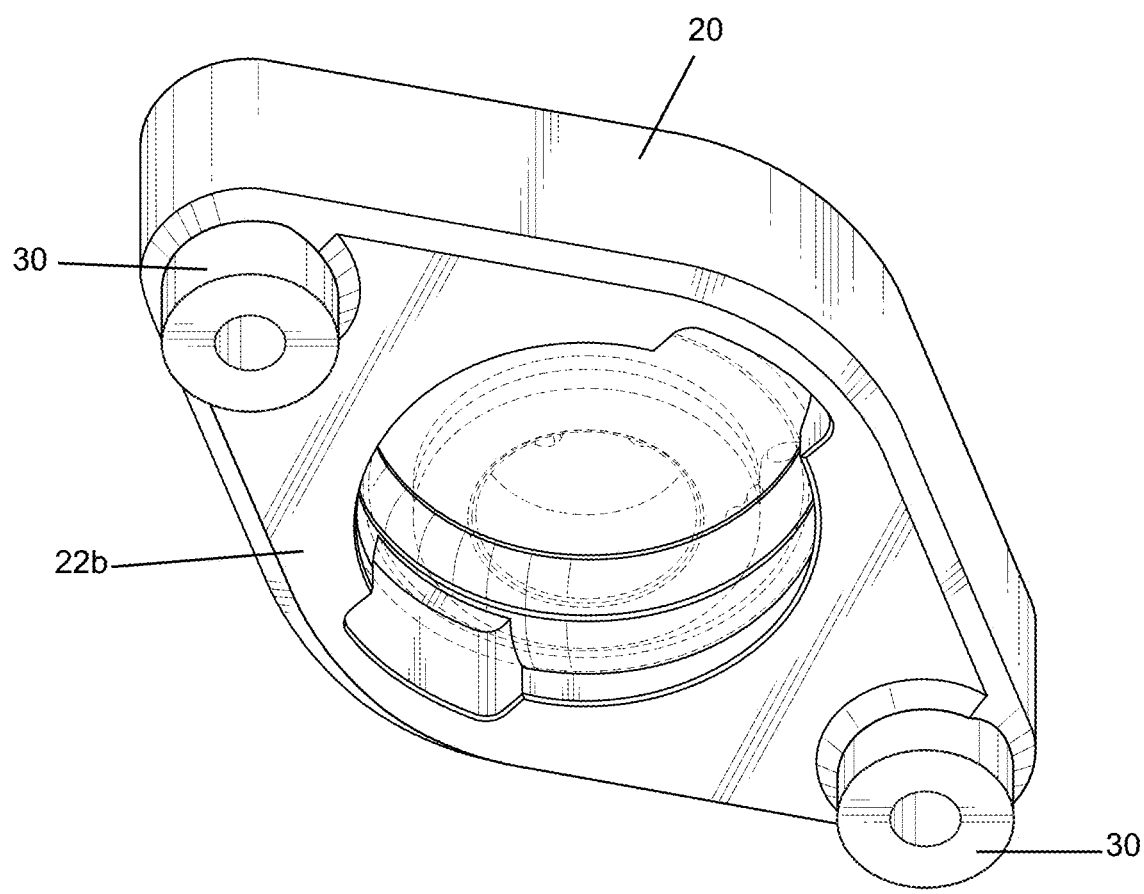
FIG. 24I is another rear perspective view of the bearing housing illustrated in FIG. 24A.
Figure 25A:
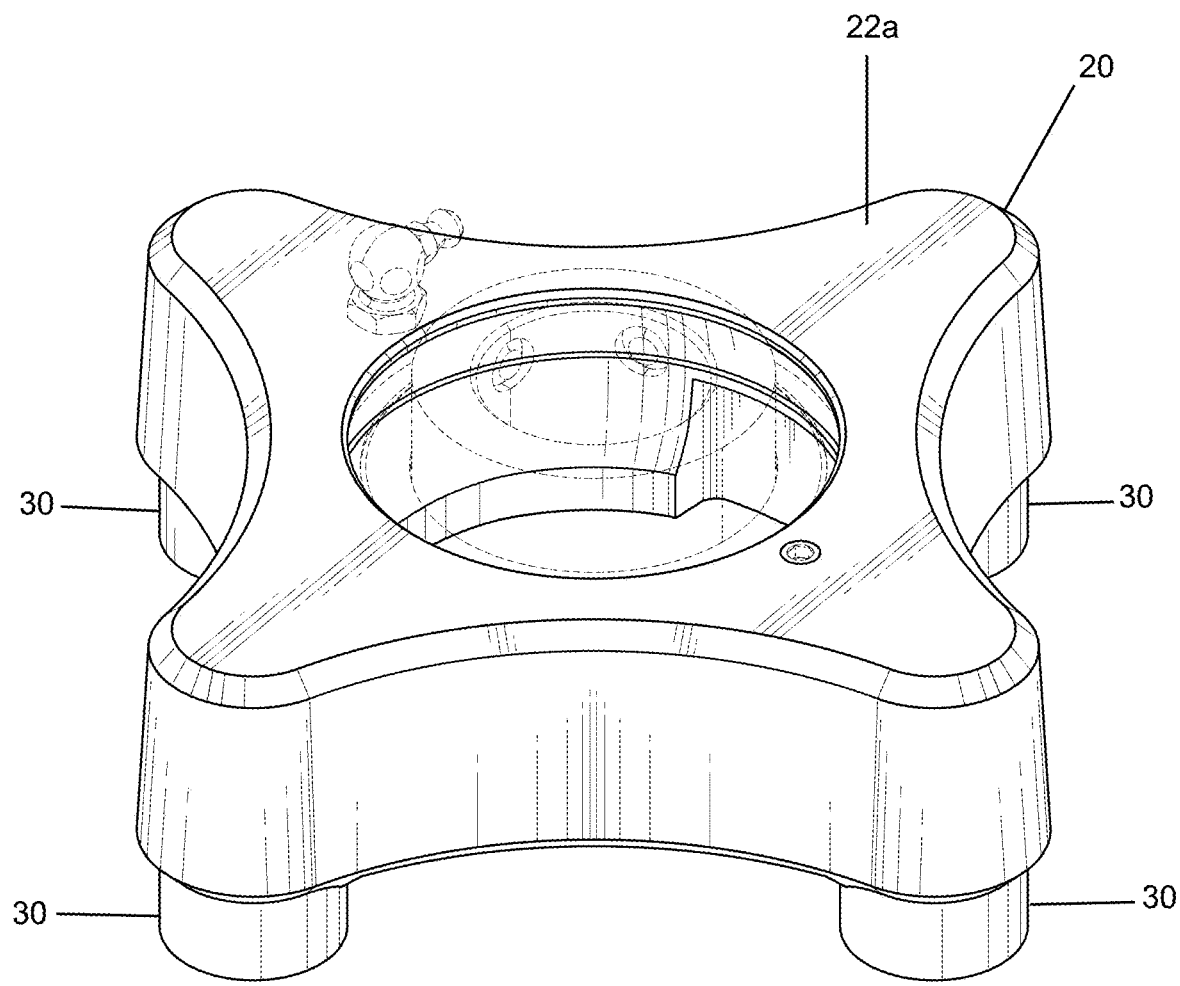
FIG. 25A is a front perspective view of at least one embodiment of the bearing housing as disclosed herein.
Figure 25B:
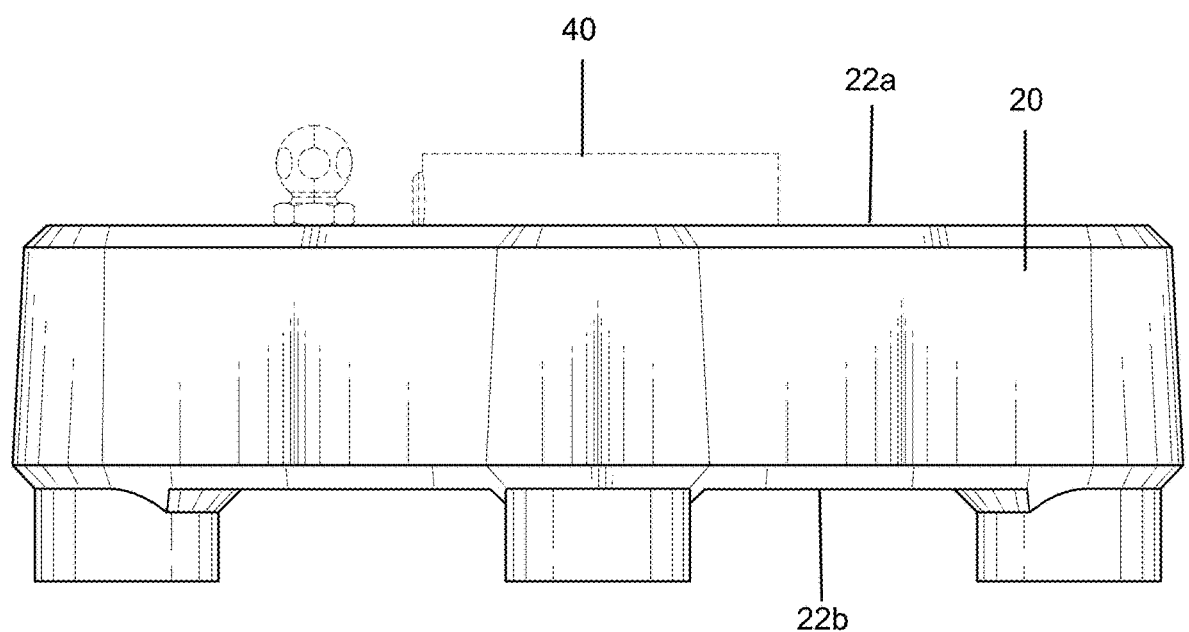
FIG. 25B is a bottom view of the bearing housing illustrated in FIG. 25A.
Figure 25C:
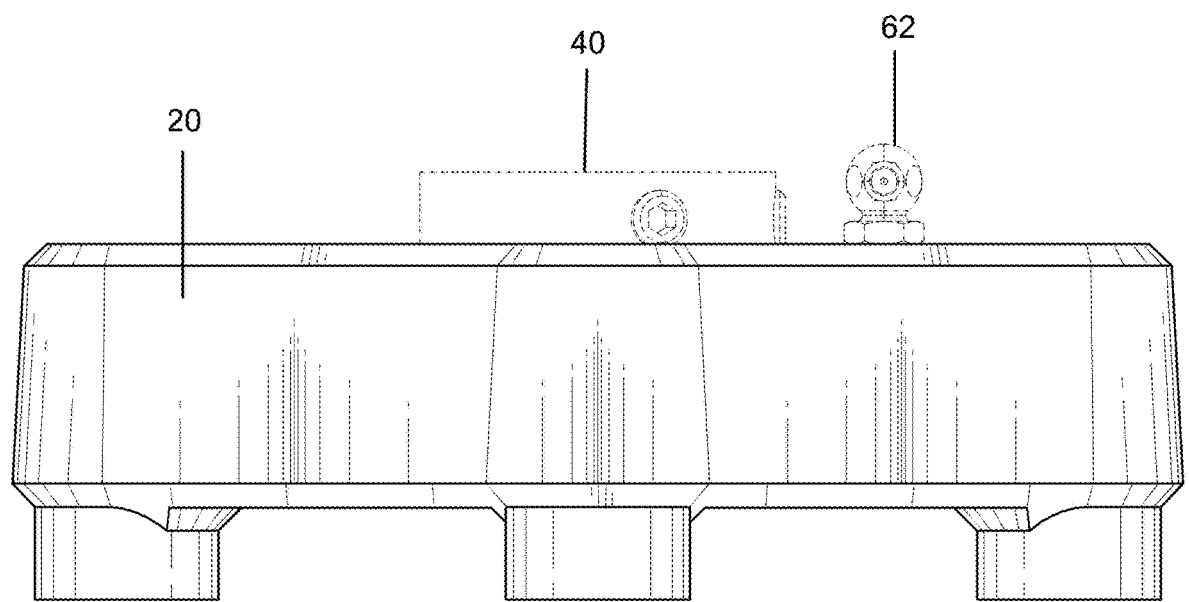
FIG. 25C is a top view of the bearing housing illustrated in FIG. 25A.
Figure 25D:
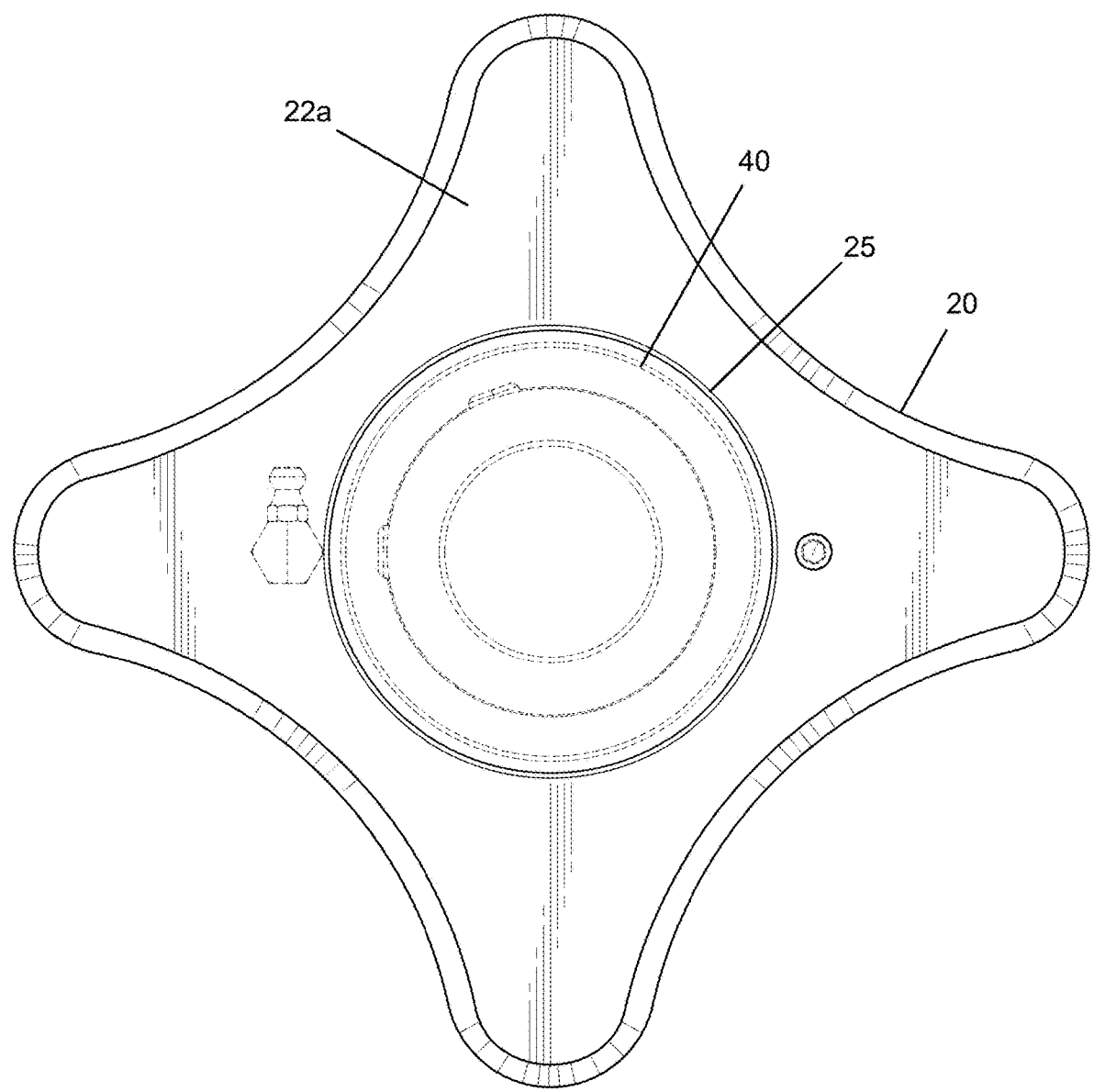
FIG. 25D is a front view of the bearing housing illustrated in FIG. 25A.
Figure 25E:
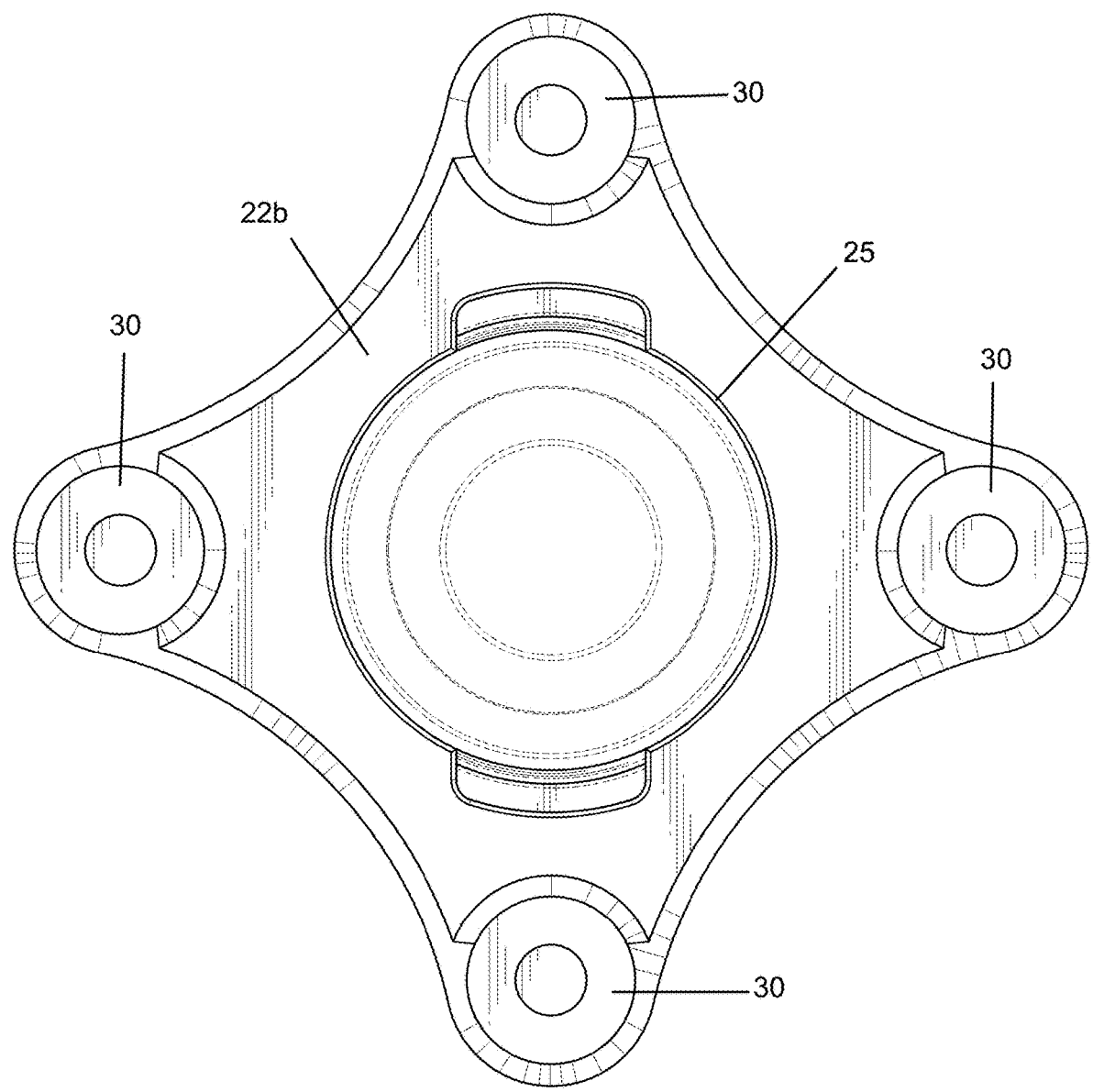
FIG. 25E is a rear view of the bearing housing illustrated in FIG. 25A.
Figure 25F:
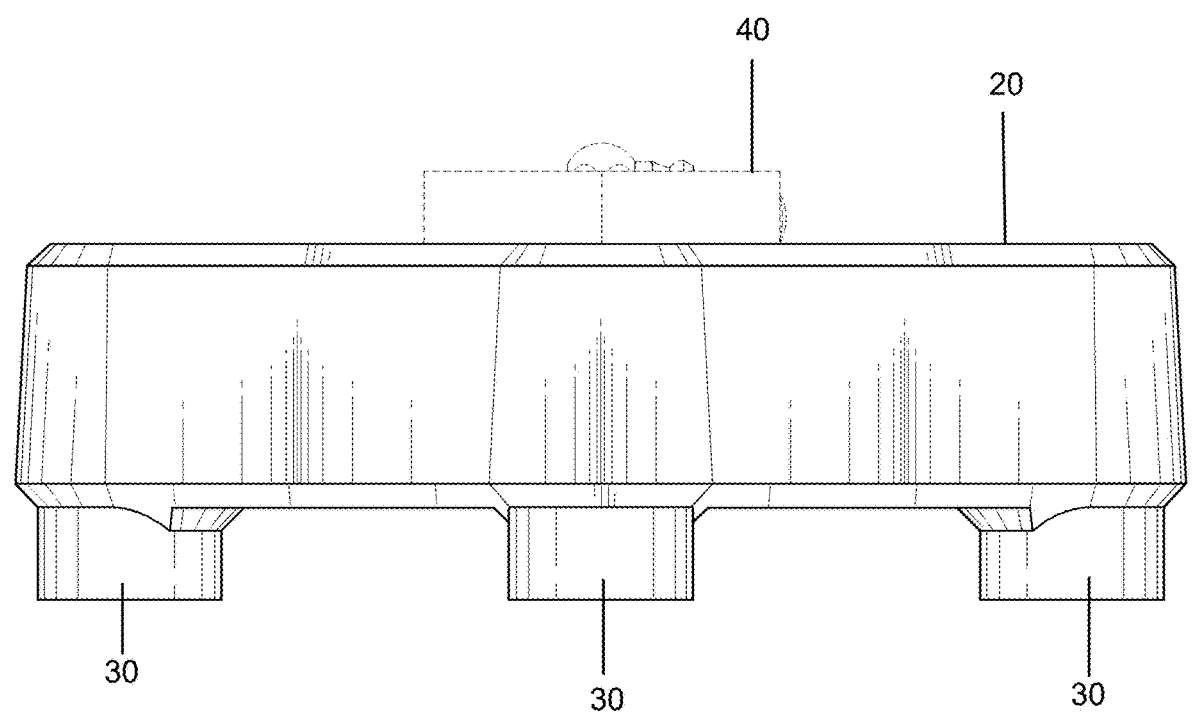
FIG. 25F is a right-side view of the bearing housing illustrated in FIG. 25A.
Figure 25G:
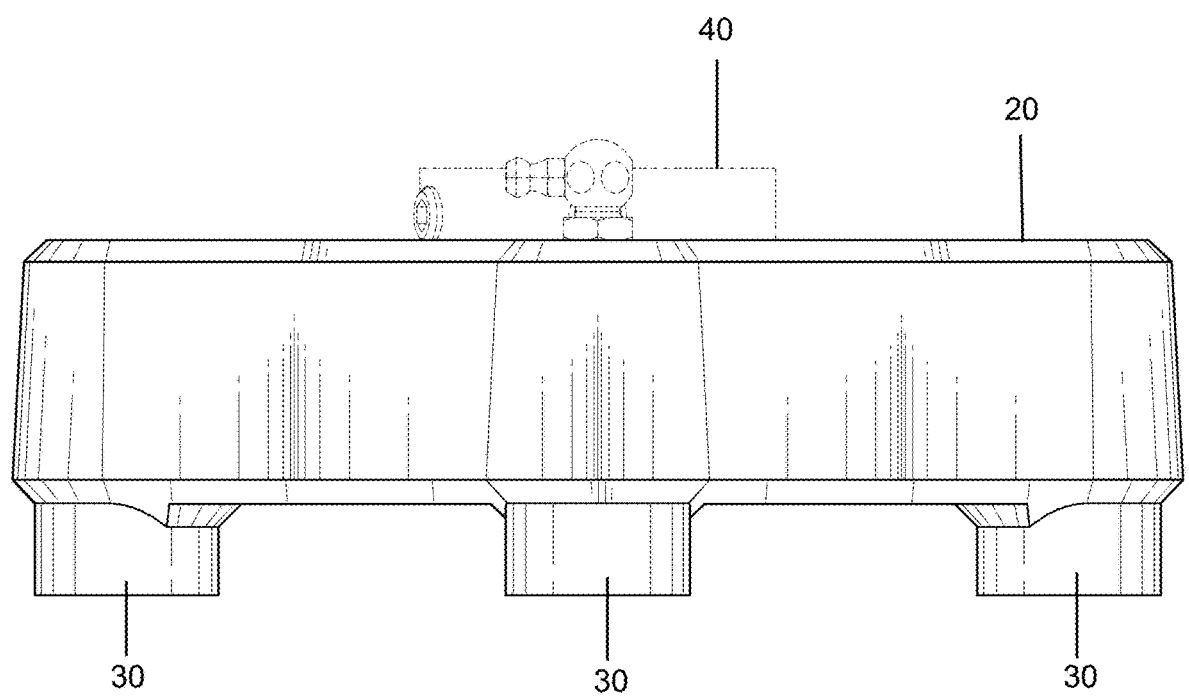
FIG. 25G is a left-side view of the bearing housing illustrated in FIG. 25A.
Figure 25H:
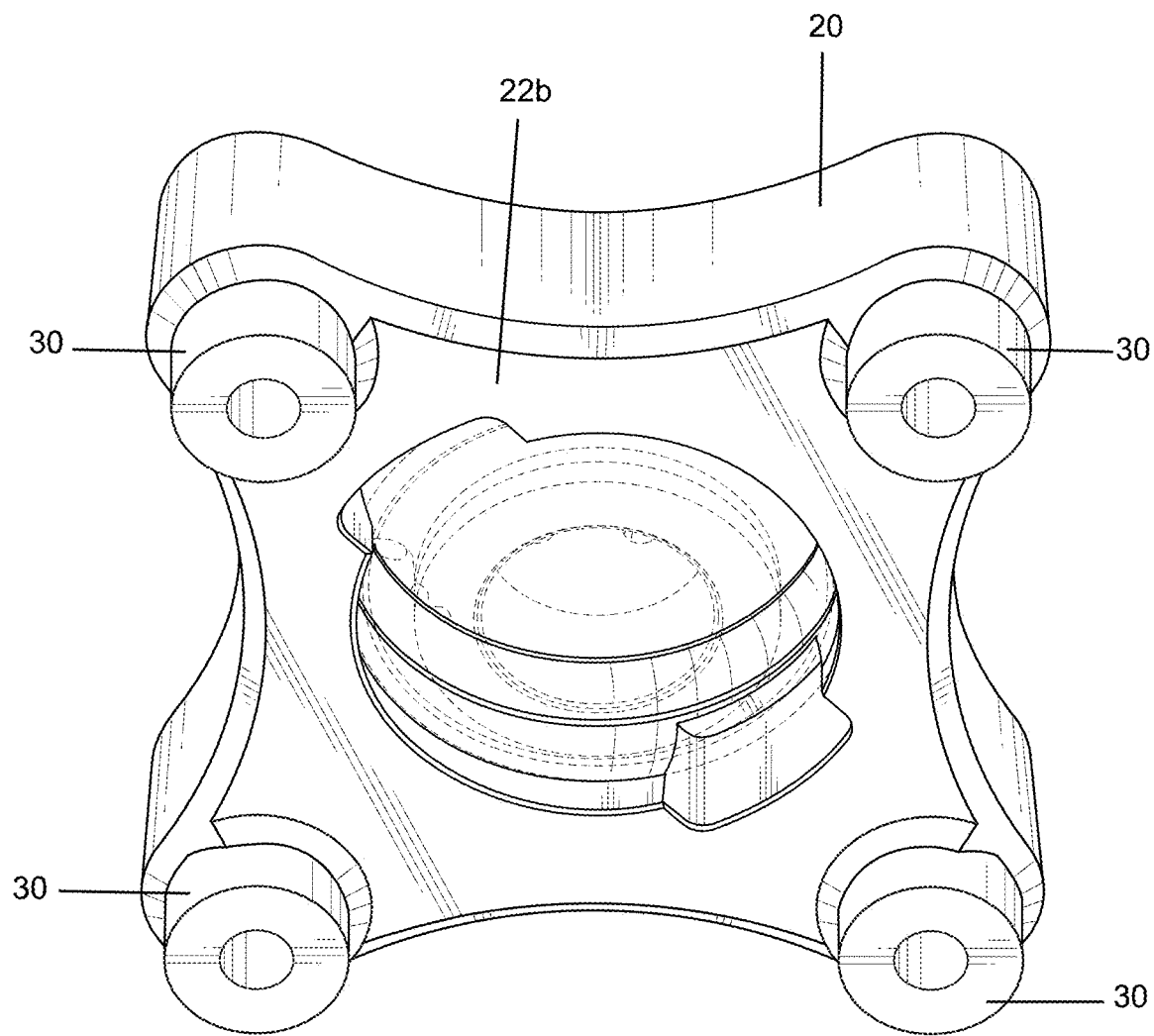
FIG. 25H is a rear perspective view of the bearing housing illustrated in FIG. 25A.
Figure 25I:
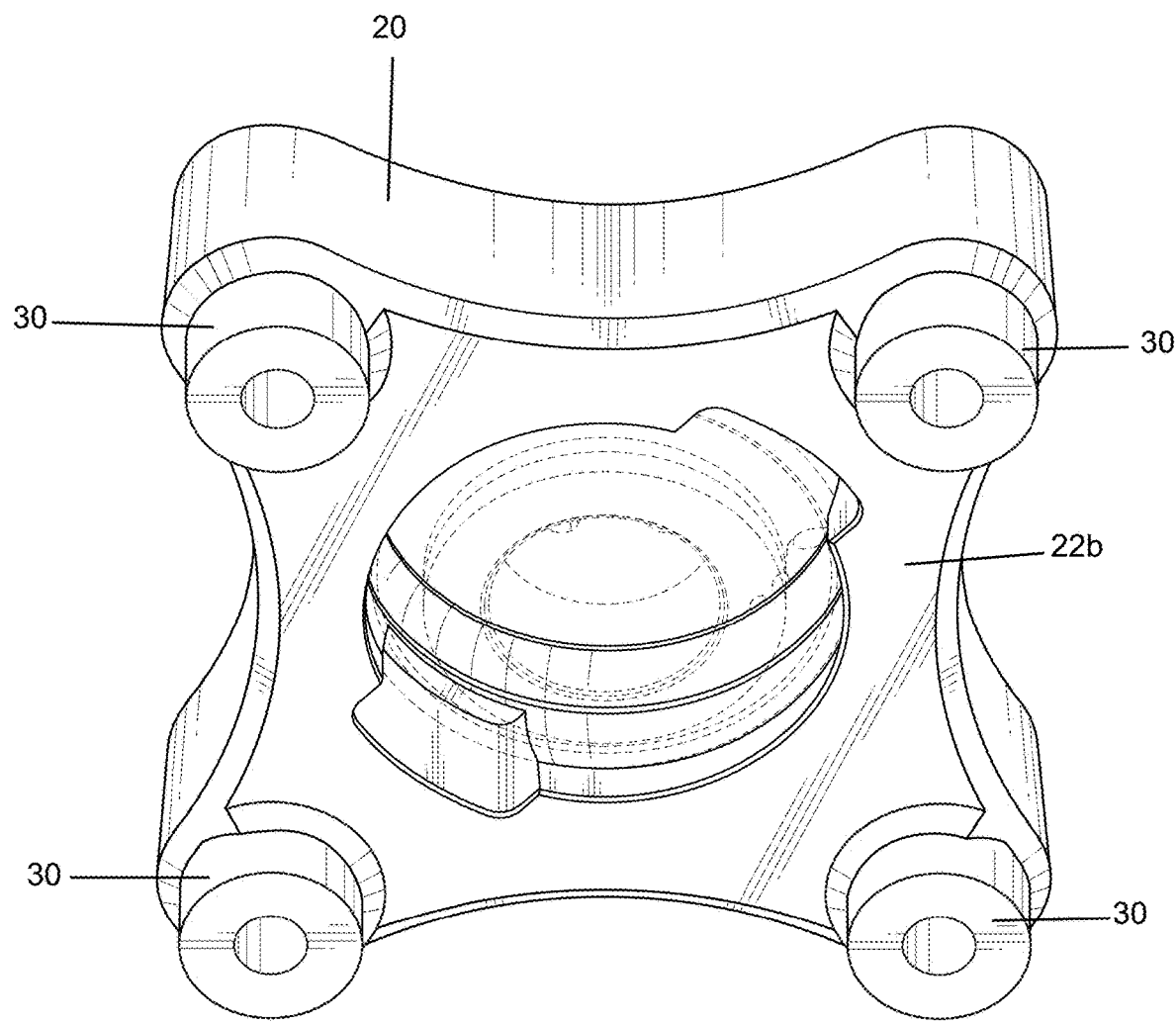
FIG. 25I is another rear perspective view of the bearing housing illustrated in FIG. 25A.
Figure 26A:
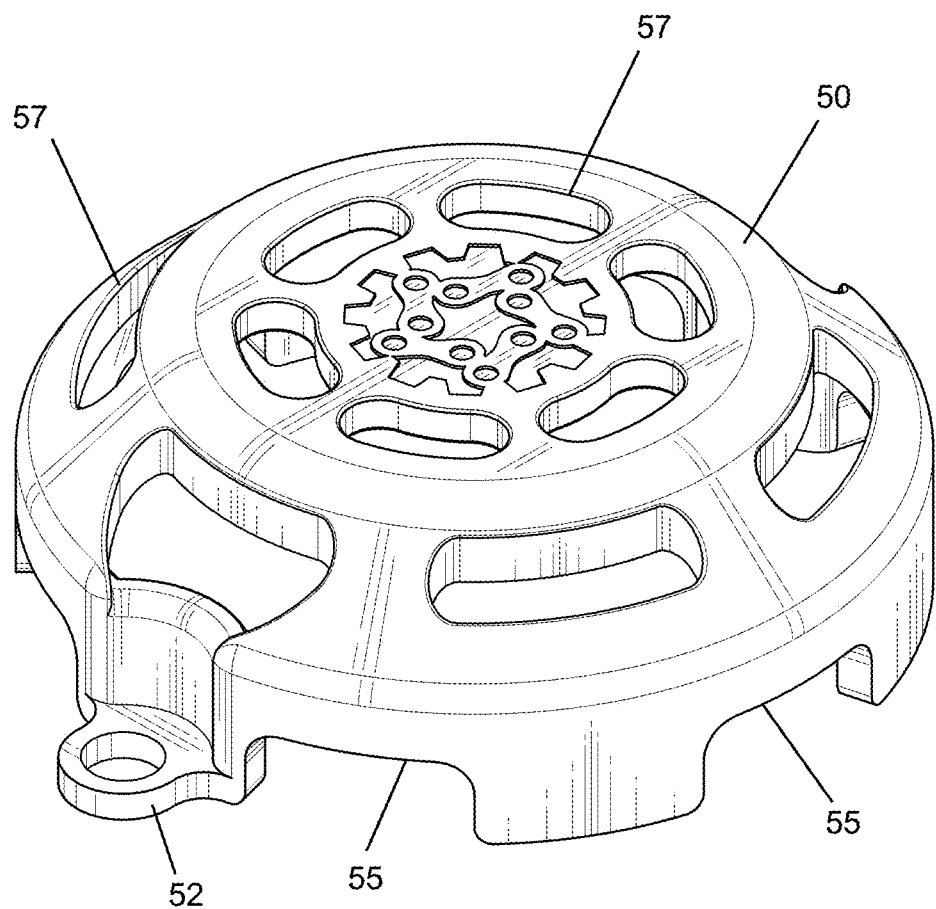
FIG. 26A is a top perspective view of the cover as disclosed in accordance with at least one embodiment of the present invention.
Figure 26B:
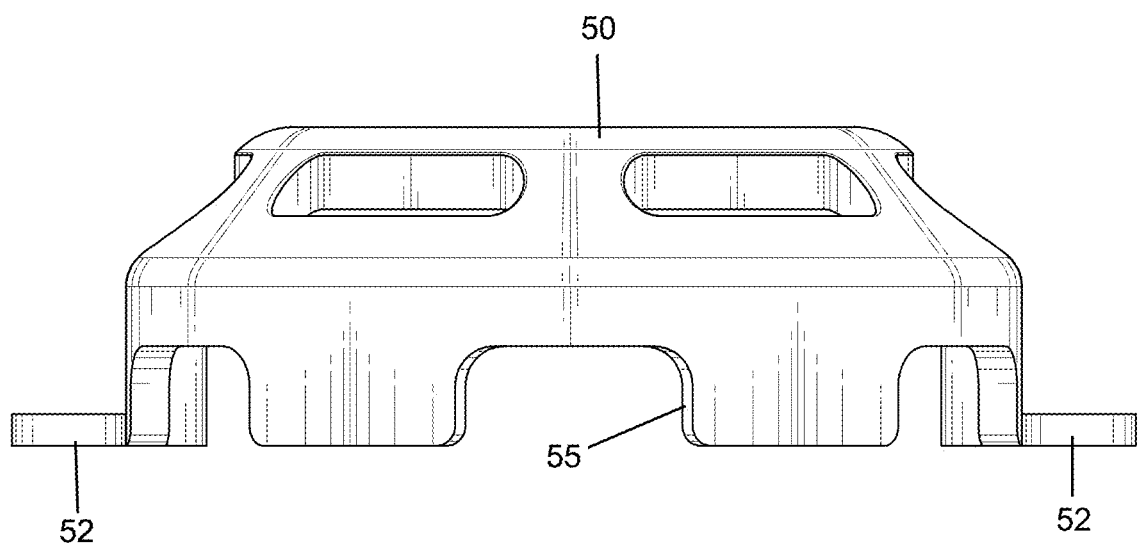
FIG. 26B is a front view of the cover illustrated in FIG. 26A.
Figure 26C:
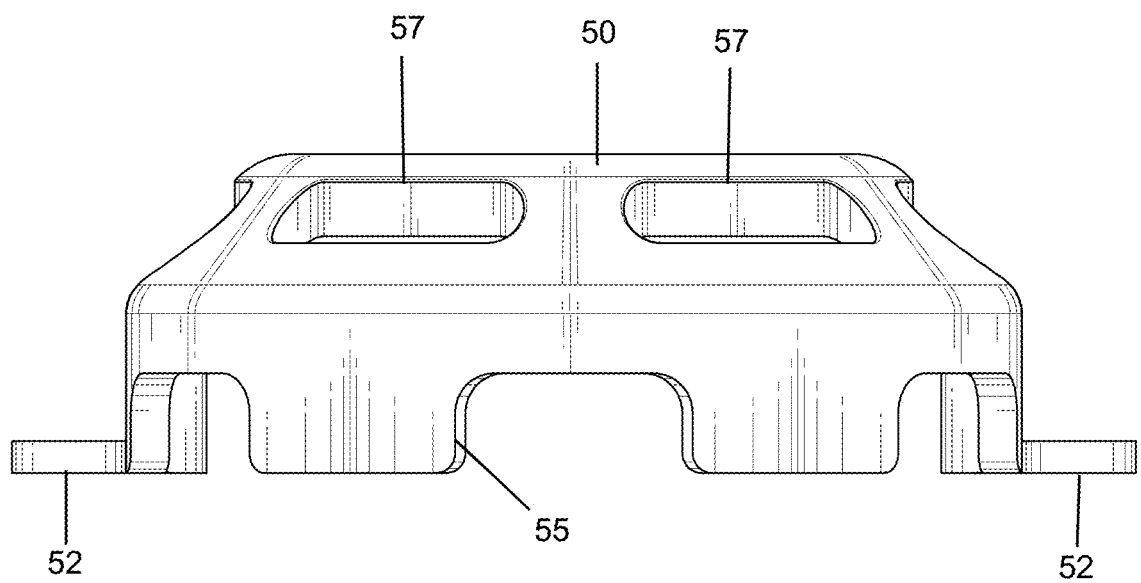
FIG. 26C is a rear view of the cover illustrated in FIG. 26A.
Figure 26D:
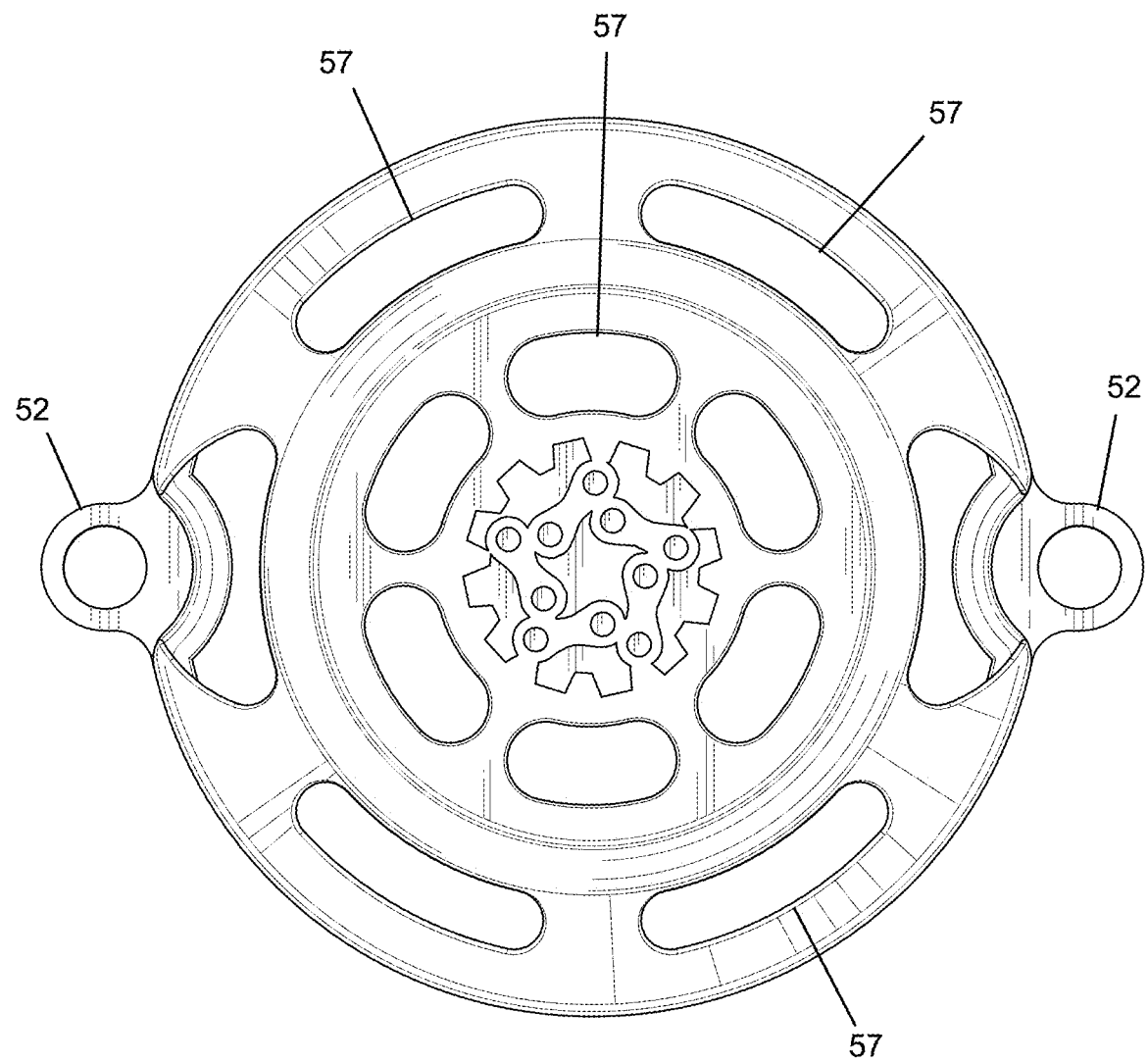
FIG. 26D is a top view of the cover illustrated in FIG. 26A.
Figure 26E:
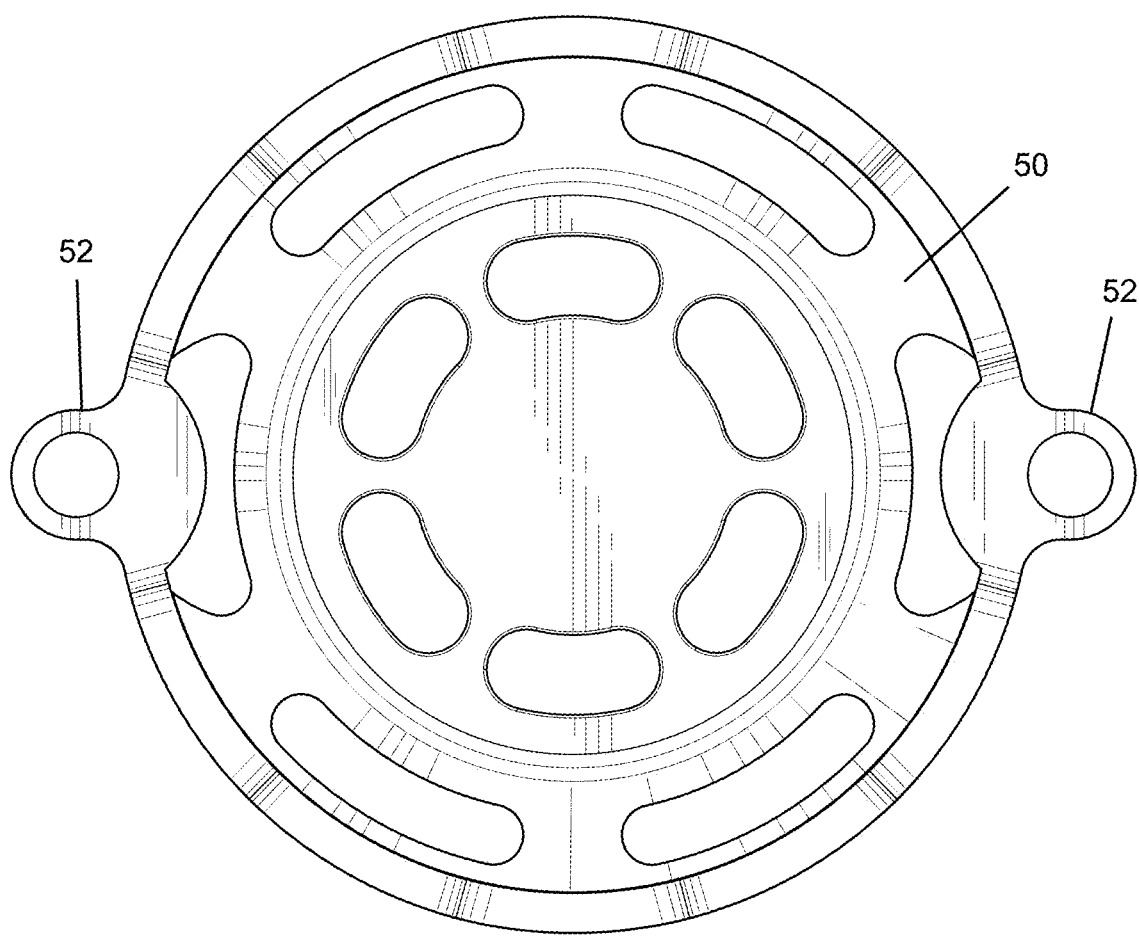
FIG. 26E is a bottom view of the cover illustrated in FIG. 26A.
Figure 26F:
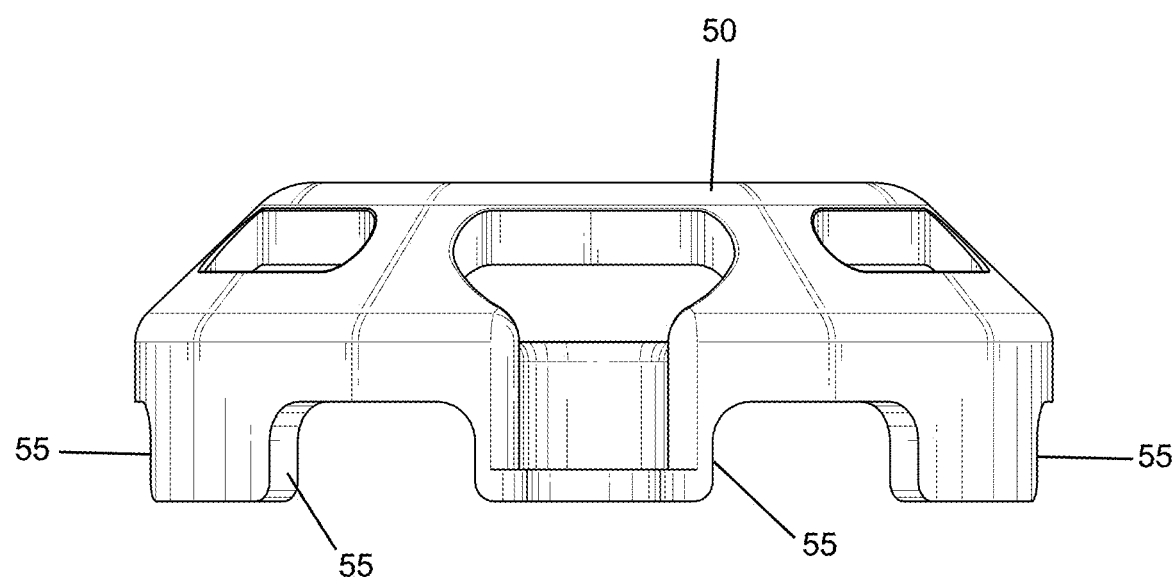
FIG. 26F is a left-side view of the cover illustrated in FIG. 26A.
Figure 26G:
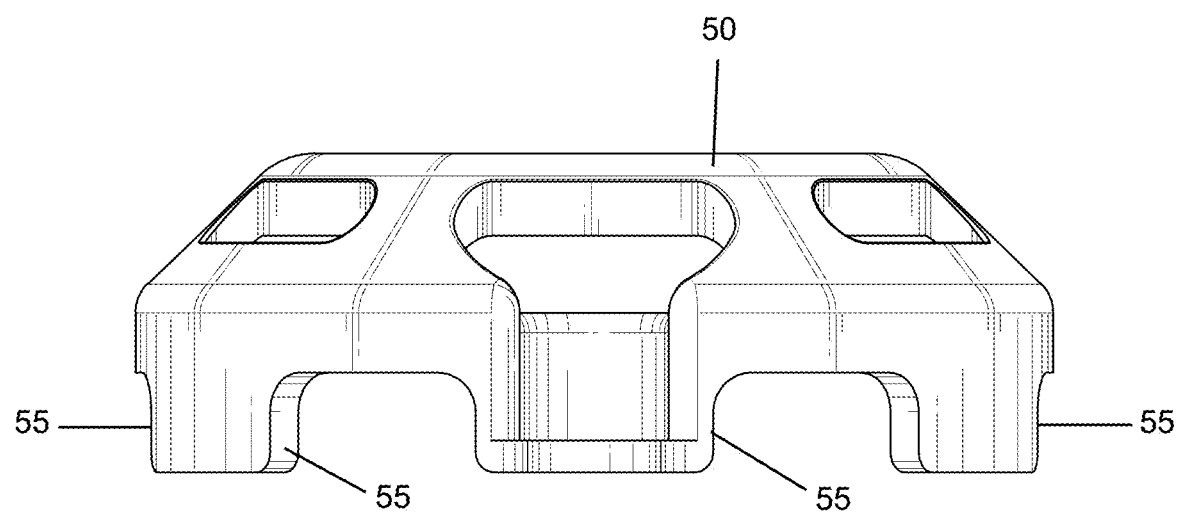
FIG. 26G is a right-side view of the cover illustrated in FIG. 26A.
Figure 26H:
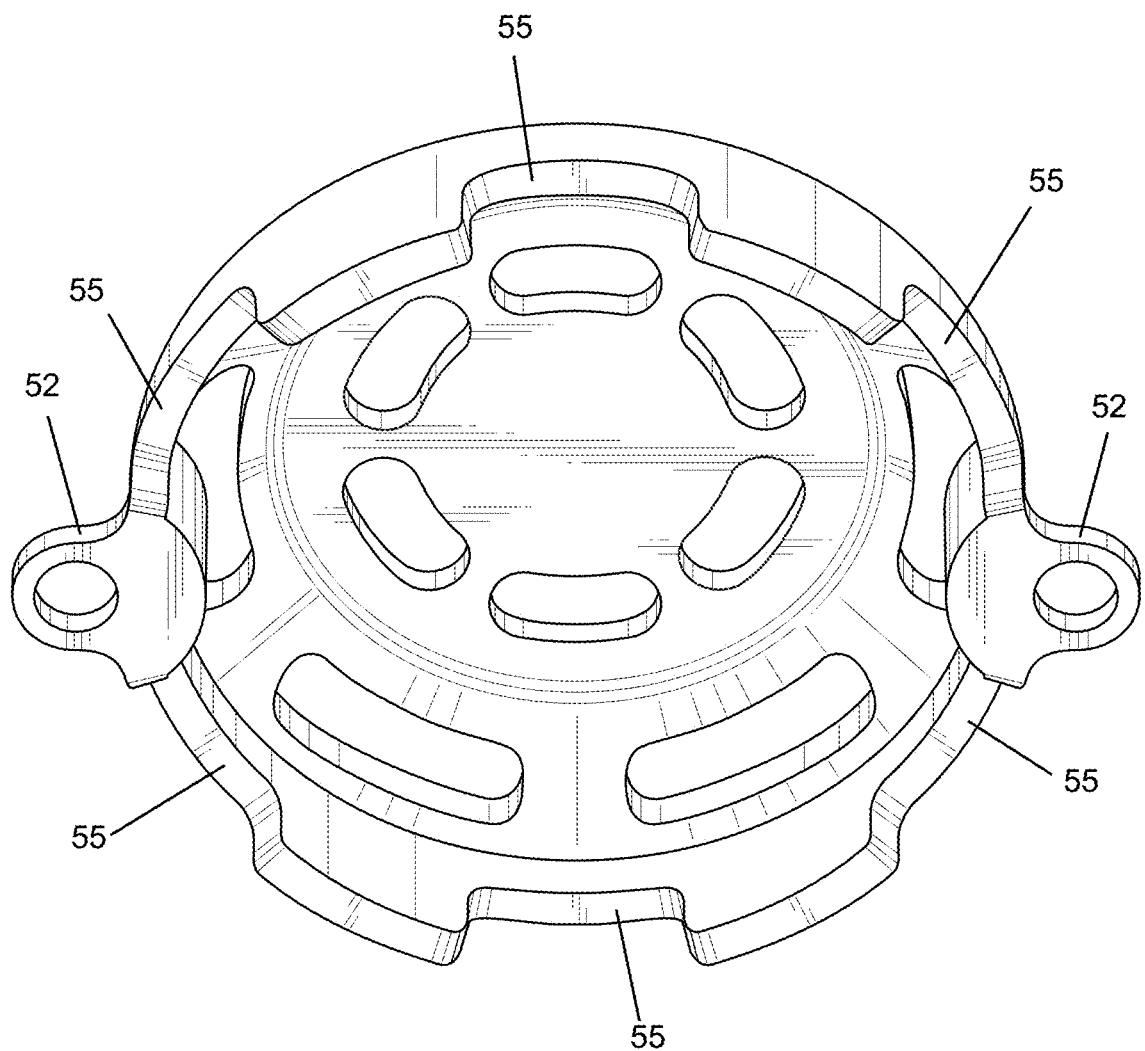
FIG. 26H is a bottom perspective view of the cover illustrated in FIG. 26A.

With reference to FIGS. 18, 19 and 20, the second or rear surface 22b of the housing 20 is shown, as well as the integral or fixed spacers 30 extending therefrom. In addition, at least one of the spacers 30, or as shown, all of the spacers 30 include a mounting bore or hole 35 disposed there through. The mounting bore(s) or hole(s) 35 of at least one embodiment is/are blind holes and in some cases blind tapped hole(s) that extend through the corresponding spacer(s) 30 and in some embodiments partially into the body of the housing 20; however, as shown, in at least one embodiment, the bore(s) 35 do not extend all the way through the housing 20. In other words, the bore(s) 35 of at least one embodiment do not extend through the surface 22a of the housing 20.

For example, the term "blind hole" or "blind holes" as used herein is a hole or bore which is formed only partially through the thickness of the material, or in other words, includes an end that does not reach or extend all the way to the other side of the material. A "tapped hole" is a hole or bore in which the inside surface is formed with threads such that a fastener such as a screw or bolt can be screwed or threaded therein. In this manner, a "blind tapped hole" is a hole or bore which is formed only partially through the thickness of the material and which has an inside surface formed with threads such that a fastener can be threaded or screwed therein.

Figure 3:
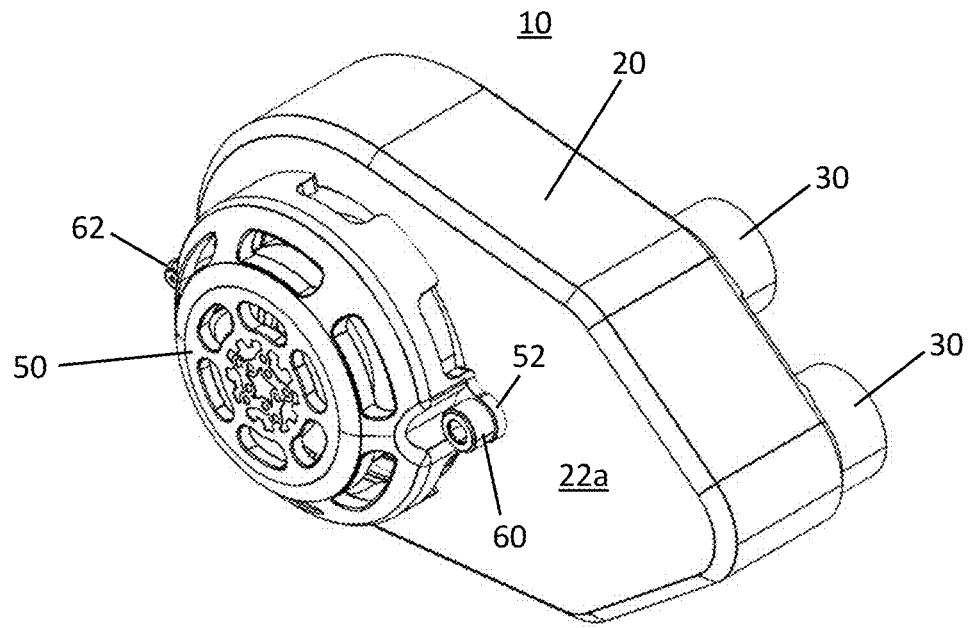
FIG. 3 is a front perspective view of the bearing assembly illustrated in FIG. 2.
Figure 4:
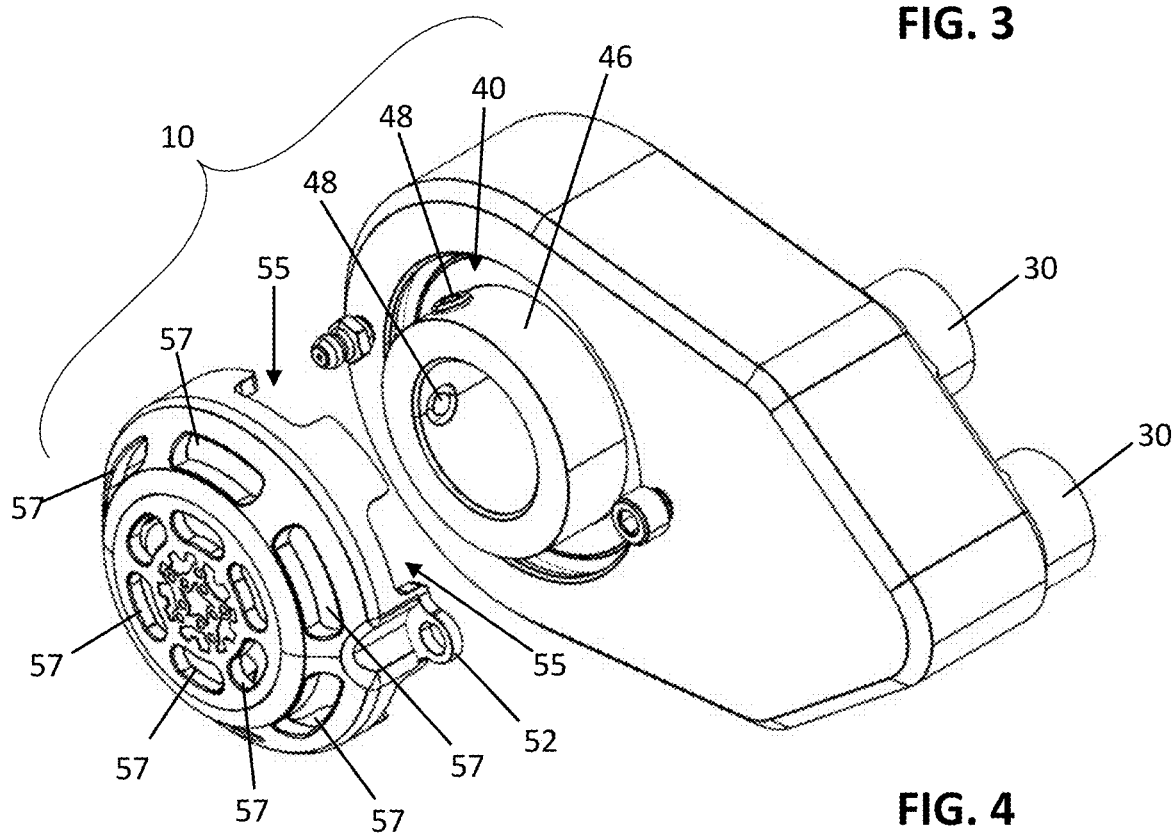
FIG. 4 is a partially exploded front perspective view of the bearing assembly illustrated in FIGS. 2-3.
Figure 5:
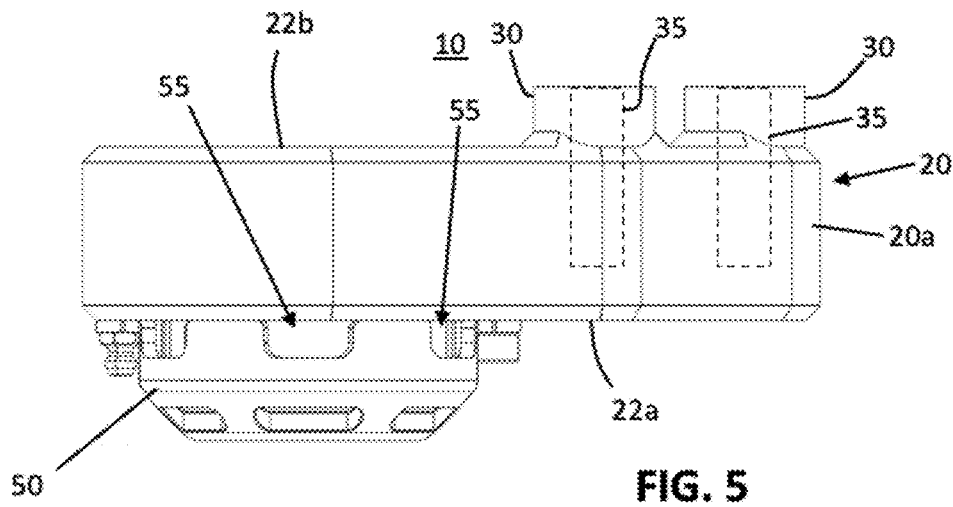
FIG. 5 is a top view of the bearing assembly illustrated in FIGS. 2-4.
Figure 6:
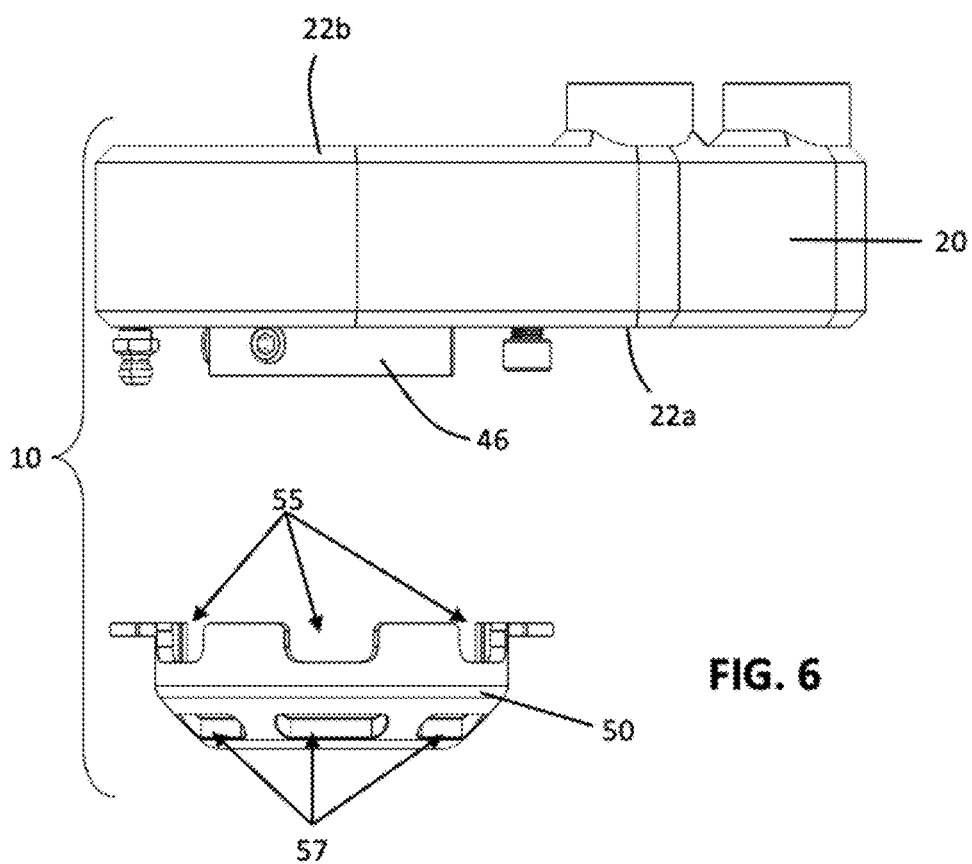
FIG. 6 is a partially exploded top view of the bearing assembly illustrated in FIGS. 2-4.
Figure 7:
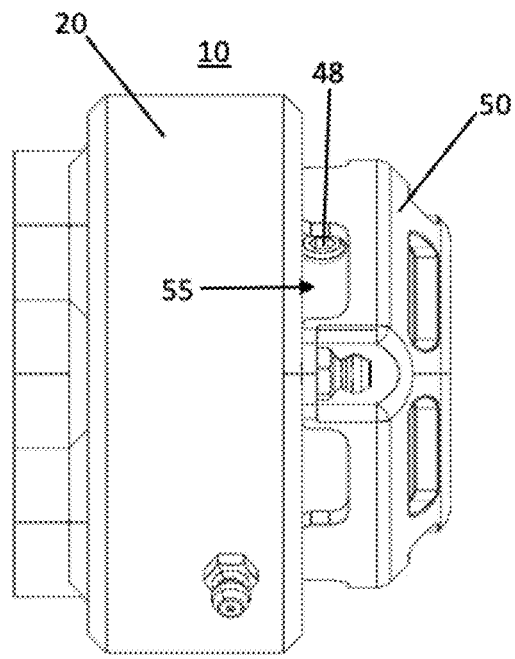
FIG. 7 is a left side view of the bearing assembly illustrated in FIGS. 2-6.
Figure 8:
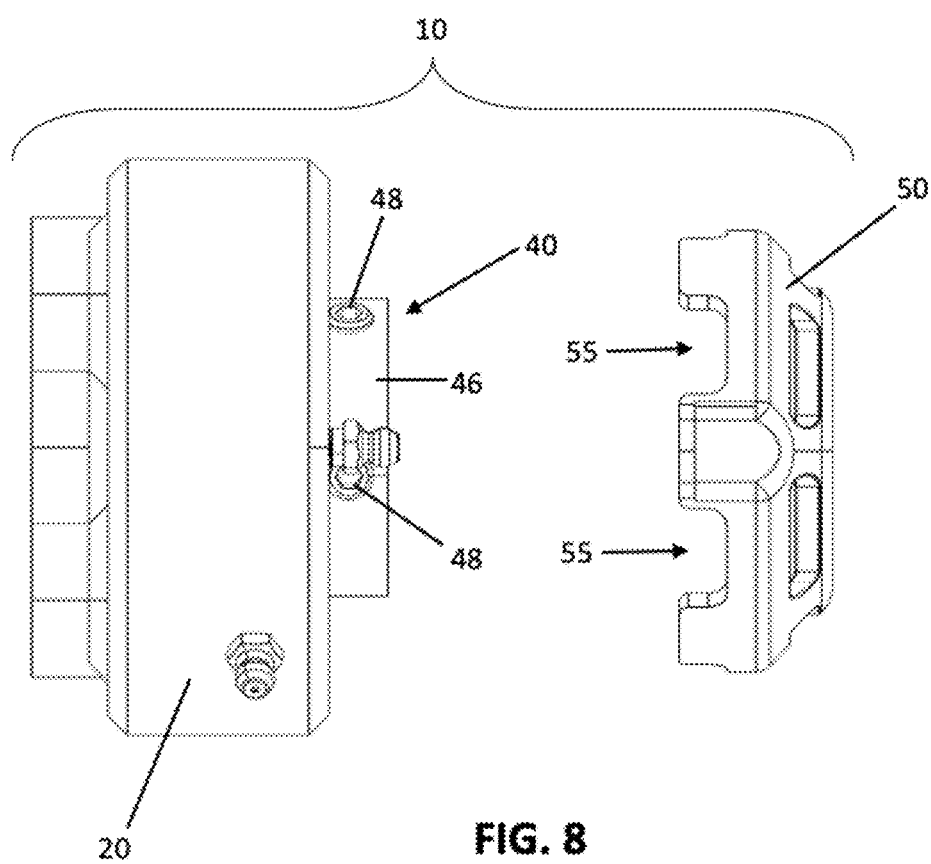
FIG. 8 is a partially exploded left side view of the bearing assembly illustrated in FIGS. 2-7.
Figure 9:
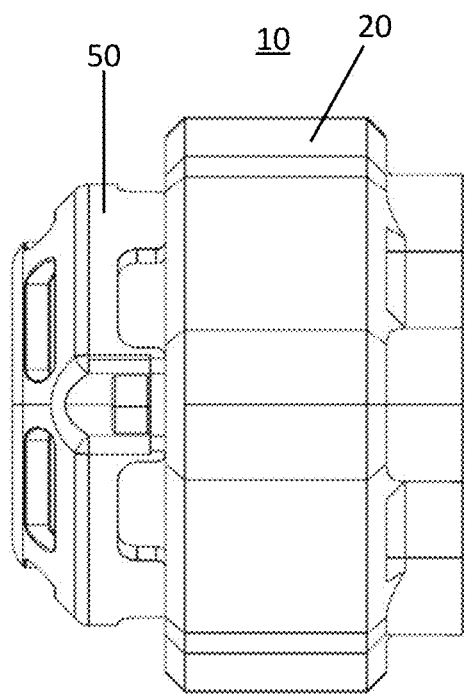
FIG. 9 is a right side view of the bearing assembly illustrated in FIGS. 2-8.
Figure 10:
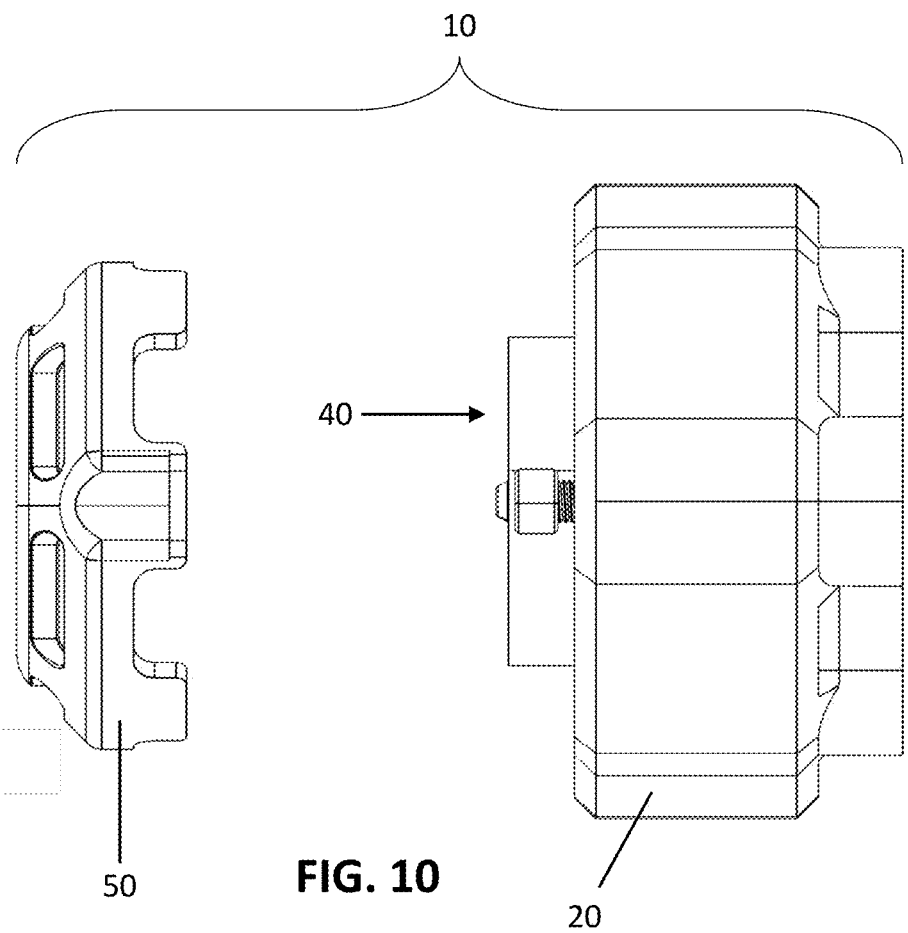
FIG. 10 is a partially exploded right side view of the bearing assembly illustrated in FIGS. 2-9.
Figure 11:
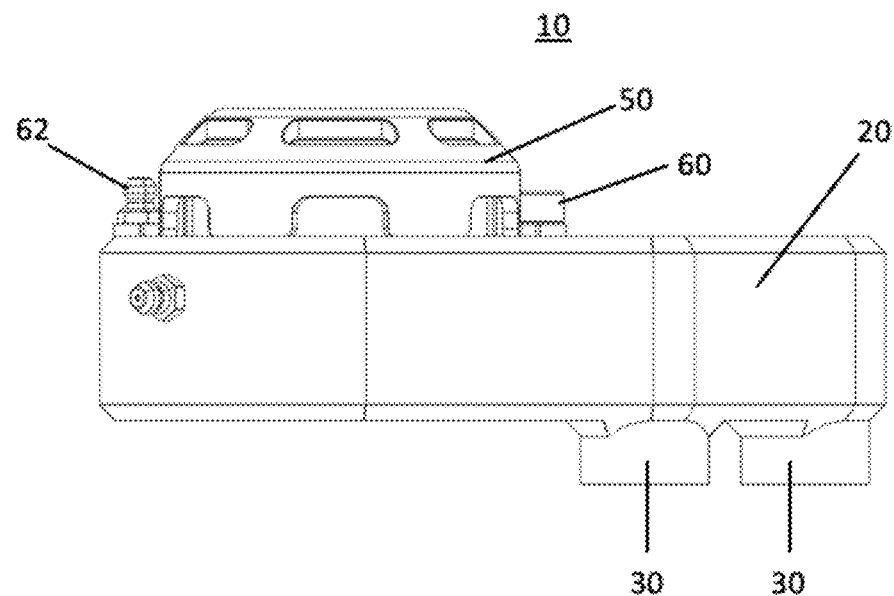
FIG. 11 is a bottom view of the bearing assembly illustrated in FIGS. 2-10.
Figure 12:
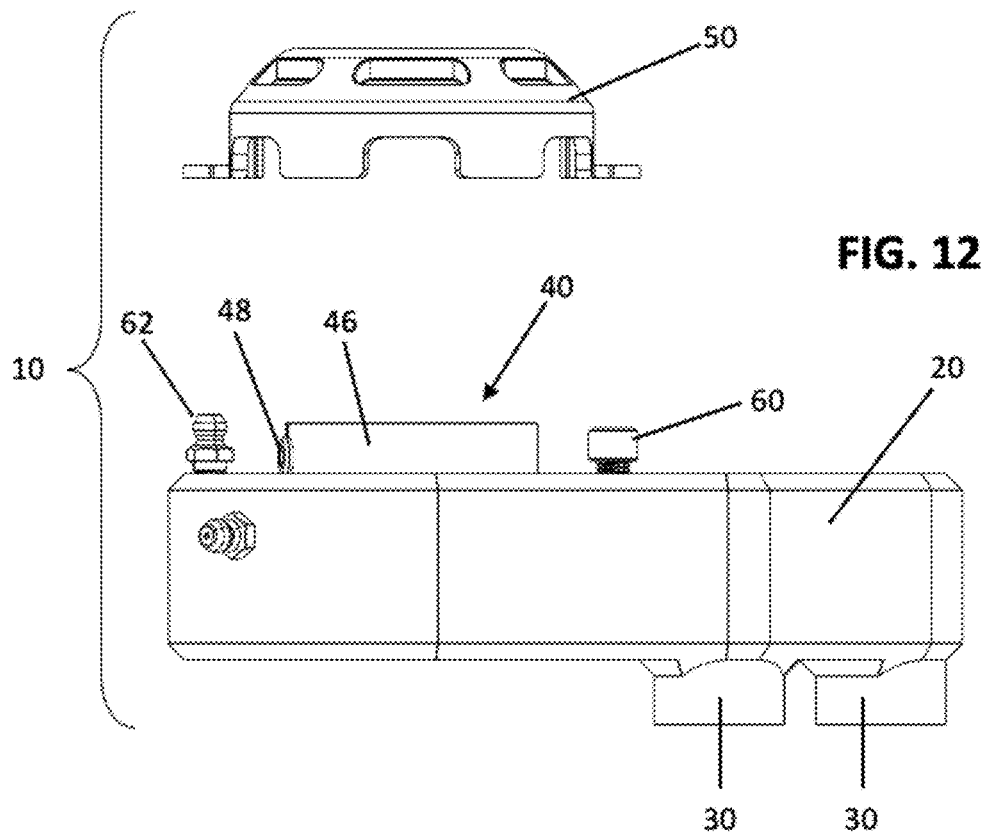
FIG. 12 is a partially exploded bottom view of the bearing assembly illustrated in FIGS. 2-11.
Figure 13:
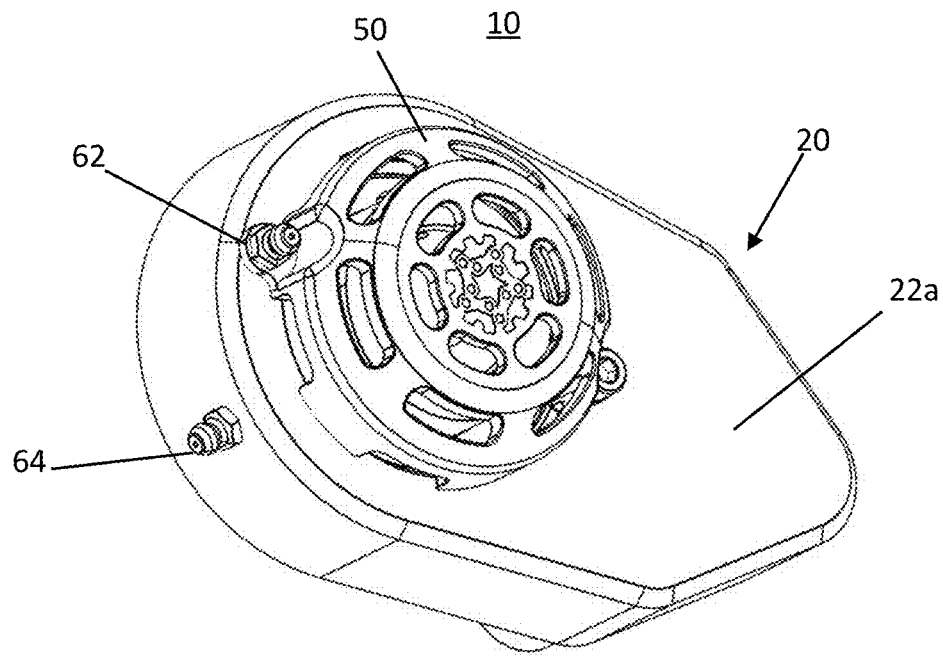
FIG. 13 is another perspective view of the bearing assembly illustrated in FIGS. 2-12.
Figure 14:
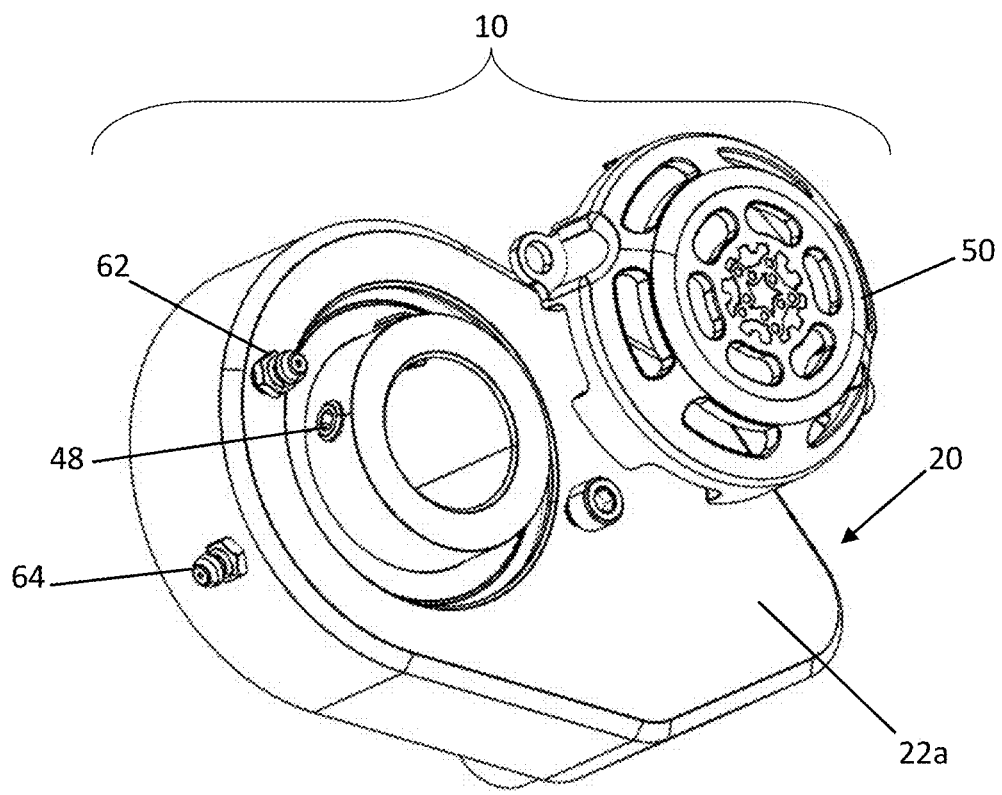
FIG. 14 is a partially exploded perspective view of the bearing assembly illustrated in FIGS. 2-3.
Figure 15:
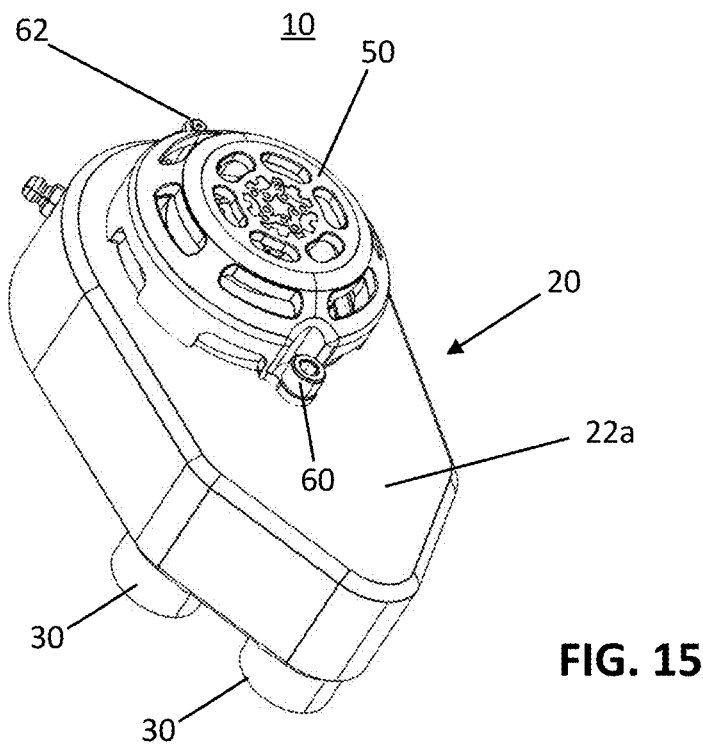
FIG. 15 is another perspective view of the bearing assembly illustrated in FIGS. 2-14.
Figure 16:
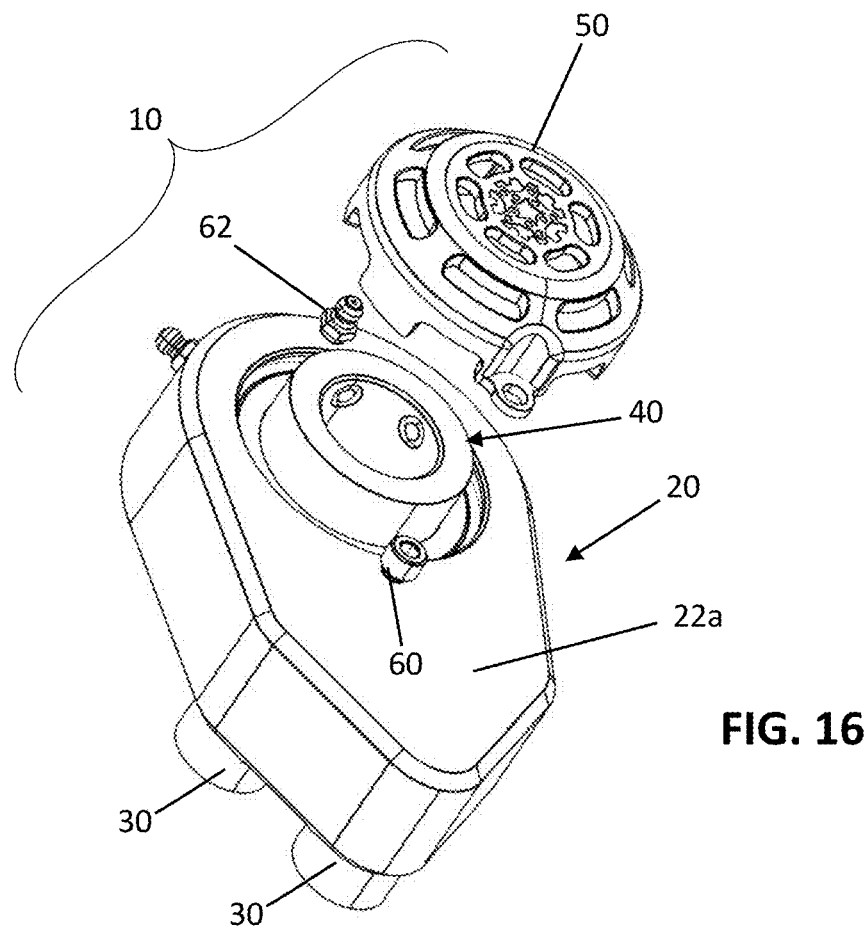
FIG. 16 is a partially exploded perspective view of the bearing assembly illustrated in FIGS. 2-15.
Figure 17:
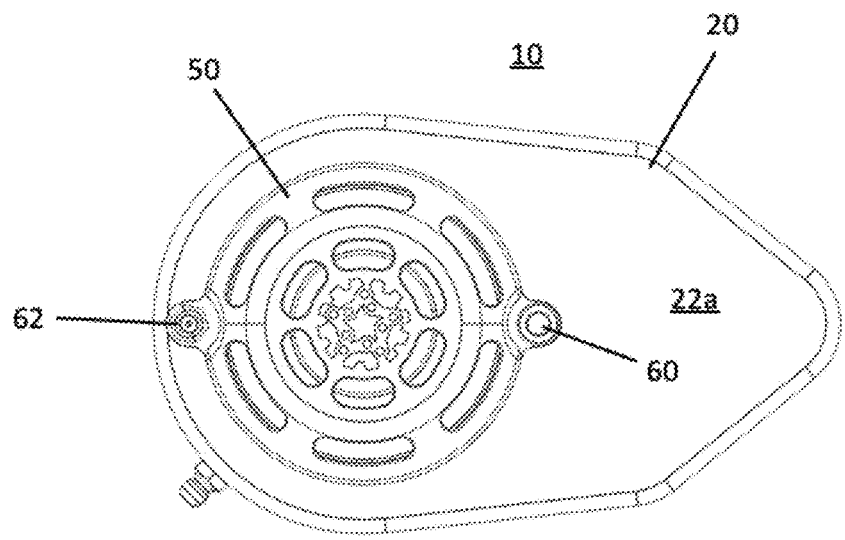
FIG. 17 is a front view of the bearing assembly illustrated in FIGS. 2-16.

In particular, with reference again to FIG. 2, as well as FIGS. 3 and 4, the first or front surface 22a of the housing 20 does not include through holes from or corresponding with the mounting bores 35. Rather, as mentioned above, the mounting bores 35 of at least one embodiment are blind holes and in some cases blind tapped holes that do not extend completely through the thickness of the housing 20. With reference to FIG. 5, for example, it should be noted that in at least one implementation or embodiment, the mounting bores 35 do extend past the spacers 30 and into a portion of the main body 20a of the housing 20. In this manner, the housing 20, or otherwise the main body 20a of the housing 20, includes a thickness that is sufficient to receive a portion of the mounting bores 35 therein while not extending completely there through.

In turn, as discussed below, fasteners that are used to mount the housing 20 to a support surface, such as conveyor or other equipment, also extend through the spacers 30 and into the main body 20a of the housing 20. This provides a great deal of structural integrity and support for the housing 20 and mounting of the housing 20 to the equipment or other surface.

Furthermore, in the embodiment illustrated in FIGS. 2 through 22, the housing 20 includes a uniform or substantially thickness from a first end 24a, proximate the bearing bore 25, to a second, opposing end 24b proximate the spacers 30, notwithstanding a beveled or chamfered edge, as shown. In this manner, the first surface 22a and second surface 22b, both of which extend from the first and second ends 24a, 24b, are parallel to one another. This uniform or substantially thickness provides enough material near the spacers 30 such that the mounting bores 35 can extend far enough into the housing 20 or the main body 20a of the housing 20 to provide sufficient structural integrity during operation of the present invention. It should be noted, however, that other configurations are contemplated such that the thickness of the housing 20 may not be uniform throughout.

Turning again to FIG. 2, the bearing insert 40 of at least one embodiment includes an outer ring 42 and an inner ring 46. As will be described here, the outer ring 42 of the bearing insert will remain substantially stationary or in an ideal situation, completely stationary, within the bore 25, while the inner ring 46 rotates. The bearing insert 40 can be constructed in a number of different manners, including, for example, with a plurality of ball bearings (not shown) disposed on the inside to facilitate rotation of the inner ring 46. Other bearing structures and implementations are contemplated and are fully within the spirit and scope of the present invention.

In particular, the inner ring 46 defines a hollow interior channel 47 within which the equipment shaft (not shown) is disposed. In one embodiment, in order to secure the equipment shaft into the hollow interior channel 47 of the bearing insert 40, the bearing insert 40 includes at least one (although in the embodiment shown, two) set screws 48 or other securing mechanism, device or component. More specifically, the set screws 48 can be rotated with a tool (e.g., a hexagon wrench, hex key, screw driver, etc.) in order to tighten to or against the equipment shaft. Doing so will secure the equipment shaft to the bearing insert 40, and more specifically within the interior channel 47 of the inner ring 46 such that the equipment shaft and the inner ring 46 will rotate together. In other words, the inner ring 46 of the bearing insert 40 will rotate independent of the outer ring 42 or otherwise while the outer ring 42 remains stationary or substantially stationary. With the equipment shaft (not shown) secured to the inner ring 46, and in particular within the interior channel 47 thereof via set screws 48 or other securing mechanism, the inner ring 46 and the equipment shaft will rotate together.

Regular maintenance of the bearing assembly 10 may require checking whether the set screw(s) 48 remain tight and/or whether the set screw(s) 48 may need to be retightened. It should be noted that other securing mechanisms can be used in order to secure or engage the equipment shaft to the inner ring 46, including, but not limited to, screws, pins, rods, cooperating tongue and grooves, clips, clamps, etc.

In this manner, additional features of at least one embodiment of the present invention include an end cap or cover, generally referenced as 50, as shown in FIGS. 2 through 17. The end cap or cover 50 is removably disposed in an at least partially covering relation to an end of the bearing bore 25, and in particular, to the end of the bearing bore 25 on the first or front surface 22a of the housing 20. Accordingly, at least one attachment or auxiliary hole, such as a first attachment or auxiliary hole 26a and a second attachment or auxiliary hole 26b, is formed in the housing 20 proximate to the bore 25 such that the cap 50 can be secured or attached to the housing 20 via the use of one or more fasteners 60, greater zerk(s) or grease/lubrication fitting(s) 62, or other accessory or auxiliary item or component (not shown). In at least one embodiment, and as shown in FIGS. 2 through 17, at least one, although in the embodiment shown both or all of the attachment or auxiliary hoes 26a, 26b include an attachment axis A2, A3 that is parallel to the axis A1 of rotation of the inner ring 46 of the bearing insert 40. This allows the fastener(s) 60, lubrication or grease zerk(s) 62 or accessory or component to be easily accessible, even when the bearing assembly 10 or housing 20 is mounted to the equipment or other support surface.

More in particular, in at least one embodiment, one or more of the attachment or auxiliary holes 26a, 26b may be defined as a lubrication fitting hole in that the hole 26a, 26b can be structured or configured to provide fluidic access into the bearing bore 25 such that a grease zerk or lubrication fitting 62 can be used as the fastener that secures the end cover 50 to the housing 20. For instance, with reference now to FIGS. 21 and 22, one or more of the attachment or auxiliary holes 26a, 26b can include a proximate end 28a, 28b disposed on or at the first surface of the housing 20 and a fluidically connected distal or inner end 27a, 27b, respectively, that extends to or is otherwise communicative with the bearing bore 25. More in particular, the proximal end 28a, 28b is fluidically connected to the corresponding distal end 271, 27 of the attachment or auxiliary hole(s) 26a, 26b. The distal end(s) 27a, 27b are in fluidic communication with or extent to the inside of the bore 25, as shown for example in FIGS. 21 and 22.

In this manner, a grease zerk or lubrication/grease fitting 62 can optionally be used as the fastener which removably mounts the cap or cover 50 to the housing 20. For instance, the lubrication fitting 62 can be mounted to any one or both of the attachment or auxiliary holes 26a, 26b such that grease or other lubricant can be pumped or injected into the bore 25 (e.g., through the lubrication fitting 62 and through the hole 26a, 26b) for maintenance and/or to ensure optimal operation of the bearing insert 40.

While both of the attachment or auxiliary holes 26a, 26b are shown to be communicative with the bearing bore 25, in other embodiments only one of the attachment or auxiliary holes 26a, 26b may be fluidically communicative with the bore 25, while in further embodiments, none of the attachment or auxiliary holes 26a, 26b may be fluidically communicative with the bore 25. In the embodiment where one or both of the attachment or auxiliary holes 26a, 26b are communicative with the bore 25, the user or operator may optionally choose whether to secure the end cover 50 to the housing 20 with a common fastener 60 (e.g., a screw, bolt, pin, etc.) or whether to use one or more grease zerks or lubrication/grease fittings 62 instead. To be clear, while the drawings indicate a grease or lubrication zerk 62 mounted into attachment or auxiliary hole 26a, and a fastener 60 mounted into attachment hole 26b, in at least one embodiment, the fastener 60 and grease or lubrication fitting 62 are interchangeable as desired.

In addition, instead of or in addition to the fastener 60 or grease zerk or fitting 62, an accessory (not shown) can be mounted into one or more of the attachment or auxiliary holes 26a, 26b. An accessory can be or include, for example, one or more sensors, electronics, RFIDs, or other devices that can be used to measure or control certain or different aspects of the assembly, such as the bearing insert 40 thereof. In particular, the accessory or sensor(s) may measure, detect or in some cases control the effective operation of the bearing, the amount of grease or other lubricant contained within the bearing, the rotational speed or rotational operation of the bearing insert 40 or inner ring 46 thereof, etc.

Referring again to FIG. 2, the end cap 50 of at least one embodiment includes at least one, although in the embodiment shown, two flanges 52 which extend outward from the cap 50, and in particular, from a bottom edge thereof. Each of the flanges 52 align with a corresponding one of the attachment or auxiliary holes 26a, 26b and include a corresponding hole or partial hole through which the fastener 60, grease zerk/lubrication fitting 62 or accessory can be disposed, thereby removably mounting or securing the end cap 50 to the housing 20.

It should be noted that the end cap 50 of at least one embodiment can be constructed or fabricated out of plastic, although virtually any material, including metal, steel, stainless steel, etc. can be used.

Furthermore, the end cap 50 of at least one embodiment includes a partially open configuration in that one or more holes or openings are located on or throughout the cover 50. In particular, the end cover 50 of at least one embodiment includes one or more lower or side openings, referenced as 55, which are disposed along the lower side portion of the cap 50. More specifically, with reference to FIG. 7, for example, the lower or side opening(s) 55 is/are positioned such that when the end cap 50 is mounted to the housing 20, the set screws 48 or other securing mechanisms disposed on the inner ring 46 of the bearing insert 40 are at least temporarily aligned with the opening(s) 55 and therefore accessible while the end cap 50 is mounted to the housing 20. For example, as the inner ring 46 of the bearing insert 40 rotates, the set screw(s) 48 will first temporarily align with one of the openings 55, and then will temporarily align with the next adjacent opening 55. This allows the set screw(s) 48 or other securing mechanisms to be accessible, tightened, loosened, or otherwise maintained without having to remove the end cap 50.

Referring again to FIGS. 2 through 17, the end cap 50 of at least one embodiment further includes a plurality of additional holes and/or openings 57 disposed along the side and/or top of the end cap 50. The open or at least partially open configuration defined by the plurality of holes 55, 57 allow the bearing insert 40 to be visually inspected without having to remove the end cap from the housing 20. This allows routine maintenance and visual inspection to occur much more easily and more often. An additional benefit of the open or at least partially open configuration of the end cap 50 defined by the plurality of holes or openings 55, 57 is that while pumping grease or other lubricant through one or more the grease zerks or fittings 62, the operator often looks for a small amount of grease or lubricant to appear at the seals or edges of the bearing 40. If the cover obscures the view of the bearing 40 while grease or lubricant is being pumped or inserted therein, the operator cannot see the seals, edges or grease/lubricant. This tends to lead to over lubricating or under lubricating. Accordingly, the open configuration allows the operator to see within the bore 25 or otherwise see the bearing 40 while he or she is pumping grease or other lubricant therein, allowing him or her to stop at an appropriate time.

Yet another benefit of the open configuration of the end cap 50 defined by the plurality of openings 55, 57 is that food and other particles, as well as extra grease/lubricant, is/are easily washed out of the open cap 50 or otherwise fall out of the enclosure defined by the cap 50 on its own over time.

With reference to FIGS. 7, 8, 11-17, and 22, in at least one exemplary embodiment, the housing 20 may include a grease zerk or lubrication fitting 64 along with a corresponding opening 65 communicative with the bore 25 disposed upon the housing 20 in a location independent of the end cap, such as, but not limited to along a side portion of the housing 20. In this manner, if the user chooses to mount two fasteners 60 into attachment holes 26a, 26b, then the independent grease zerk 64 can be used to pump grease into the bore 25.

Other embodiments, such as that shown in FIGS. 23A-23I, 24A-24I and 25A-25I, may not include the additional, separate or end-disposed grease zerk or lubrication fitting 64.

FIGS. 26A-26H are provided to show an exemplary end cap or cover 50 as disclosed in accordance with at least one embodiment of the present invention.

Figure 27:
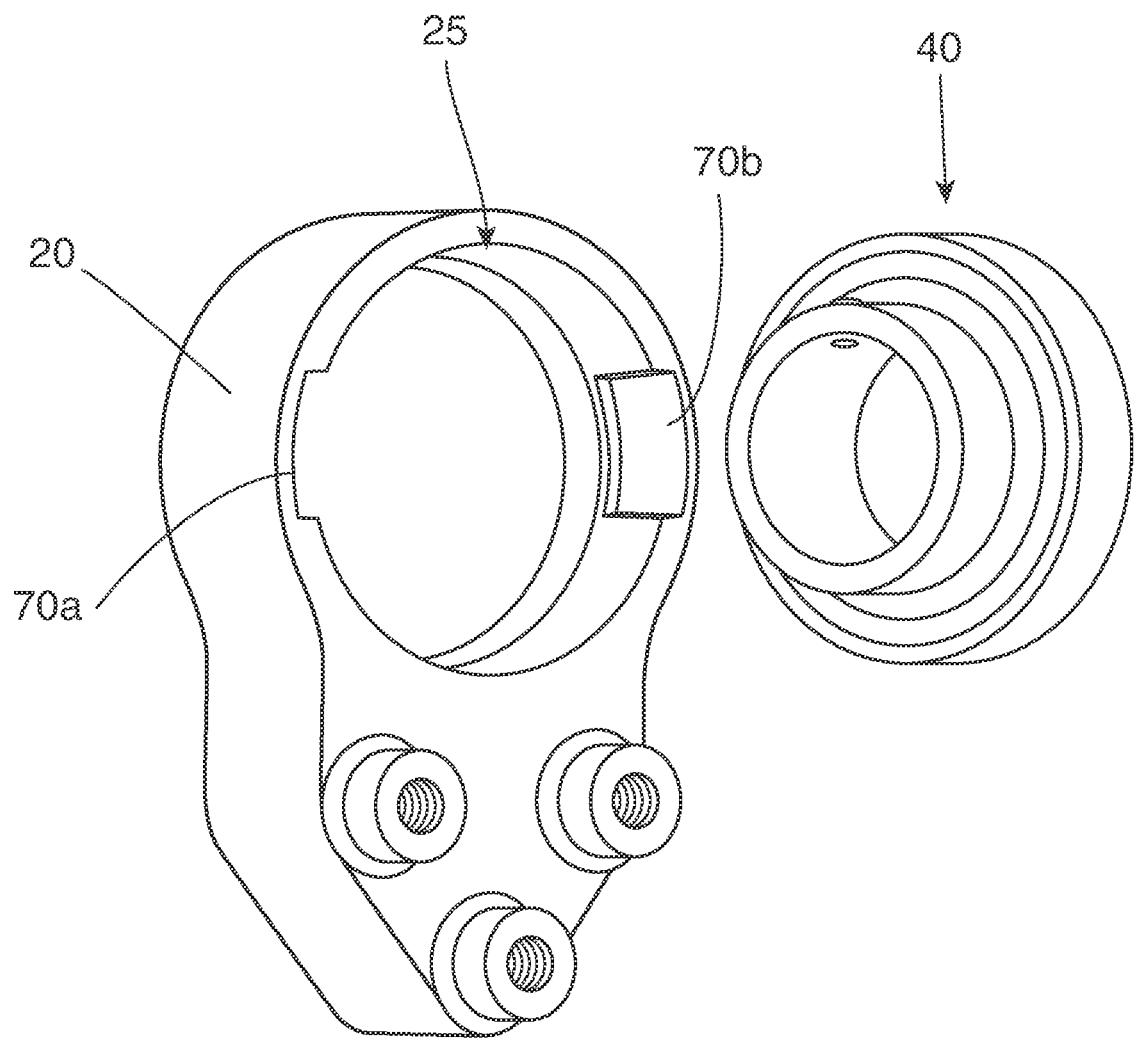
FIG. 27 is a front perspective view of the bearing assembly illustrated in FIGS. 23-29, with the bearing insert removed.
Figure 28:
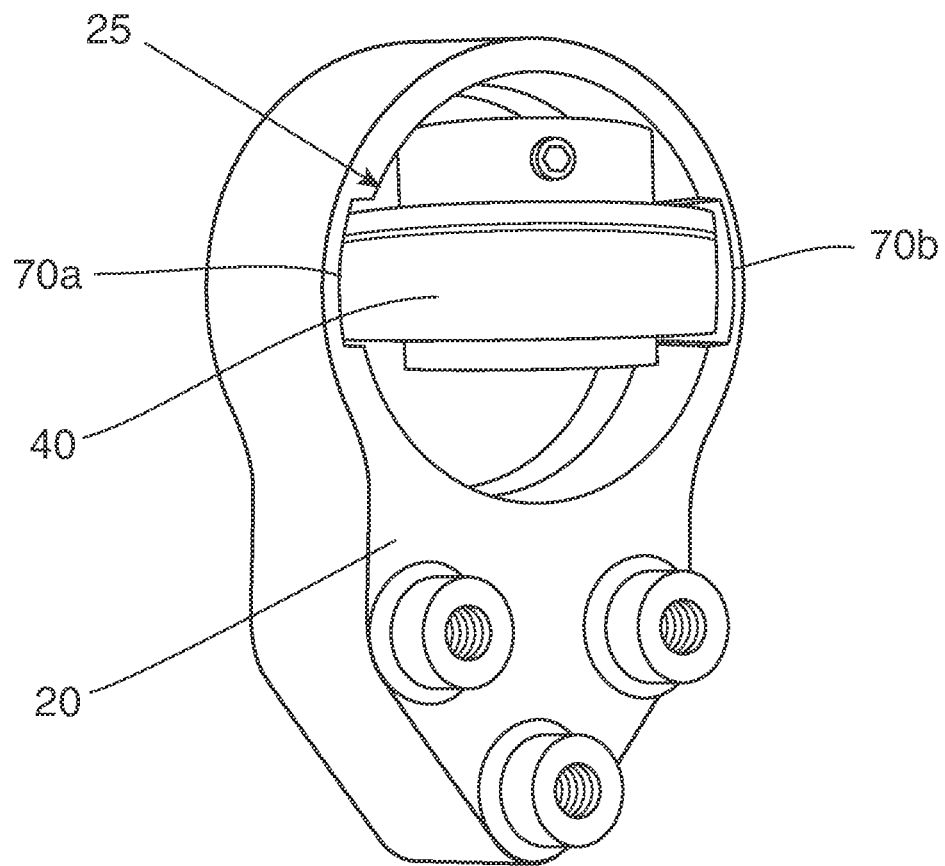
FIG. 28 is a front view of the bearing assembly illustrated in FIGS. 23-30, with the bearing insert partially installed.
Figure 29:
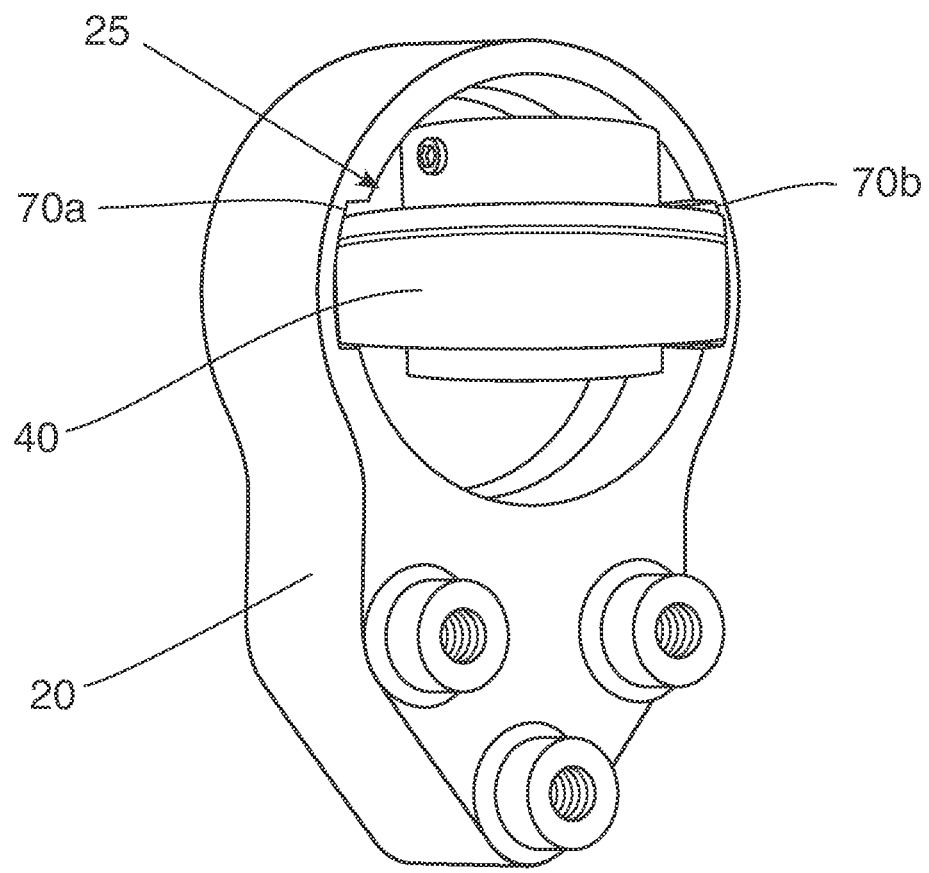
FIG. 29 is another front view of the bearing assembly illustrated in FIGS. 23-31, with the bearing insert partially installed.
Figure 30:
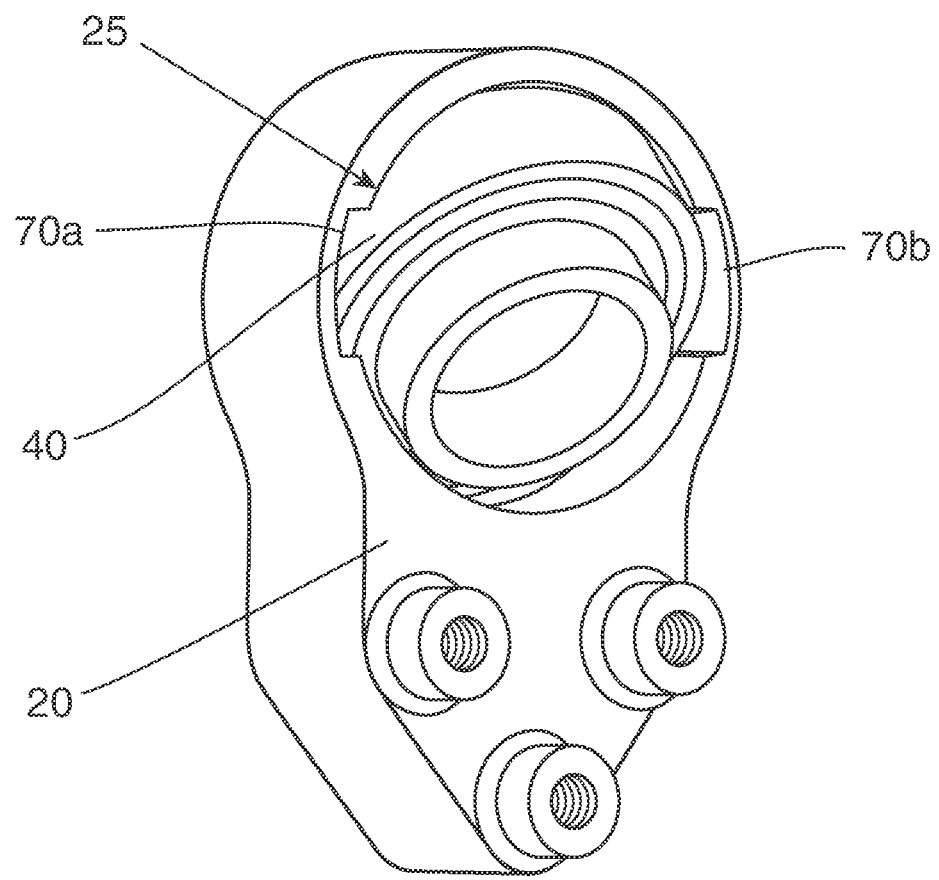
FIG. 30 is another front view of the bearing assembly illustrated in FIGS. 23-23, with the bearing insert partially installed.
Figure 31:
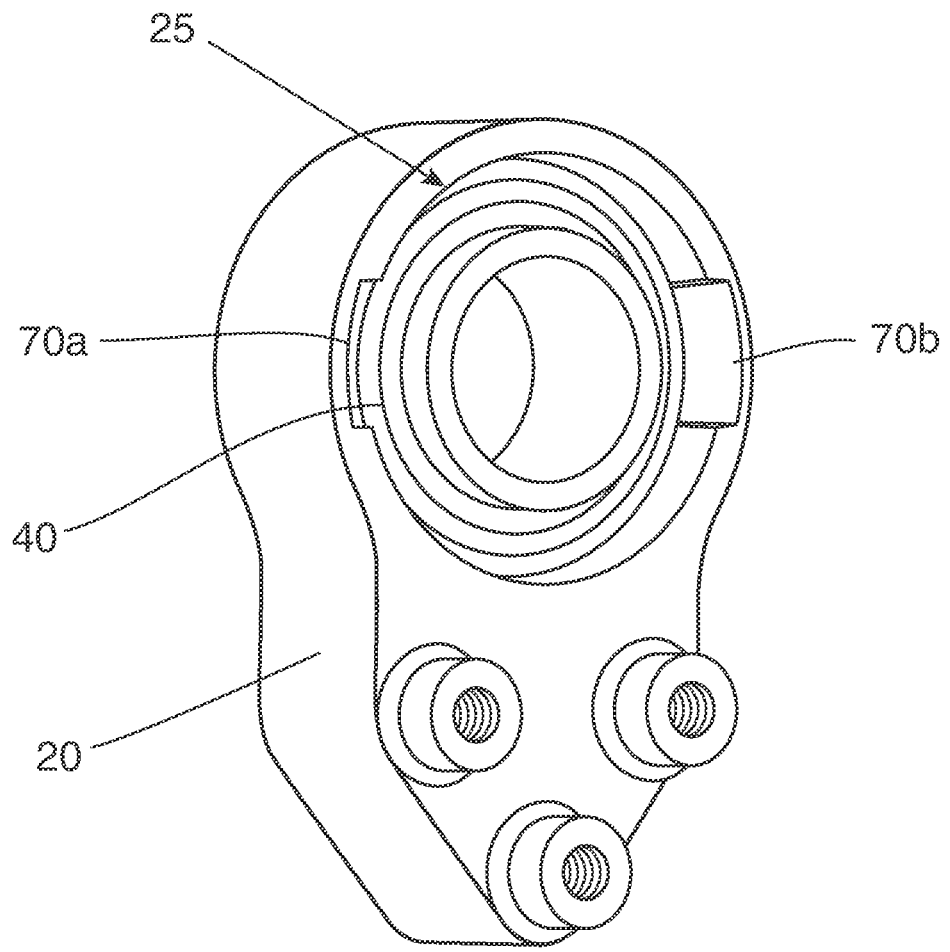
FIG. 31 is another front view of the bearing assembly illustrated in FIGS. 23-33, with the bearing insert installed.

With reference to FIGS. 27-31, positioning of the bearing insert 40 into the bore 25 of at least one embodiment is shown. More specifically, FIG. 27 shows the bearing insert 40 separated from the housing 20. In order to install the bearing insert 40 into the bearing bore 25 of the housing 20, in at least one embodiment, the bearing insert 40 is first rotated to the side (such that the rotational axis of the bearing insert 40 and the inner ring 46 thereof is substantially perpendicular to the axis of the bore 25), as shown in FIGS. 28 and 29. In order for the bearing insert 40 to fit into the housing 20 in this manner, at least one, although in the embodiment shown two, wings, windows or cutouts 70a, 70b are formed in the bore 25. As shown in FIGS. 30 and 31, once the bearing insert 40 is positioned into the bore 25 via the window cutouts 70a, 70b, the bearing insert 40 can be rotated therein (FIG. 30) in a manner such that the axes of the bearing insert 40 and bore 25 align or are otherwise parallel or substantially parallel (FIG. 31).

Furthermore, one or more pins or stoppers 75 (shown in FIG. 2) can be disposed on the bearing insert 40, such as, for example, on an outer surface of the outer ring 42. The one or more pins or stoppers 75 will extend outward from the outer ring 42 and will engage within the window cutouts 70a, 70b when the bearing insert 40 is installed therein. More in particular, when inserting the bearing insert 40 into the bore 25, for example, in the position shown in FIGS. 28 and 29, the one or more pins 75 of at least one embodiment must be aligned with or otherwise inserted into one (e.g., in the case of one pin 75) or both (e.g., in the case of two pins 75) of the wings or windows 70a, 70b. In this manner, the pins or stoppers 75 restrict the bearing insert 40 from rotating, for example, into an unwanted position during installation. In use, for example, when the bearing insert 40 is in the position shown in FIG. 31 and the axes are aligned or substantially aligned, the one or more pins can restrict rotational movement of the outer ring 42 from rotating, for example, by engaging or abutting against one of the side edges of the wings or windows 70a, 70b.

In some cases, the tight clearance of the bearing insert 40 within the bore 25 can, by itself, substantially restrict rotational movement of the outer ring 42 during operation of at least one embodiment of the present invention.

Figure 32:
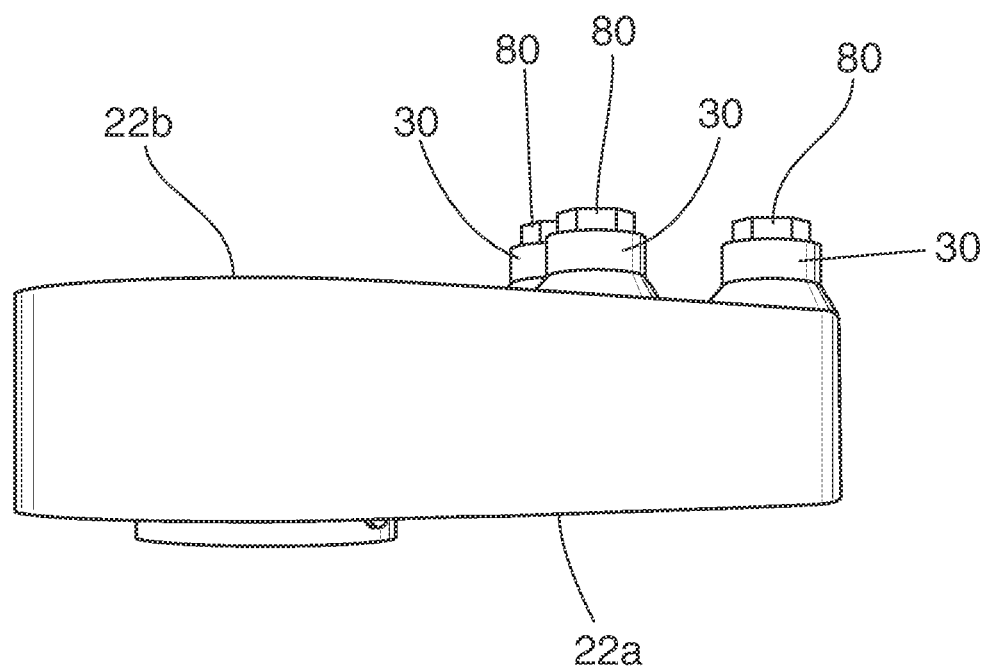
FIG. 32 is an end view of the bearing assembly illustrated in FIGS. 23-234, with fasteners installed.
Figure 33:
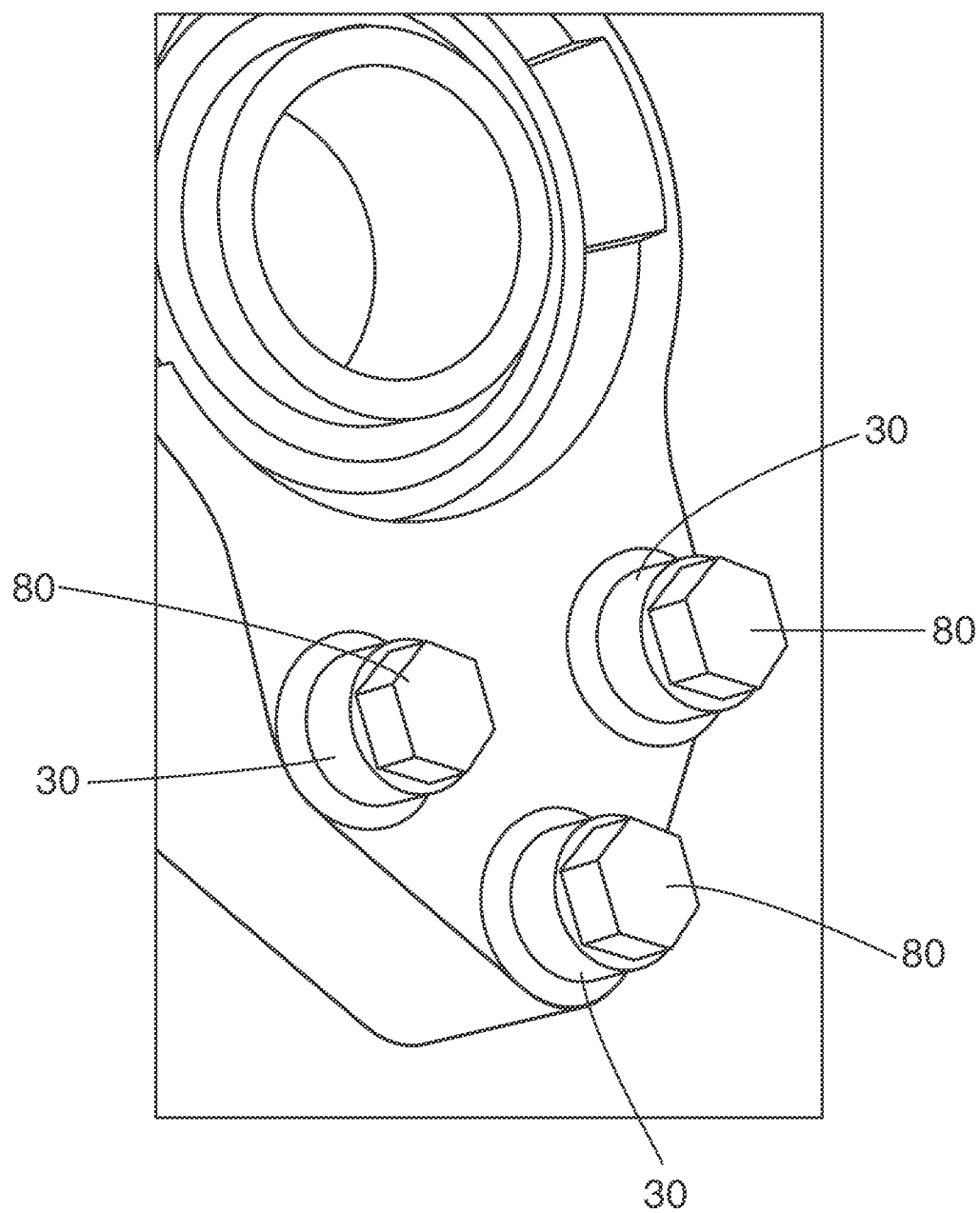
FIG. 33 is a partial perspective view of the bearing assembly illustrated in FIGS. 23-35, with the fasteners installed.
Figure 34:
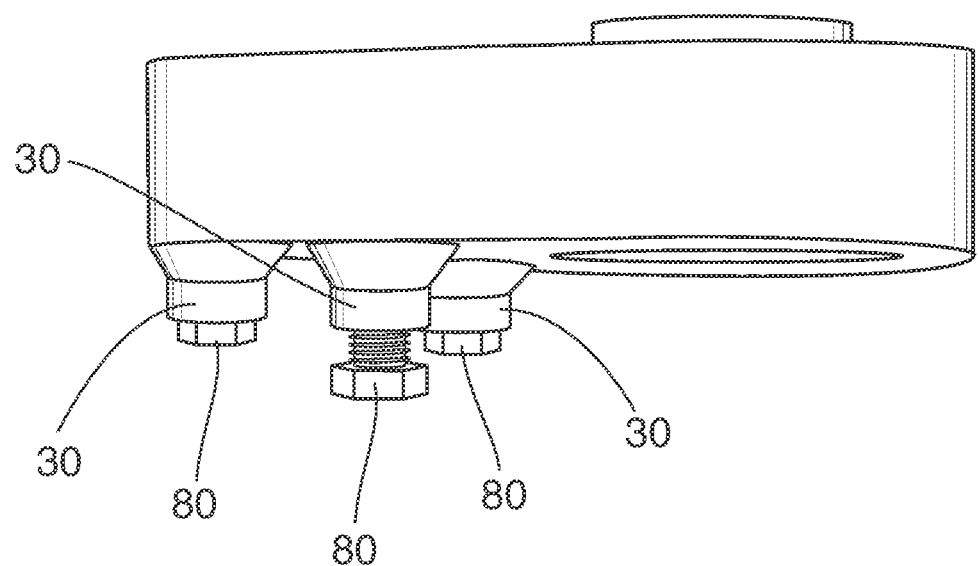
FIG. 34 is another end view of the bearing assembly illustrated in FIGS. 23-36, with the fasteners at least partially installed.

FIGS. 32-34 are provided to show the fasteners 80 which can be used to mount the housing 20 or bearing assembly 10 to the equipment (not shown) or other support surface (not shown). More specifically, in at least one embodiment, the spacers 30 are tapped or threaded in a manner such that virtually any off-the-shelf or common bolt, screw, or other fastener 80 can be used to mount the housing 20 or assembly 10. In particular, the fasteners 80 will typically extend through the equipment or support surface first, and then engage with the housing 20 via mounting holes 35 and spacers 30. In this manner, the fastener heads will be seated against one side of the equipment and the end of the spacers 30 will be seated against the other side of the equipment, such that the equipment or other support surface is sandwiched or sealed between the fastener heads and the spacers 30. When the fasteners are tight and secure, the connection between the equipment and the spacers 30 will be water tight.

Furthermore, as seen in FIGS. 32 and 34, there are no exposed threads on the front surface 22a of the housing 20, thereby minimizing locations and surfaces that are prone to harbor bacteria that is present in other prior art bearing housings. It should also be noted that the housing 20, as well as the integral spacers 30, can be fabricated out of a polished steel or other metal and/or can otherwise have a smooth surface. This feature also minimizes a number of nooks and crevasses that are known to harbor bacteria growth. In addition, with a smooth surface, the housing 20 is easily cleaned, for example, by simply spraying it off with water, cleaner or disinfectant.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,
What is claimed is:

1. A food hygienic bearing assembly, comprising:
   a housing,
   said housing comprising a bore spanning between a first surface and a second surface, said first surface being opposite said second surface,
   a plurality of spacers integrally disposed on and extending from said second surface of said housing, wherein each of said plurality of spacers comprises a blind tapped hole disposed therein, wherein each of said blind tapped holes is disposed through a corresponding one of said plurality of spacers and partially into a main body portion of said housing, and
   an end cap disposed in a removably covering relation to said bore, wherein said end cap comprises an at least partially open configuration defining a plurality of holes thereon.

2. The food hygienic bearing assembly as recited in claim 1 wherein at least one of said plurality of holes of said end cap is at least temporarily in alignment with a mounting screw disposed on a bearing insert, the bearing insert being disposed within said bore of said housing, wherein the mounting screw is accessible through said end cap while said end cap is mounted to said housing.

3. The food hygienic bearing assembly as recited in claim 1 wherein said housing further comprising at least two auxiliary holes disposed on said first surface proximate said bore.

4. The food hygienic bearing assembly as recited in claim 3 wherein said end cap comprises at least one mounting flange disposable in an overlying relation with at least one of said at least two auxiliary holes.

5. The food hygienic bearing assembly as recited in claim 4 wherein at least one of said two auxiliary holes is a lubrication fitting hole, wherein said lubrication fitting hole comprises a proximal end disposed on said first surface of said housing and a fluidically connected distal end communicative with an interior of said bore.

6. The food hygienic bearing assembly as recited in claim 5 wherein a lubrication fitting is removably secured within said lubrication fitting hole, said end cap being removably mounted to said housing via at least said lubrication fitting.

7. The food hygienic bearing assembly as recited in claim 6 wherein said lubrication fitting is disposed parallel to an axis about which a bearing insert rotates.

8. A bearing assembly, comprising:
   a housing defining a first surface and a second surface, said first surface being opposite from said second surface,
   said housing comprising a bore adapted to receive a bearing insert disposed therein,
   at least two attachment holes comprising a first attachment hole and a second attachment hole disposed on said first surface of said housing proximate said bore,
   wherein at least one of said first attachment hole and said second attachment hole is a lubrication fitting hole, wherein said lubrication fitting hole comprises a proximal end disposed on said first surface of said housing and a distal end communicative with an interior of said bore, said proximal end being fluidically connected to said distal end,
   an end cap removably mounted to said first surface of said housing via a first fastener removably attached within said first attachment hole and a second fastener removably attached within said second attachment hole, wherein at least one of said first fastener and said second fastener is a lubrication fitting disposed within said lubrication fitting hole.

9. The bearing assembly as recited in claim 8 wherein said end cap comprises an at least partially open configuration defined by a plurality of holes disposed upon a surface of said end cap.

10. The bearing assembly as recited in claim 9 wherein at least one of said plurality of holes of said end cap is at least temporarily in alignment with a mounting screw disposed on the bearing insert, wherein the mounting screw is accessible through said end cap while said end cap is mounted to said housing and disposed in said at least partially covering relation to said bore.

11. The bearing assembly as recited in claim 10 further comprising a plurality of spacers disposed on and extending from said second surface of said housing.

12. The bearing assembly as recited in claim 11 wherein each of said plurality of spacers comprise a blind hole disposed therethrough.

13. The bearing assembly as recited in claim 12 wherein each of said blind holes extends through a corresponding one of said plurality of spacers and partially into a main body portion of said housing.

14. The bearing assembly as recited in claim 11 wherein each of said plurality of spacers are integrally formed with said housing.

15. The bearing assembly as recited in claim 11 wherein each of said plurality of spacers are fixedly connected to said housing.

\* \* \* \* \*